US012418662B2

(12) United States Patent
Zhang et al.

(10) Patent No.: US 12,418,662 B2
(45) Date of Patent: Sep. 16, 2025

(54) METHOD, DEVICE, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Na Zhang, Beijing (CN); Li Zhang, Los Angeles, CA (US); Kai Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 34 days.

(21) Appl. No.: 18/566,956

(22) PCT Filed: Jun. 2, 2022

(86) PCT No.: PCT/CN2022/096884
§ 371 (c)(1),
(2) Date: Dec. 4, 2023

(87) PCT Pub. No.: WO2022/253319
PCT Pub. Date: Dec. 8, 2022

(65) Prior Publication Data
US 2024/0267533 A1  Aug. 8, 2024

(30) Foreign Application Priority Data

Jun. 4, 2021  (WO) ................ PCT/CN2021/098431

(51) Int. Cl.
*H04N 19/156* (2014.01)
*H04N 19/154* (2014.01)
(Continued)

(52) U.S. Cl.
CPC ......... *H04N 19/156* (2014.11); *H04N 19/154* (2014.11); *H04N 19/176* (2014.11); *H04N 19/184* (2014.11)

(58) Field of Classification Search
CPC .. H04N 19/156; H04N 19/154; H04N 19/176; H04N 19/184
(Continued)

(56) References Cited

U.S. PATENT DOCUMENTS

2020/0228815 A1   7/2020  Xu et al.

FOREIGN PATENT DOCUMENTS

CN    110677659 A      1/2020
WO    2020185427 A1    9/2020

OTHER PUBLICATIONS

Chen et al. "Algorithm description for Versatile Video Coding and Test Model 4 (VTM4)," Joint Video Experts Team (JVET) of ITU-T SG 16 WP 3 and ISO/IEC JTC 1/SC 29/WG 11, Jan. 9-18, 2019, JVET-M1002-v2, 13th Meeting: Marrakech, MA, 62 pages.
(Continued)

*Primary Examiner* — Nguyen T Truong
(74) *Attorney, Agent, or Firm* — Astute IP Law Group

(57) ABSTRACT

Embodiments of the present disclosure provide a solution for video processing. A method for video processing is proposed. The method comprises: determining, during a conversion between a current video block of a video and a bitstream of the video, a cost based on at least two error metrics associated with two target blocks of the video, the cost indicting a degree of distortion between the two target blocks; refining coding data of the current video block based on the cost and the two target blocks; and performing the conversion based on the refined coding data. Compare with
(Continued)

the conventional solution, the proposed method can advantageously improve the coding quality and the coding efficiency.

21 Claims, 36 Drawing Sheets

(51) Int. Cl.
*H04N 19/176* (2014.01)
*H04N 19/184* (2014.01)

(58) Field of Classification Search
USPC .................................................. 375/240.24
See application file for complete search history.

(56) References Cited

OTHER PUBLICATIONS

Chen et al. "Algorithm description for Versatile Video Coding and Test Model 5 (VTM 5)," Joint Video Experts Team (JVET) of ITU-T SG 16 WP 3 and ISO/IEC JTC 1/SC 29/WG 11, Mar. 19-27, 2019, JVET-N1002-v2, 14th Meeting: Geneva, CH, 76 pages.
International Search Report in PCT/CN2022/096884, mailed Jul. 27, 2022, 3 pages.

| Merge index | L0 MV | L1 MV |
|---|---|---|
| 0 | X | |
| 1 | | X |
| 2 | X | |
| 3 | | X |
| 4 | X | |

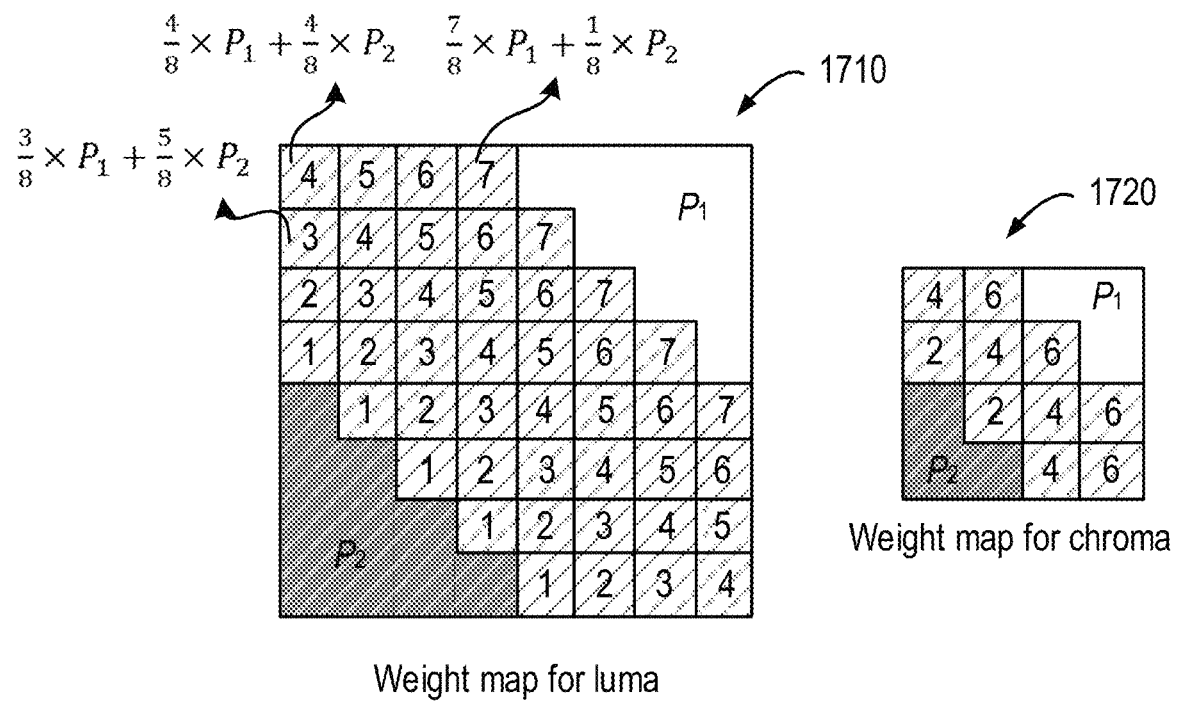

METHOD, DEVICE, AND MEDIUM FOR VIDEO PROCESSING

CROSS-REFERENCE TO RELATED APPLICATIONS

This is a national stage application filed under 37 U.S.C. 371 based on International Patent Application No. PCT/CN2022/096884 filed Jun. 2, 2022, which claims priority to International Patent Application No. PCT/CN2021/098431 filed with the China National Intellectual Property Administration (CNIPA) on Jun. 4, 2021, the disclosures of which are incorporated herein by reference in their entireties.

FIELD

Embodiments of the present disclosure relates generally to video coding techniques, and more particularly, to refinement of coding data.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally expected to be further improved.

SUMMARY

In a first aspect, a method for video processing is proposed. The method comprises: determining, during a conversion between a current video block of a video and a bitstream of the video, a cost based on at least two error metrics associated with two target blocks of the video, the cost indicting a degree of distortion between the two target blocks; refining coding data of the current video block based on the cost and the two target blocks; and performing the conversion based on the refined coding data.

In order to determine a cost between two blocks for refinement of coding data, the method in accordance with the first aspect of the present disclosure utilize at least two different error metrics to measure the distortion between two blocks. Thereby, it is possible to determine the error in several different manners and thus the cost can measure the distortion more accurately. Compare with a conventional solution where only one error metric is used to determine the cost, the method in accordance with the first aspect of the present disclosure can advantageously improve the coding quality and the coding efficiency.

In a second aspect, an apparatus for processing video data is proposed. The apparatus comprises a processor and a non-transitory memory with instructions thereon, wherein the instructions upon execution by the processor, cause the processor to perform a method in accordance with the first aspect of the present disclosure.

In a third aspect, a non-transitory computer-readable storage medium is proposed. The non-transitory computer-readable storage medium stores instructions that cause a processor to perform a method in accordance with the first aspect of the present disclosure.

In a fourth aspect, a non-transitory computer-readable recording medium is proposed. The non-transitory computer-readable recording medium stores a bitstream of a video which is generated by a method performed by a video processing apparatus, wherein the method comprises: determining a cost based on at least two error metrics associated with two target blocks of the video, the cost indicting a degree of distortion between the two target blocks; refining coding data of a current video block of the video based on the cost and the two target blocks; and generating the bitstream based on the refined coding data.

In a fifth aspect, a method for storing a bitstream of a video is proposed. The method comprises: determining a cost based on at least two error metrics associated with two target blocks of the video, the cost indicting a degree of distortion between the two target blocks; refining coding data of a current video block of the video based on the cost and the two target blocks; generating the bitstream based on the refined coding data; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 16 illustrates a schematic diagram of uni-prediction MV selection for triangle partition mode;

FIG. 17 illustrates a schematic diagram of weights used in the blending process;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
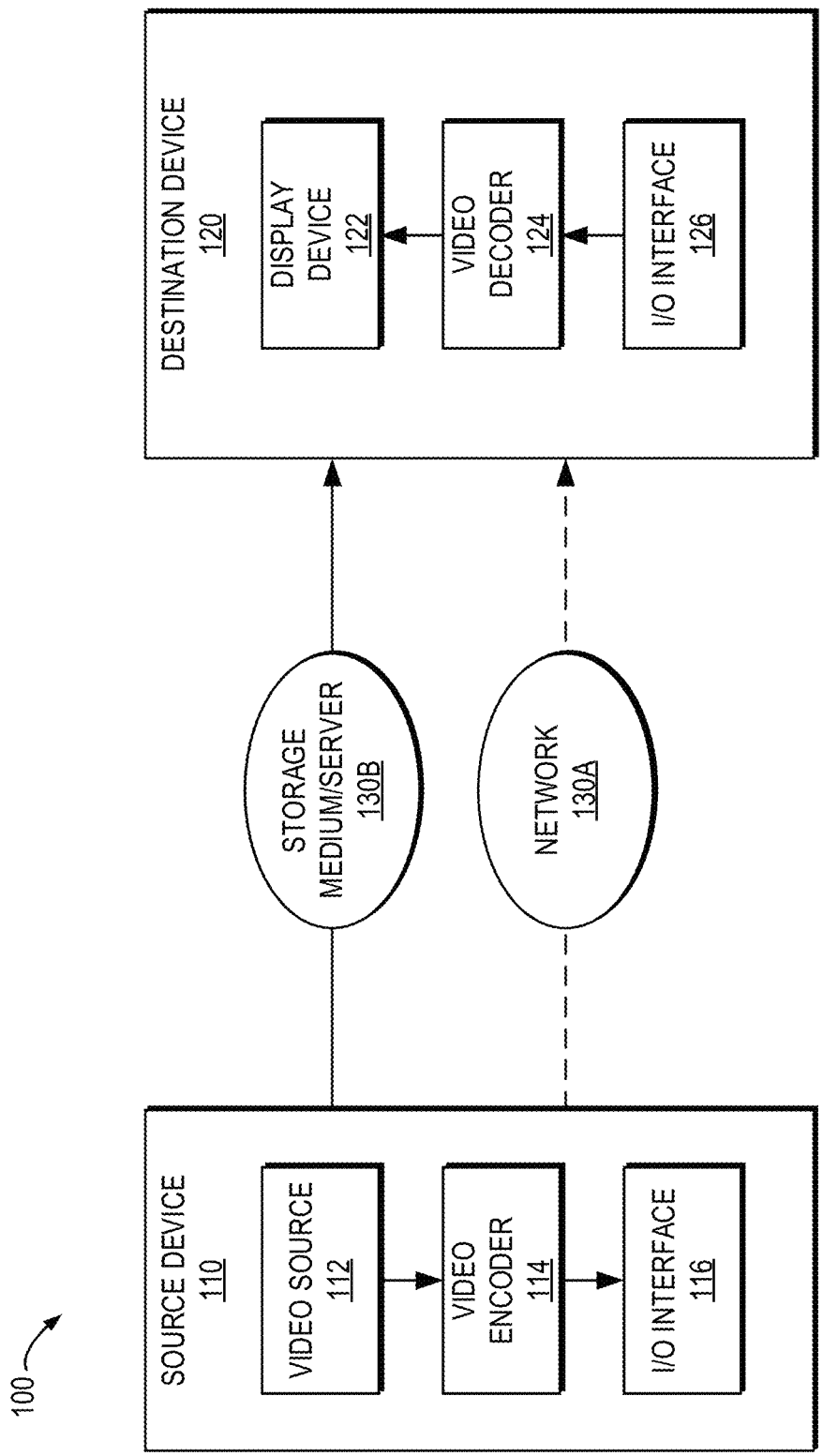
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
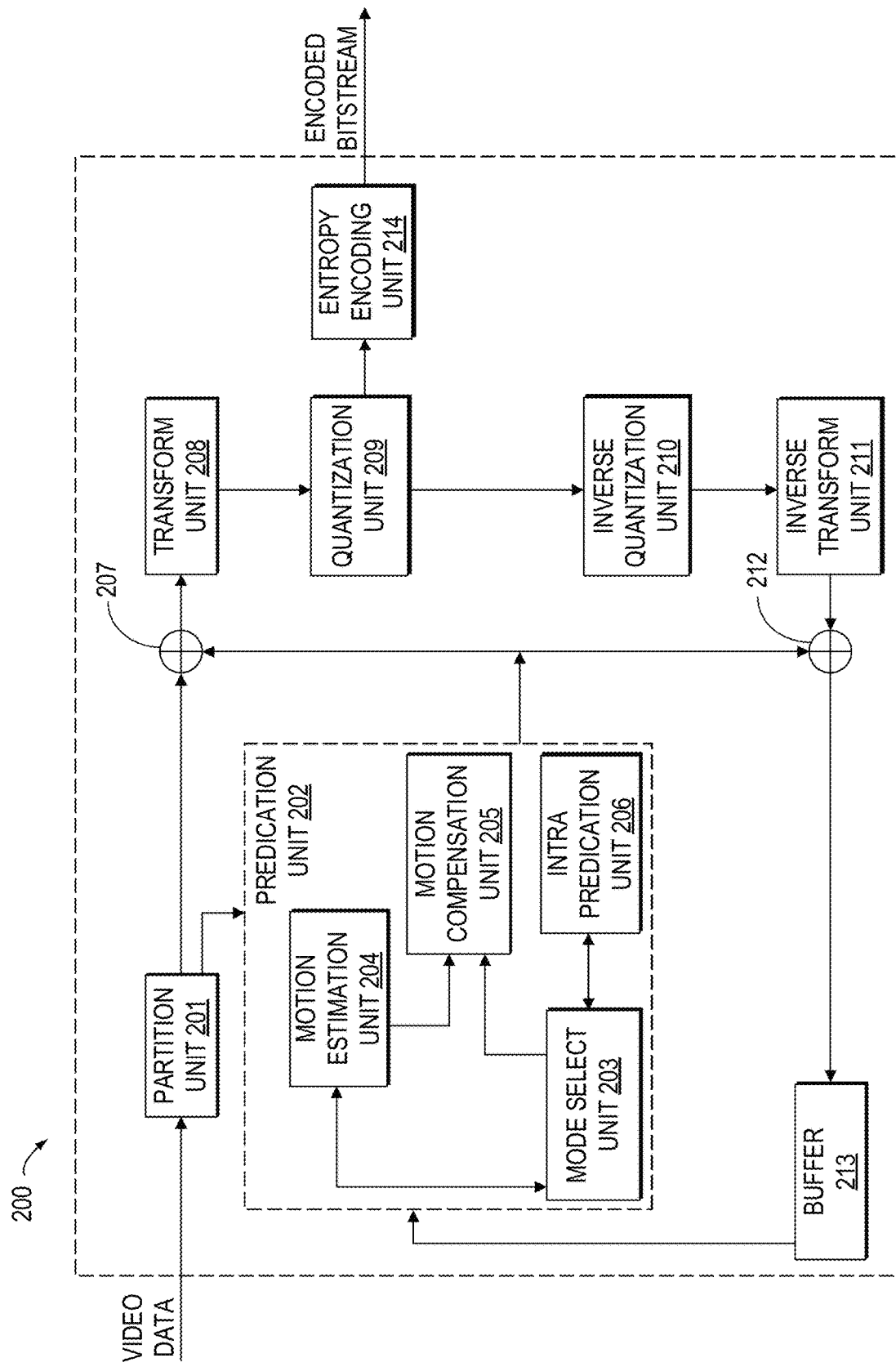
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
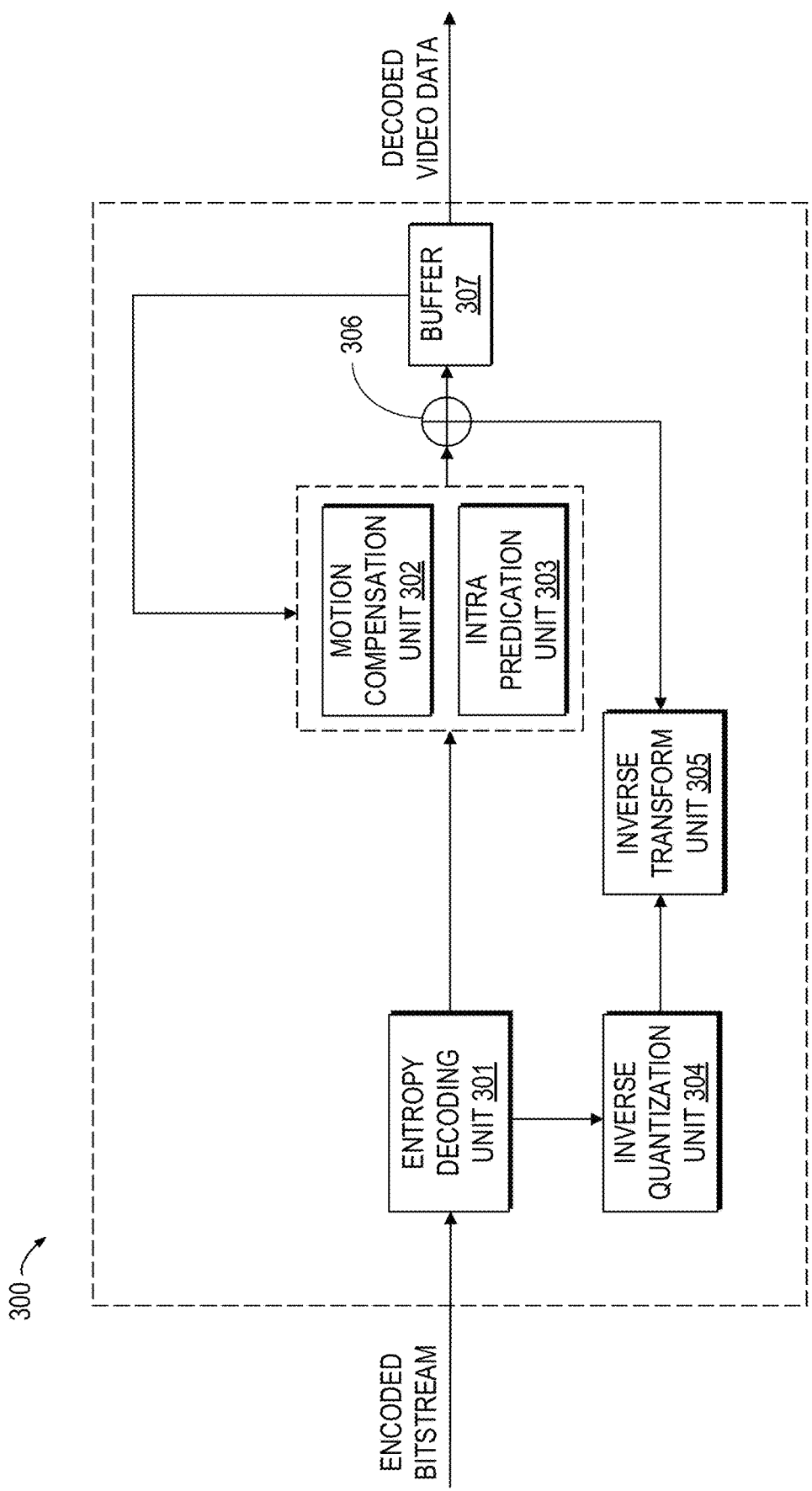
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video coding technologies. Specifically, it is about intra/IBC/inter prediction and related techniques in video coding. It may be applied to the existing video coding standard like HEVC, VVC, etc. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. The JVET meeting is concurrently held once every quarter, and the new video coding standard was officially named as Versatile Video Coding (VVC) in the April 2018 JVET meeting, and the first version of VVC test model (VTM) was released at that time. The VVC working draft and test model VTM are then updated after every meeting. The VVC project achieved technical completion (FDIS) at the July 2020 meeting.

2.1. Extended Merge Prediction

In VVC, the merge candidate list is constructed by including the following five types of candidates in order:

1) Spatial MVP from spatial neighbour CUs
2) Temporal MVP from collocated CUs
3) History-based MVP from an FIFO table
4) Pairwise average MVP
5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

Spatial Candidates Derivation

Figure 4:
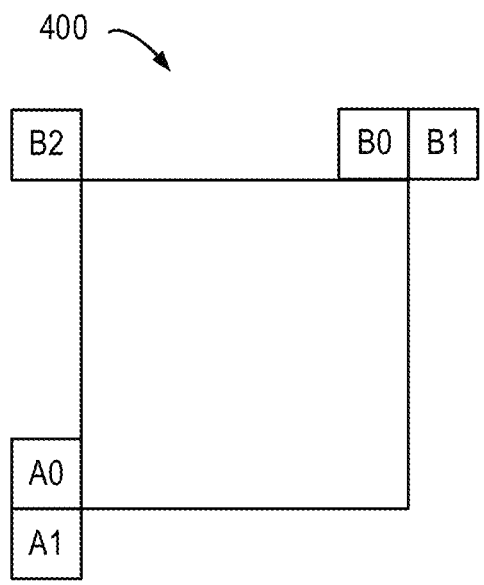
FIG. 4 illustrates a schematic diagram of positions of spatial merge candidates.
Figure 5:
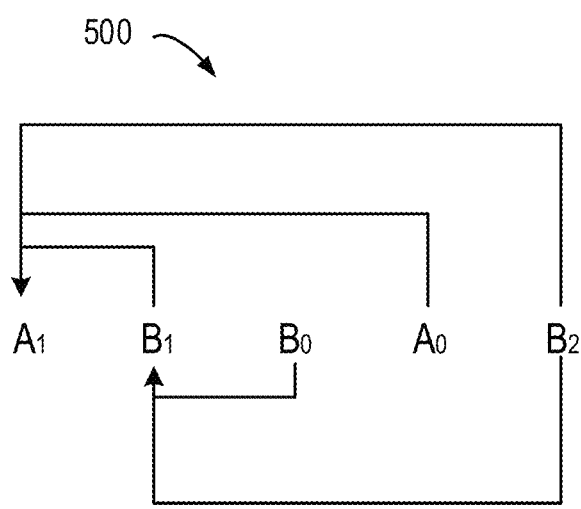
FIG. 5 illustrates a schematic diagram of candidate pairs considered for redundancy check of spatial merge candidates.

The derivation of spatial merge candidates in VVC is same to that in HEVC except the positions of first two merge candidates are swapped. FIG. 4 is a schematic diagram 400 illustrating positions of a spatial merge candidate. A maximum of four merge candidates are selected among candidates located in the positions depicted in FIG. 4. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. FIG. 5 is a schematic diagram 500 illustrating candidate pairs considered for redundancy check of spatial merge candidates. Instead only the pairs linked with an arrow in FIG. 5 are considered and a candidate is only added to the list if the corresponding candidate used for redundancy check has not the same motion information.

Temporal Candidates Derivation

Figure 6:
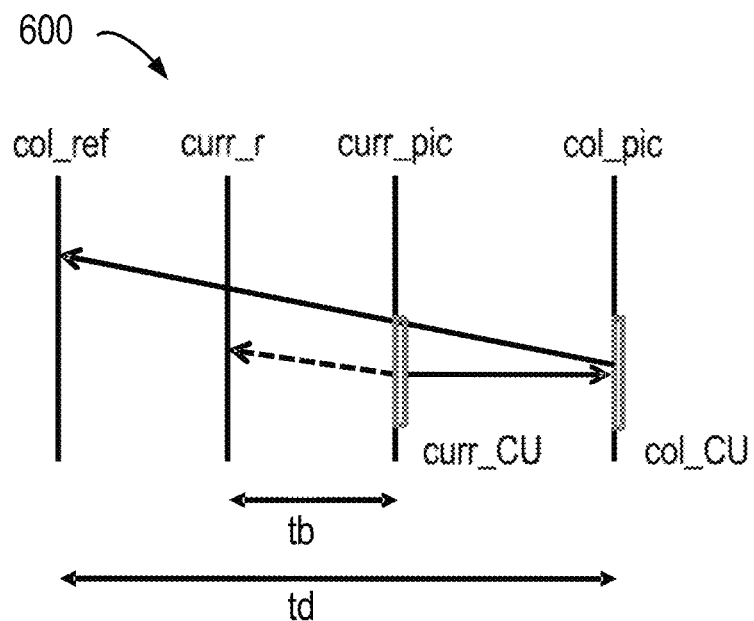
FIG. 6 illustrates a schematic diagram of motion vector scaling for temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. FIG. 6 illustrates a schematic diagram 600 of motion vector scaling for temporal merge candidate The scaled motion vector for temporal merge candidate is obtained as illustrated by the dotted line in the diagram 600 of FIG. 6, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 7:
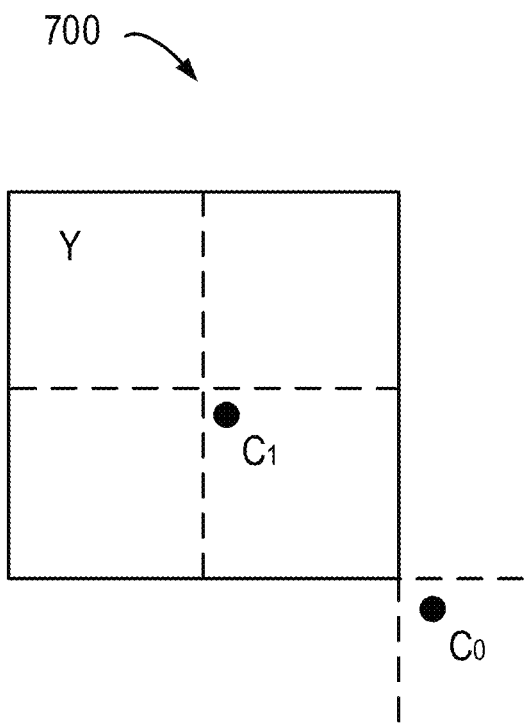
FIG. 7 illustrates a schematic diagram of candidate positions for temporal merge candidates, $C_0$ and $C_1$.

FIG. 7 is a schematic diagram 700 illustrating candidate positions for temporal merge candidate, $C_0$ and $C_1$. The position for the temporal candidate is selected between candidates $C_0$ and $C_1$, as depicted in FIG. 7. If CU at position $C_0$ is not available, is intra coded, or is outside of the current row of CTUs, position $C_1$ is used. Otherwise, position $C_0$ is used in the derivation of the temporal merge candidate.

History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. Number of HMPV candidates is used for merge list generation is set as (N<=4)? M: (8–N), wherein N indicates number of existing candidates in the merge list and M indicates number of available HMVP candidates in the table.
2. Once the total number of available merge candidates reaches the maximally allowed merge candidates minus 1, the merge candidate list construction process from HMVP is terminated.

Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

2.2. New Merge Candidates

Non-Adjacent Merge Candidates Derivation

Figure 8:
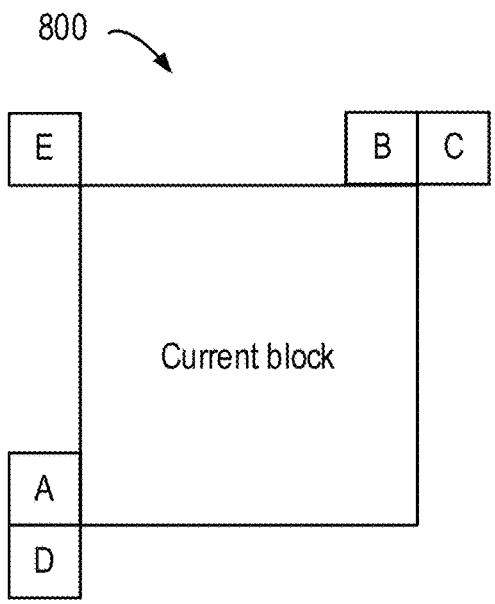
FIG. 8 illustrates a schematic diagram of VVC spatial neighboring blocks of the current block.

FIG. 8 illustrates a schematic diagram 800 of VVC spatial neighboring blocks of the current block. In VVC, five spatially neighboring blocks shown in FIG. 8 as well as one temporal neighbor are used to derive merge candidates.

It is proposed to derive the additional merge candidates from the positions non-adjacent to the current block using the same pattern as that in VVC. To achieve this, for each search round i, a virtual block is generated based on the current block as follows:

First, the relative position of the virtual block to the current block is calculated by:

$$\text{Offset } x = -i \times \text{grid } X, \text{Offset } y = -i \times \text{grid } Y$$

where the Offsetx and Offsety denote the offset of the top-left corner of the virtual block relative to the top-left corner of the current block, gridX and gridY are the width and height of the search grid.

Second, the width and height of the virtual block are calculated by:

$$\text{new Width} = i \times 2 \times \text{grid } X + curr\text{Width} \quad \text{new Height} = i \times 2 \times \text{grid } Y + curr\text{Height}.$$

where the currWidth and currHeight are the width and height of current block. The new Width and newHeight are the width and height of new virtual block.

gridX and gridY are currently set to currWidth and currHeight, respectively.

Figure 9:
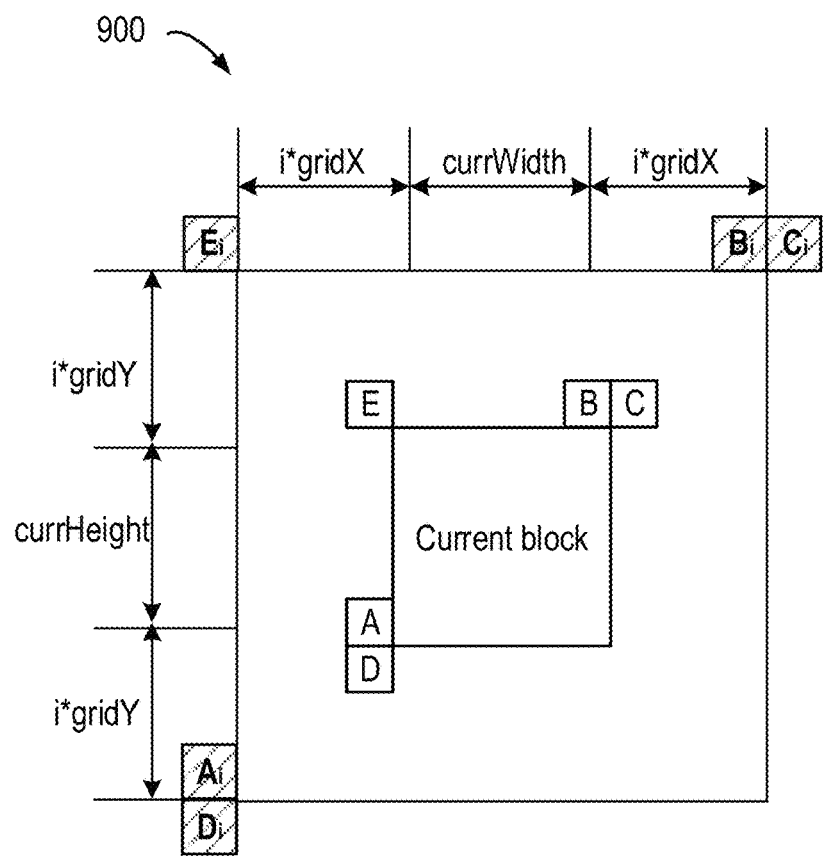
FIG. 9 illustrates a schematic diagram of a virtual block in a search round.

FIG. 9 illustrates a schematic diagram 900 of a virtual block in the ith search round, which shows the relationship between the virtual block and the current block.

After generating the virtual block, the blocks $A_i$, $B_i$, $C_i$, $D_i$ and $E_i$ can be regarded as the VVC spatial neighboring blocks of the virtual block and their positions are obtained with the same pattern as that in VVC. Obviously, the virtual block is the current block if the search round i is 0. In this case, the blocks $A_i$, $B_i$, $C_i$, $D_i$ and $E_i$ are the spatially neighboring blocks that are used in VVC merge mode.

When constructing the merge candidate list, the pruning is performed to guarantee each element in merge candidate list to be unique. The maximum search round is set to 1, which means that five non-adjacent spatial neighbor blocks are utilized.

Non-adjacent spatial merge candidates are inserted into the merge list after the temporal merge candidate in the order of $B_1 \to A_1 \to C_1 \to D_1 \to E_1$.

STMVP

It is proposed to derive an averaging candidate as STMVP candidate using three spatial merge candidates and one temporal merge candidate.

STMVP is inserted before the above-left spatial merge candidate. The STMVP candidate is pruned with all the previous merge candidates in the merge list. For the spatial candidates, the first three candidates in the current merge candidate list are used. For the temporal candidate, the same position as VTM/HEVC collocated position is used.

For the spatial candidates, the first, second, and third candidates inserted in the current merge candidate list before STMVP are denoted as F, S, and, T. The temporal candidate with the same position as VTM/HEVC collocated position used in TMVP is denoted as Col.

The motion vector of the STMVP candidate in prediction direction X (denoted as mvLX) is derived as follows:

1) If the reference indices of the four merge candidates are all valid and are all equal to zero in prediction direction X (X=0 or 1), $$mvLX = (mvLX\_F + mvLX\_S + mvLX\_T + mvLX\_Col) >> 2$$

2) If reference indices of three of the four merge candidates are valid and are equal to zero in prediction direction X (X=0 or 1), $$mvLX = (mvLX\_F \times 3 + mvLX\_S \times 3 + mvLX\_Col \times 2) >> 3 \text{ or}$$
$$mvLX = (mvLX\_F \times 3 + mvLX\_T \times 3 + mvLX\_Col \times 2) >> 3 \text{ or}$$
$$mvLX = (mvLX\_S \times 3 + mvLX\_T \times 3 + mvLX\_Col \times 2) >> 3$$

3) If reference indices of two of the four merge candidates are valid and are equal to zero in prediction direction X (X=0 or 1), $$mvLX = (mvLX\_F + mvLX\_Col) >> 1 \text{ or}$$
$$mvLX = (mvLX\_S + mvLX\_Col) >> 1 \text{ or}$$
$$mvLX = (mvLX\_T + mvLX\_Col) >> 1$$

Note: If the temporal candidate is unavailable, the STMVP mode is off.

Merge List Size

If considering both non-adjacent and STMVP merge candidates, the size of merge list is signalled in sequence parameter set header and the maximum allowed size of merge list is increased (e.g. 8).

2.3. Merge Mode with MVD (MMVD)

In addition to merge mode, where the implicitly derived motion information is directly used for prediction samples generation of the current CU, the merge mode with motion vector differences (MMVD) is introduced in VVC, which is also known as ultimate motion vector expression. A MMVD flag is signaled right after sending a skip flag and merge flag to specify whether MMVD mode is used for a CU.

In MMVD, a merge candidate (which is called, base merge candidate) is selected, it is further refined by the signalled MVD information. The related syntax elements include an index to specify MVD distance (denoted by mmvd_distance_idx), and an index for indication of motion direction (denoted by mmvd_direction_idx). In MMVD mode, one for the first two candidates in the merge list is selected to be used as MV basis (or base merge candidate). The merge candidate flag is signalled to specify which one is used.

Figure 10:
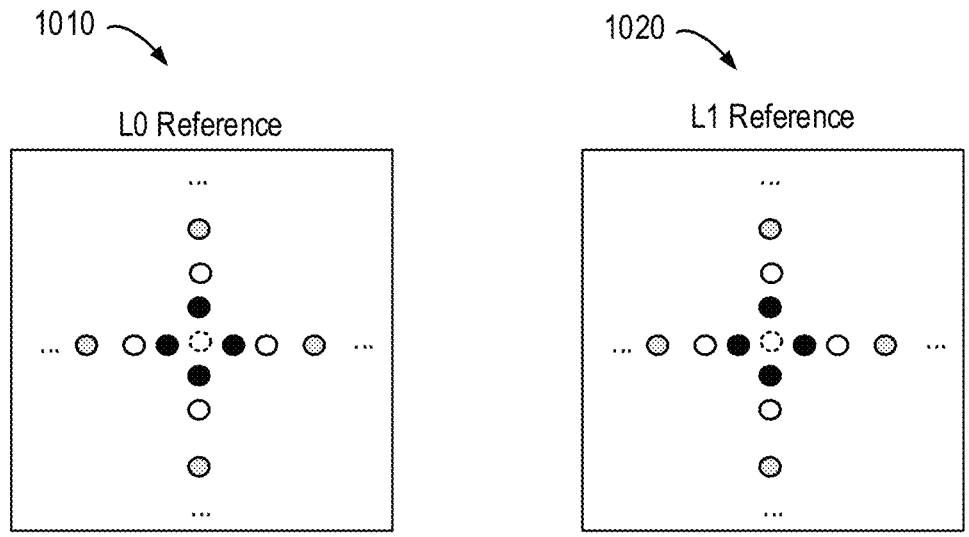
FIG. 10 illustrates a schematic diagram of MMVD search point.

Distance index specifies motion magnitude information and indicate the pre-defined offset from the starting point. FIG. 10 illustrates a schematic diagram of MMVD search point. As shown in FIG. 10, an offset is added to either horizontal component or vertical component of starting MV. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table 1. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 1 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 2 specifies the sign of MV offset added to the list0 MV component of starting MV and the sign for the list1 MV has opposite value.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

Derivation of MVD for Each Reference Picture List

One internal MVD (denoted by MmvdOffset) is firstly derived according to the decoded indices of MVD distance (denoted by mmvd_distance_idx), and motion direction (denoted by mmvd_direction_idx).

Afterwards, if the internal MVD is determined, the final MVD to be added to the base merge candidate for each reference picture list is further derived according to POC distances of reference pictures relative to the current picture, and reference picture types (long-term or short-term). More specifically, the following steps are performed in order:

If the base merge candidate is bi-prediction, the POC distance between current picture and reference picture in list 0, and the POC distance between current picture and reference picture in list 1 is calculated, denoted by POCDiffL0, and POCDidffL1, respectively.

If POCDiffL0 is equal to POCDidffL1, the final MVD for two reference picture lists are both set to the internal MVD.

Otherwise, if Abs(POCDiffL0) is greater than or equal to Abs(POCDiffL1), the final MVD for reference picture list 0 is set to the internal MVD, and the final MVD for reference picture list 1 is set to the scaled MVD using the internal MVD reference picture types of the two reference pictures (both are not long-term reference pictures) or the internal MVD or (zero MV minus the internal MVD) depending on the POC distances.

Otherwise, if Abs(POCDiffL0) is smaller than Abs(POCDiffL1), the final MVD for reference picture list 1 is set to the internal MVD, and the final MVD for reference picture list 0 is set to the scaled MVD using the internal MVD reference picture types of the two reference pictures (both are not long-term reference pictures) or the internal MVD or (zero MV minus the internal MVD) depending on the POC distances.

If the base merge candidate is uni-prediction from reference picture list X, the final MVD for reference picture list X is set to the internal MVD, and the final MVD for reference picture list Y (Y=1−X) is set to 0.

MMVD is also known as Ultimate Motion Vector Expression (UMVE).

2.4. Combined Inter and Intra Prediction (CIIP)

Figure 11:
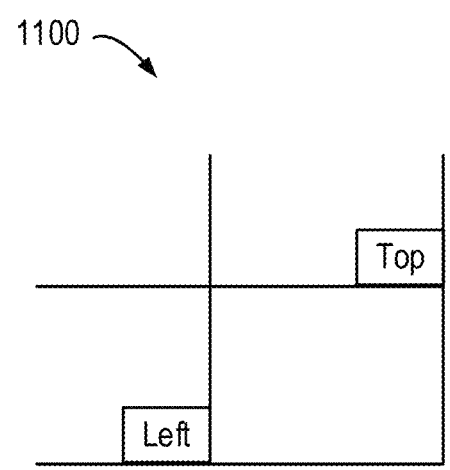
FIG. 11 illustrates a schematic diagram of top and left neighboring blocks used in CIIP weight derivation.

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in FIG. 11 which illustrates a schematic diagram 1100 of top and left neighboring blocks used in CIIP weight derivation) as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntraTop) is equal to 1, then wt is set to 2;

Otherwise, set wt to 1.

The CIIP prediction is formed as follows:

$$P_{CIIP} = ((4-wt)*P_{inter} + wt*P_{intra} + 2) \gg 2$$

2.5. Geometric Partitioning Mode (GPM)

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m$×$2^n$ with m, n∈{3 . . . 6} excluding 8×64 and 64×8.

Figures 12, 13:
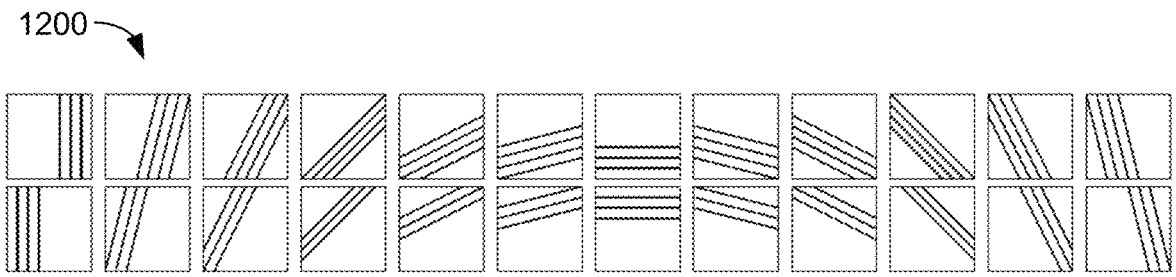
FIG. 12 illustrates examples of the GPM splits grouped by identical angles.
FIG. 13 illustrates a schematic diagram of uni-prediction MV selection for geometric partitioning mode.

When this mode is used, a CU is split into two parts by a geometrically located straight line (as shown in FIG. 12). FIG. 12 illustrates examples of the GPM splits grouped by identical angles. The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. The uni-prediction motion for each partition is derived using the process described in 2.5.1.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights as in 2.5.2. This is the prediction signal for the whole CU, and transform and quantization process will be applied to the whole CU as in other prediction modes. Finally, the motion field of a CU predicted using the geometric partition modes is stored as in 2.5.3.

2.5.1 Uni-Prediction Candidate List Construction

The uni-prediction candidate list is derived directly from the merge candidate list constructed according to the extended merge prediction process in 2.1. FIG. 13 illustrates a schematic diagram of uni-prediction MV selection for geometric partitioning mode. Denote n as the index of the uni-prediction motion in the geometric uni-prediction candidate list 1310. The LX motion vector of the n-th extended merge candidate, with X equal to the parity of n, is used as the n-th uni-prediction motion vector for geometric partitioning mode. These motion vectors are marked with "x" in FIG. 13. In case a corresponding LX motion vector of the n-the extended merge candidate does not exist, the L(1−X) motion vector of the same candidate is used instead as the uni-prediction motion vector for geometric partitioning mode.

2.5.2 Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x, y) to the partition edge are derived as:

$$d(x, y) = (2x + 1 - w)\cos(\varphi_i) + (2y + 1 - h)\sin(\varphi_i) - \rho_j \quad (2\text{-}1)$$

$$\rho_j = \rho_{x,j}\cos(\varphi_i) + \rho_{y,j}\sin(\varphi_i) \quad (2\text{-}2)$$

$$\rho_{x,j} = \begin{cases} 0 & i\ \%\ 16 = 8\ \text{or}\ (i\ \%\ 16 \neq 0\ \text{and}\ h \geq w) \\ \pm(j \times w) \gg 2 & \text{otherwise} \end{cases} \quad (2\text{-}3)$$

-continued $$\rho_{y,j} = \begin{cases} \pm(j \times h) \gg 2 & i \% 16 = 8 \text{ or } (i \% 16 \neq 0 \text{ and } h \geq w) \\ 0 & \text{otherwise} \end{cases} \quad (2-4)$$

where i, j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following:

$$wIdxL(x, y) = \text{part}Idx \text{ ? } 32 + d(x, y): 32 - d(x, y) \quad (2-5)$$

$$w_0(x, y) = \frac{\text{Clip } 3(0, 8, (wIdxL(x, y) + 4) \gg 3)}{8} \quad (2-6)$$

$$w_1(x, y) = 1 - w_0(x, y) \quad (2-7)$$

Figure 14:
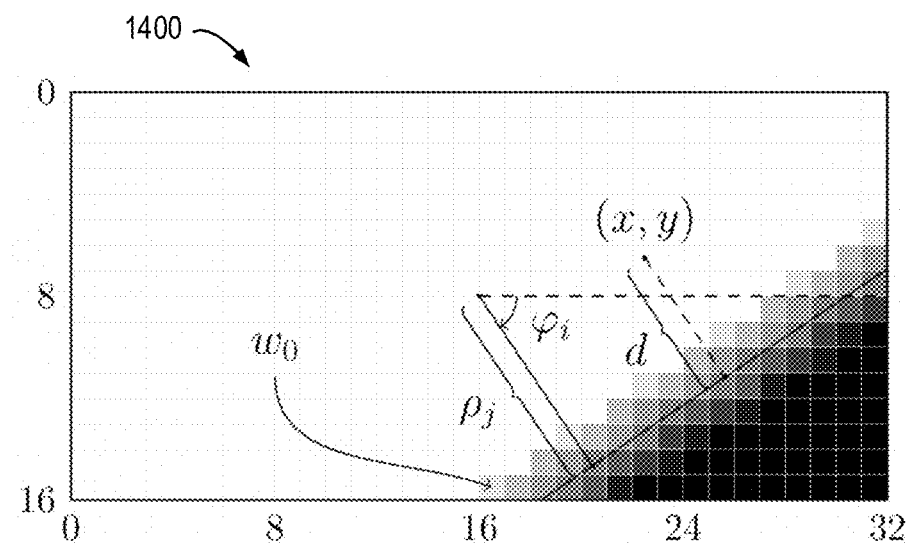
FIG. 14 illustrates a schematic diagram of exemplified generation of a bending weight $w_0$ using geometric partitioning mode.

The partIdx depends on the angle index i. One example of weigh $w_0$ is illustrated in FIG. 14. FIG. 14 illustrates a schematic diagram 1400 of exemplified generation of a bending weight w0 using geometric partitioning mode 2.5.3 Motion Field Storage for Geometric Partitioning Mode Mv1 from the first part of the geometric partition, Mv2 from the second part of the geometric partition and a combined Mv of Mv1 and Mv2 are stored in the motion filed of a geometric partitioning mode coded CU.

The stored motion vector type for each individual position in the motion filed are determined as:

$$s\text{Type} = \text{abs (motion } Idx) < 32 \text{ ? } 2: (\text{motion } Idx \leq 0 \text{?} \quad (2-8)$$

$$(1 - \text{part } Idx): \text{part } Idx)$$

where motionIdx is equal to d(4x+2, 4y+2), which is recalculated from equation (2-1). The partIdx depends on the angle index i.

If sType is equal to 0 or 1, Mv0 or Mv1 are stored in the corresponding motion field, otherwise if sType is equal to 2, a combined Mv from Mv0 and Mv2 are stored. The combined Mv are generated using the following process:

1) If Mv1 and Mv2 are from different reference picture lists (one from L0 and the other from L1), then Mv1 and Mv2 are simply combined to form the bi-prediction motion vectors.
2) Otherwise, if Mv1 and Mv2 are from the same list, only uni-prediction motion Mv2 is stored.

2.6. Triangle Partition for Inter Prediction

In VVC, a triangle partition mode (TPM) is supported for inter prediction. The triangle partition mode is only applied to CUs that are 8×8 or larger. The triangle partition mode is signalled using a CU-level flag as one kind of merge mode, with other merge modes including the regular merge mode, the MMVD mode, the CIIP mode and the subblock merge mode.

Figure 15:
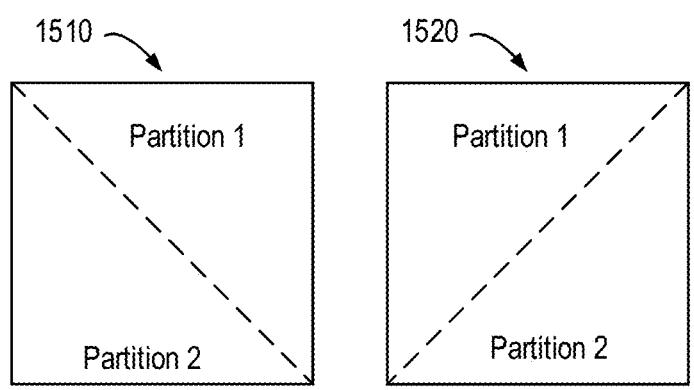
FIG. 15 illustrates a schematic diagram of triangle partition based inter prediction.

When this mode is used, a CU is split evenly into two triangle-shaped partitions, using either the diagonal split or the anti-diagonal split (as shown in FIG. 15). FIG. 15 illustrates a schematic diagram of triangle partition based inter prediction. Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU. The uni-prediction motion for each partition is derived using the process described in 2.6.1.

If triangle partition mode is used for the current CU, then a flag indicating the direction of the triangle partition (diagonal or anti-diagonal), and two merge indices (one for each partition) are further signalled. The number of maximum TPM candidate size is signalled explicitly at slice level and specifies syntax binarization for TMP merge indices. After predicting each of the triangle partitions, the sample values along the diagonal or anti-diagonal edge are adjusted using a blending processing with adaptive weights. This is the prediction signal for the whole CU, and transform and quantization process will be applied to the whole CU as in other prediction modes. Finally, the motion field of a CU predicted using the triangle partition mode is stored as in 2.6.3.

The triangle partition mode is not used in combination with SBT, that is, when the signalled triangle mode is equal to 1, the cu_sbt_flag is inferred to be 0 without signalling.

2.6.1 Uni-Prediction Candidate List Construction

The uni-prediction candidate list is derived directly from the merge candidate list constructed according to the extended merge prediction process in 2.1. Denote n as the index of the uni-prediction motion in the triangle uni-prediction candidate list. The LX motion vector of the n-th extended merge candidate, with X equal to the parity of n, is used as the n-th uni-prediction motion vector for triangle partition mode. FIG. 16 illustrates a schematic diagram of uni-prediction MV selection for triangle partition mode. These motion vectors are marked with "x" in FIG. 16. In case a corresponding LX motion vector of the n-the extended merge candidate does not exist, the L(1−X) motion vector of the same candidate is used instead as the uni-prediction motion vector for triangle partition mode.

2.6.2 Blending Along the Triangle Partition Edge

After predicting each triangle partition using its own motion, blending is applied to the two prediction signals to derive samples around the diagonal or anti-diagonal edge. The following weights are used in the blending process:

7/8, 6/8, 5/8, 4/8, 3/8, 2/8, 1/8} for luma and {6/8, 4/8, 2/8} for chroma, as shown in the weight map 1710 and the weight map 1720 of FIG. 17, respectively. FIG. 17 illustrates a schematic diagram of weights used in the blending process.

2.6.3 Motion Field Storage

The motion vectors of a CU coded in triangle partition mode are generated using the following process:

1) If Mv1 and Mv2 are from different reference picture lists (one from L0 and the other from L1), then Mv1 and Mv2 are simply combined to form the bi-prediction motion vector.
2) Otherwise, if Mv1 and Mv2 are from the same list, only uni-prediction motion Mv2 is stored.

2.7. Template Matching Based Adaptive Merge Candidate Reorder

To improve the coding efficiency, after the merge candidate list is constructed, the order of each merge candidate is adjusted according to the template matching cost. The merge candidates are arranged in the list in accordance with the template matching cost of ascending order. It is operated in the form of sub-group.

Figure 18:
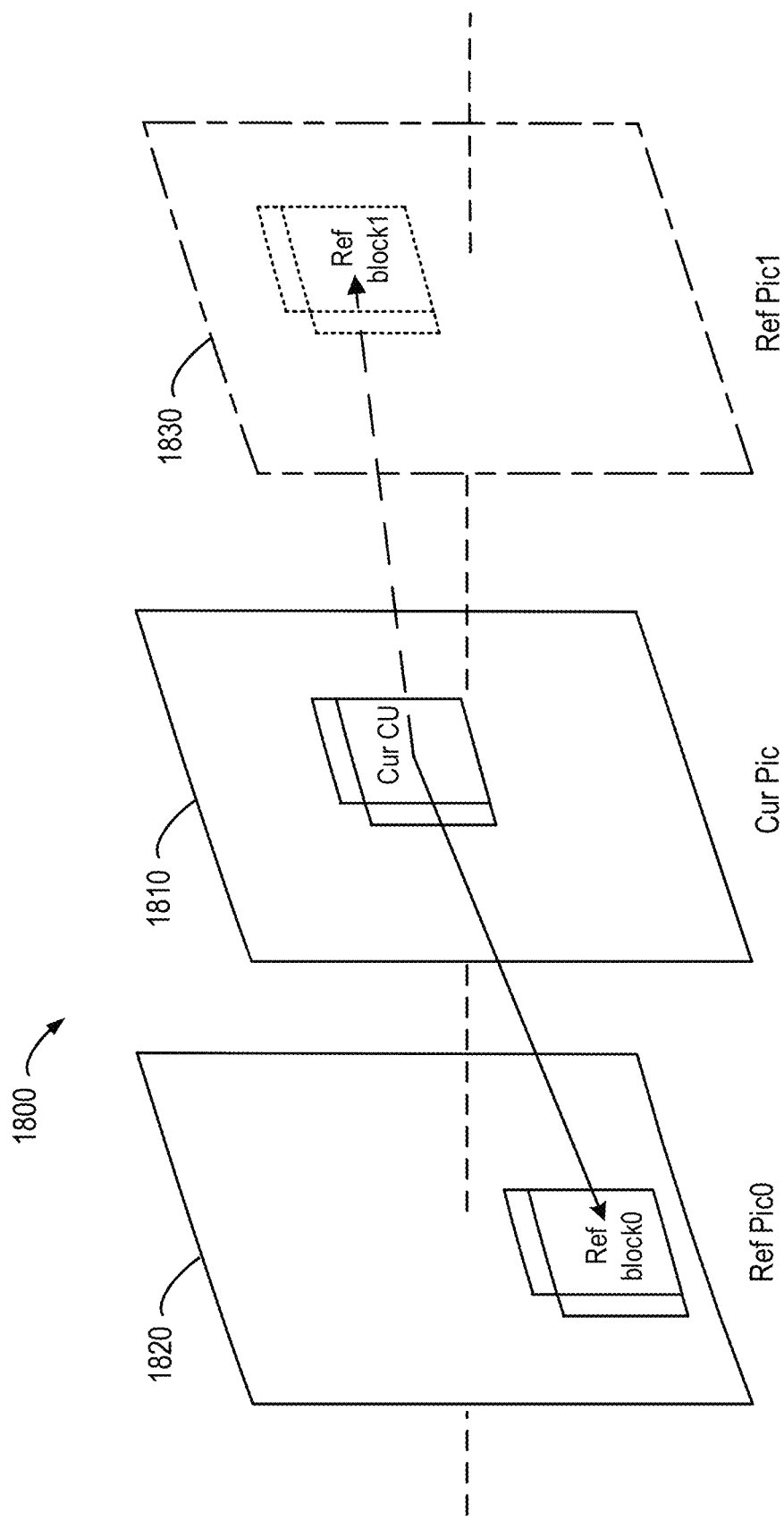
FIG. 18 illustrates a schematic diagram of neighboring samples used for calculating SAD.
Figure 19:
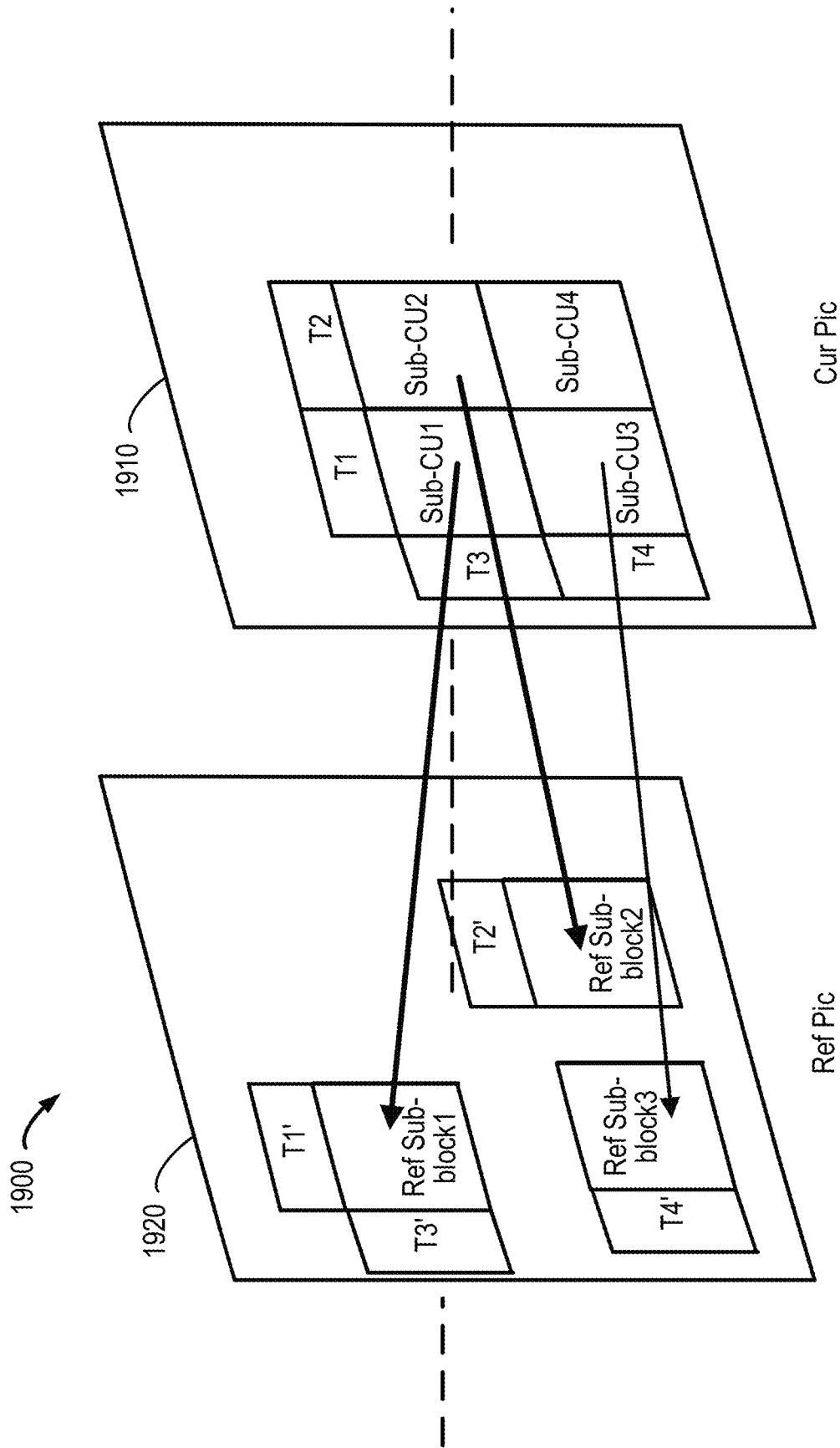
FIG. 19 illustrates a schematic diagram of neighboring samples used for calculating SAD for sub-CU level motion information.

FIG. 18 illustrates a schematic diagram 1800 of neighboring samples used for calculating SAD (Sum of absolute differences). The template matching cost is measured by the SAD between the neighbouring samples of the current CU in the current picture 1810 and their corresponding reference samples. If a merge candidate includes bi-predictive motion information, the corresponding reference samples are the average of the corresponding reference samples in reference list0 1820 and the corresponding reference samples in reference list1 1830, as illustrated in FIG. 18. If a merge candidate includes sub-CU level motion information, the corresponding reference samples for a current CU in a current picture 1910 consist of the neighbouring samples of the corresponding reference sub-blocks in a reference picture 1920, as illustrated in FIG. 19. FIG. 19 illustrates a schematic diagram 1900 of neighboring samples used for calculating SAD for sub-CU level motion information.

Figure 20:
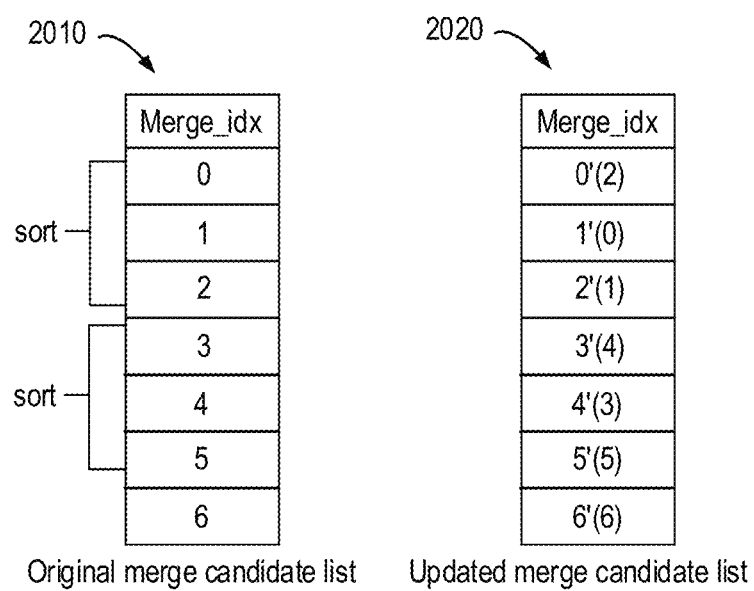
FIG. 20 illustrates a schematic diagram of the sorting process.

FIG. 20 illustrates a schematic diagram of the sorting process. The sorting process is operated in the form of sub-group, as illustrated in FIG. 20. The first three merge candidates are sorted together. The following three merge candidates are sorted together. As shown in FIG. 20, an original merge candidate list 2010 is sorted to obtain an updated merge candidate list 2020. In this example, the template size (width of the left template or height of the above template) is 1, and the sub-group size is 3.

2.8. Local Illumination Compensation (LIC)

Figure 21:
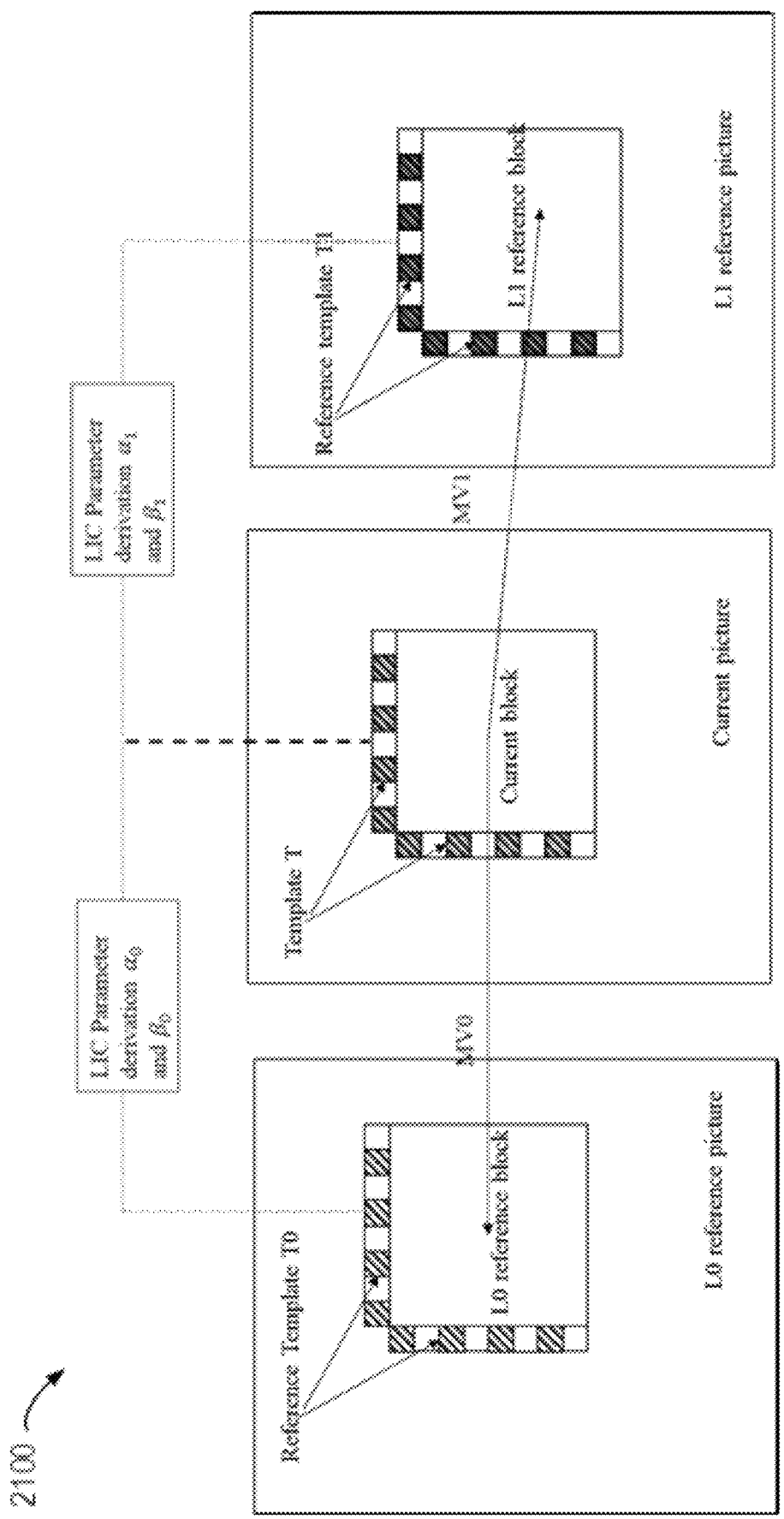
FIG. 21 illustrates a schematic diagram of local illumination compensation.

Local illumination compensation (LIC) is a coding tool to address the issue of local illumination changes between current picture and its temporal reference pictures. The LIC is based on a linear model where a scaling factor and an offset are applied to the reference samples to obtain the prediction samples of a current block. Specifically, the LIC can be mathematically modeled by the following equation:

$$P(x, y) = \alpha \cdot P_r(x + v_x, y + v_y) + \beta$$

where P(x, y) is the prediction signal of the current block at the coordinate (x, y); $P_r(x+v_x, y+v_y)$ is the reference block pointed by the motion vector ($v_x$, $v_y$); α and β are the corresponding scaling factor and offset that are applied to the reference block. FIG. 21 illustrates the LIC process 2100. In FIG. 21, when the LIC is applied for a block, a least mean square error (LMSE) method is employed to derive the values of the LIC parameters (i.e., α and β) by minimizing the difference between the neighboring samples of the current block (i.e., the template T in FIG. 21) and their corresponding reference samples in the temporal reference pictures (i.e., either T0 or T1 in FIG. 21). Additionally, to reduce the computational complexity, both the template samples and the reference template samples are subsampled (adaptive subsampling) to derive the LIC parameters, i.e., only the shaded samples in FIG. 21 are used to derive α and β.

Figure 22:
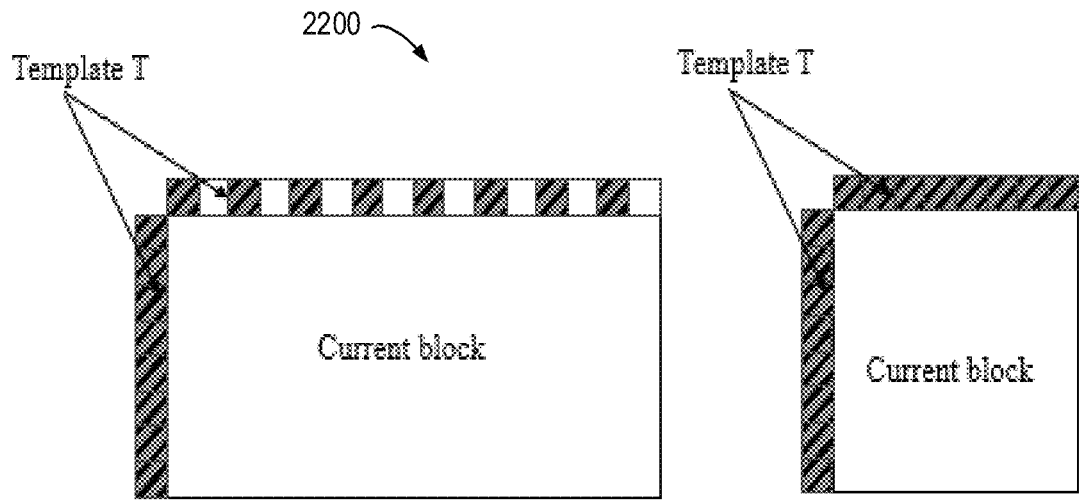
FIG. 22 illustrates a schematic diagram of no subsampling for the short side.

To improve the coding performance, no subsampling for the short side is performed as shown in FIG. 22. FIG. 22 illustrates a schematic diagram 2200 of no subsampling for the short side.

2.9. Bi-Prediction with CU-Level Weight (BCW)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi-pred} = ((8 - w) * P_0 + w * P_1 + 4) \gg 3$$

Five weights are allowed in the weighted averaging bi-prediction, w∈{−2, 3, 4, 5, 10}. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights (w∈{3,4,5}) are used.

At the encoder, fast search algorithms are applied to find the weight index without significantly increasing the encoder complexity. These algorithms are summarized as follows. For further details readers are referred to the VTM software and document JVET-L0646. When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g. equal weight.

2.10. Subblock-Based Temporal Motion Vector Prediction (SbTMVP)

VVC supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTMVP. SbTMVP differs from TMVP in the following two main aspects:

TMVP predicts motion at CU level but SbTMVP predicts motion at sub-CU level;

Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 23A:
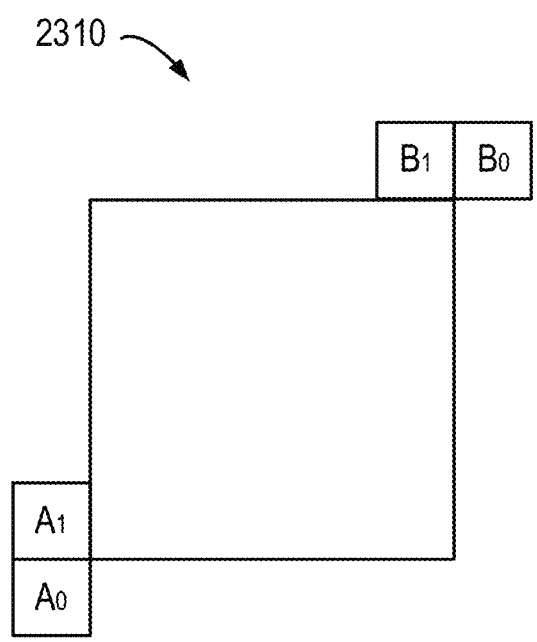
FIG. 23A illustrates a schematic diagram of spatial neighboring blocks used by SbTMVP.
Figure 23B:
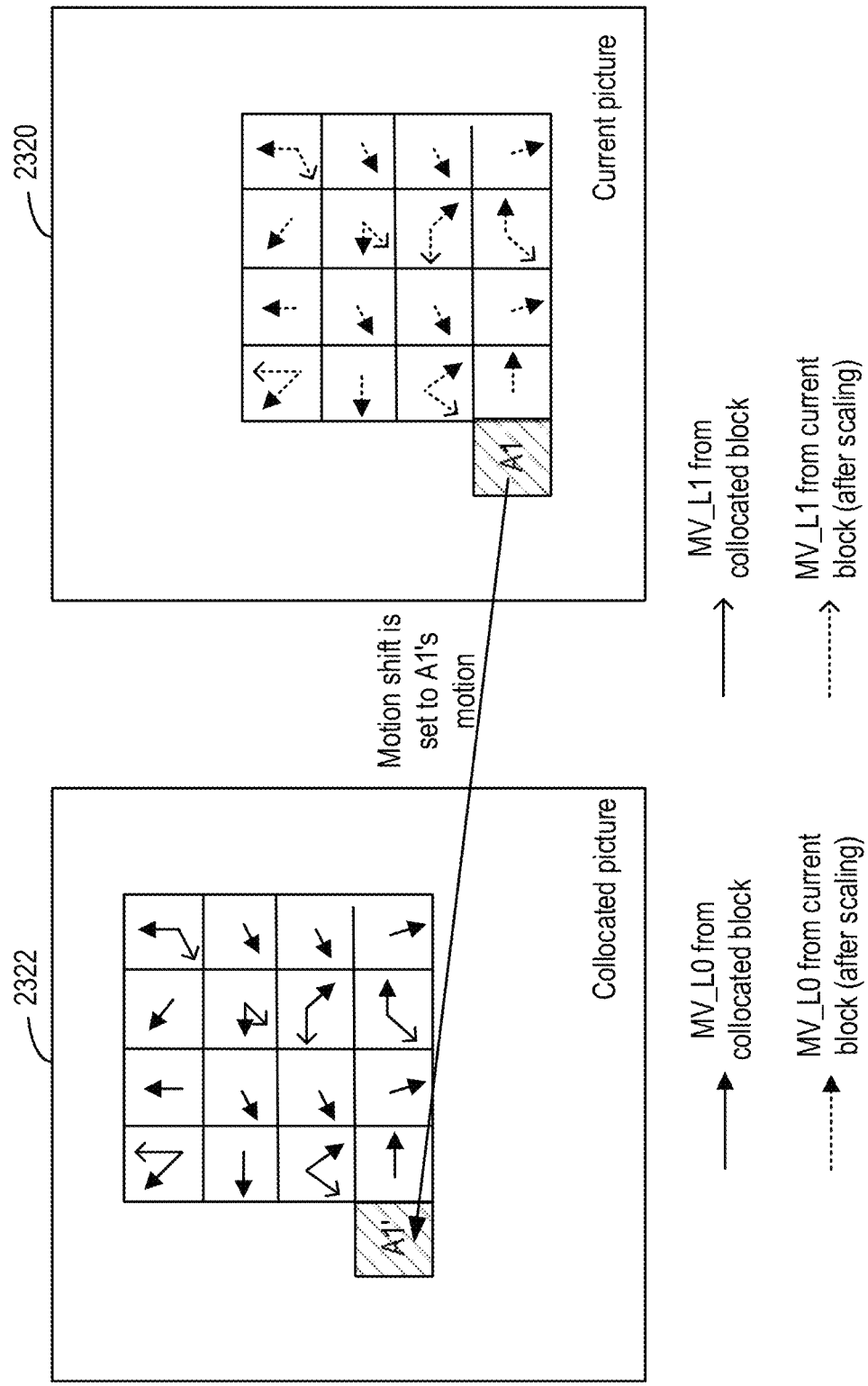
FIG. 23B illustrates a schematic diagram of driving sub-CU motion field by applying a motion shift from spatial neighbor and scaling the motion information from the corresponding collocated sub-CUs.

The SbTMVP process is illustrated in FIG. 23A and FIG. 23B. FIG. 23A illustrates a schematic diagram 2310 of spatial neighboring blocks used by SbTMVP. SbTMVP predicts the motion vectors of the sub-CUs within the current CU in two steps. In the first step, the spatial neighbor A1 in FIG. 23A is examined. If A1 has a motion vector that uses the collocated picture as its reference picture, this motion vector is selected to be the motion shift to be applied. If no such motion is identified, then the motion shift is set to (0, 0).

FIG. 23B illustrates a schematic diagram of driving sub-CU motion field by applying a motion shift from spatial neighbor and scaling the motion information from the corresponding collocated sub-CUs. In the second step, the motion shift identified in Step 1 is applied (i.e. added to the coordinates of the current block in the current picture 2320) to obtain sub-CU-level motion information (motion vectors and reference indices) from the collocated picture 2322 as shown in FIG. 23B. The example in FIG. 23B assumes the motion shift is set to block A1's motion. Then, for each sub-CU, the motion information of its corresponding block (the smallest motion grid that covers the center sample) in the collocated picture 2322 is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VVC, a combined subblock based merge list which contains both SbTMVP candidate and affine merge candidates is used for the signalling of subblock based merge mode. The SbTMVP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signalled in SPS and the maximum allowed size of the subblock based merge list is 5 in VVC.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.

2.11. Affine Motion Compensated Prediction

Figure 24:
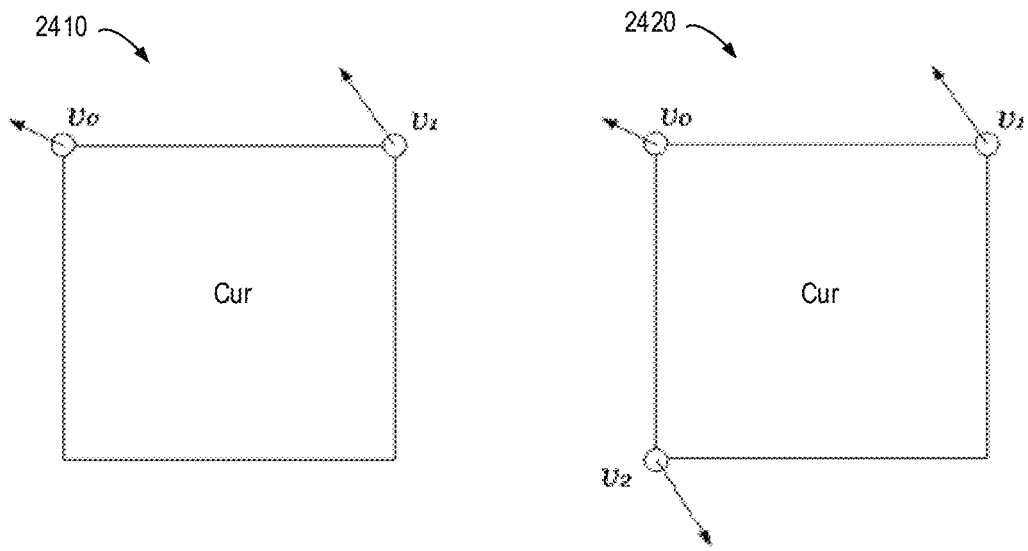
FIG. 24 illustrates a schematic diagram of control point based affine motion model.

In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. FIG. 24 illustrates a schematic diagram of control point based affine motion model. As shown FIG. 24, the affine motion field of the block is described by motion information of two control point (4-parameter) or three control point motion vectors (6-parameter).

For the 4-parameter affine motion model 2410 in FIG. 24, motion vector at sample location (x, y) in a block is derived as:

$$\begin{cases} mv_x = \frac{mv_{1x} - mv_{0x}}{W}x + \frac{mv_{0y} - mv_{1y}}{W}y + mv_{0x} \\ mv_y = \frac{mv_{1y} - mv_{0y}}{W}x + \frac{mv_{1x} - mv_{0x}}{W}y + mv_{0y} \end{cases}$$

For the 6-parameter affine motion model 2420 in FIG. 24, motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases}$$

Where ($mv_{0x}$, $mv_{0y}$) is motion vector of the top-left corner control point, ($mv_{1x}$, $mv_{1y}$) is motion vector of the top-right corner control point, and ($mv_{2x}$, $mv_{2y}$) is motion vector of the bottom-left corner control point.

Figure 25:
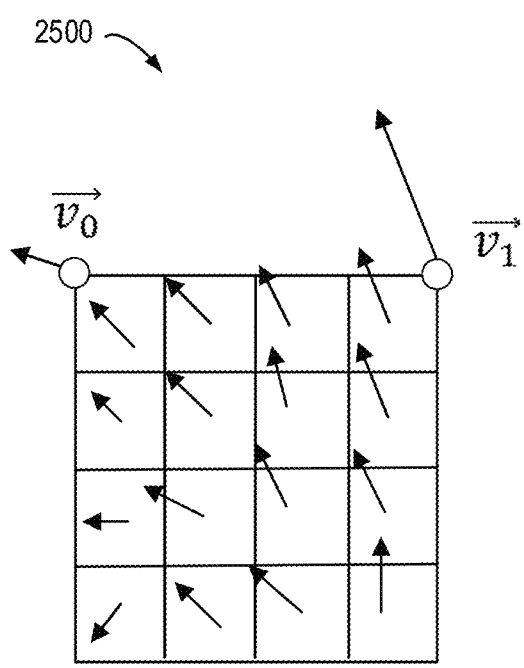
FIG. 25 illustrates a schematic diagram of affine MVF per subblock.

In order to simplify the motion compensation prediction, block based affine transform prediction is applied. FIG. 25 illustrates a schematic diagram 2500 of affine MVF per subblock. To derive motion vector of each 4×4 luma subblock, the motion vector of the center sample of each subblock, as shown in FIG. 25, is calculated according to above equations, and rounded to 1/16 fraction accuracy. Then the motion compensation interpolation filters are applied to generate the prediction of each subblock with derived motion vector. The subblock size of chroma-components is also set to be 4×4. The MV of a 4×4 chroma subblock is calculated as the average of the MVs of the top-left and bottom-right luma subblocks in the collocated 8×8 luma region.

As done for translational motion inter prediction, there are also two affine motion inter prediction modes: affine merge mode and affine AMVP mode.

Affine Merge Prediction

Figure 26:
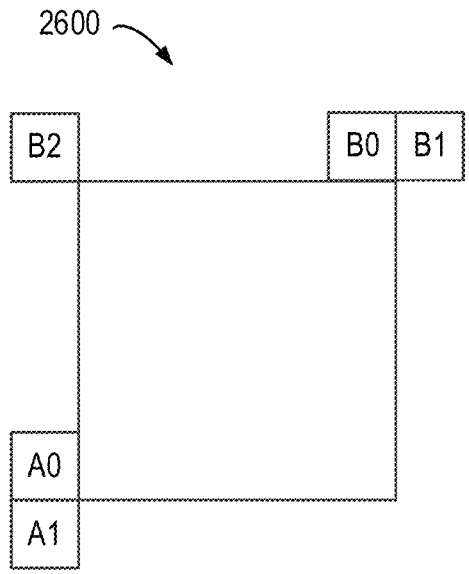
FIG. 26 illustrates a schematic diagram of locations of inherited affine motion predictors.
Figure 27:
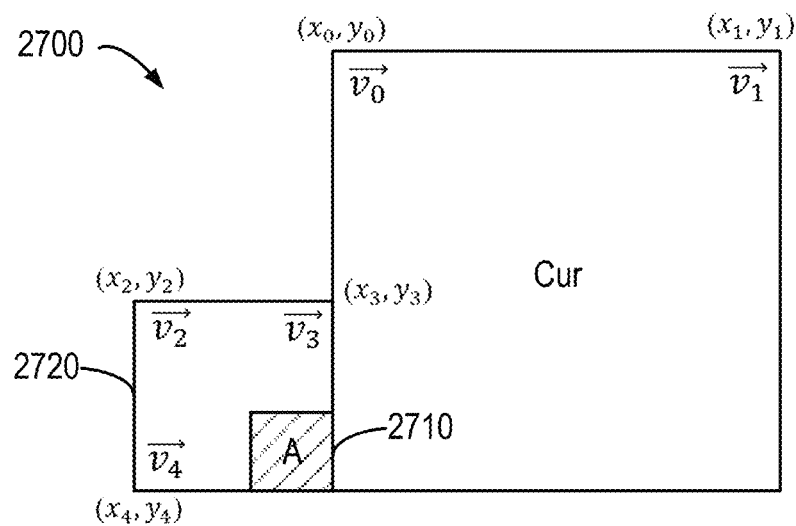
FIG. 27 illustrates a schematic diagram of control point motion vector inheritance.

AF_MERGE mode can be applied for CUs with both width and height larger than or equal to 8. In this mode the CPMVs of the current CU is generated based on the motion information of the spatial neighboring CUs. There can be up to five CPMVP candidates and an index is signalled to indicate the one to be used for the current CU. The following three types of CPVM candidate are used to form the affine merge candidate list:

Inherited affine merge candidates that extrapolated from the CPMVs of the neighbour CUs Constructed affine merge candidates CPMVPs that are derived using the translational MVs of the neighbour CUs Zero MVs In VVC, there are maximum two inherited affine candidates, which are derived from affine motion model of the neighboring blocks, one from left neighboring CUs and one from above neighboring CUs. FIG. 26 illustrates a schematic diagram 2600 of locations of inherited affine motion predictors. The candidate blocks are shown in FIG. 26. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derive the CPMVP candidate in the affine merge list of the current CU. FIG. 27 illustrates a schematic diagram of control point motion vector inheritance. As shown in FIG. 27, if the neighbour left bottom block A 2710 is coded in affine mode, the motion vectors $v_2$, $v_3$ and $v_4$ of the top left corner, above right corner and left bottom corner of the CU 2720 which contains the block A 2710 are attained. When block A 2710 is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Constructed affine candidate means the candidate is constructed by combining the neighbor translational motion information of each control point. The motion information for the control points is derived from the specified spatial neighbors and temporal neighbor shown in FIG. 28 which illustrates a schematic diagram 2800 of locations of candidates position for constructed affine merge mode. $CPMV_k$ (k=1, 2, 3, 4) represents the k-th control point. For $CPMV_1$, the B2→B3→A2 blocks are checked and the MV of the first available block is used. For $CPMV_2$, the B1→B0 blocks are checked and for $CPMV_3$, the A1→A0 blocks are checked. TMVP is used as $CPMV_4$ if it's available.

After MVs of four control points are attained, affine merge candidates are constructed based on those motion information. The following combinations of control point MVs are used to construct in order:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

Affine AMVP Prediction

Affine AMVP mode can be applied for CUs with both width and height larger than or equal to 16. An affine flag in CU level is signalled in the bitstream to indicate whether affine AMVP mode is used and then another flag is signalled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:

Inherited affine AMVP candidates that extrapolated from the CPMVs of the neighbour CUs
  Constructed affine AMVP candidates CPMVPs that are derived using the translational MVs of the neighbour CUs
  Translational MVs from neighboring CUs
  Zero MVs The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Figure 28:
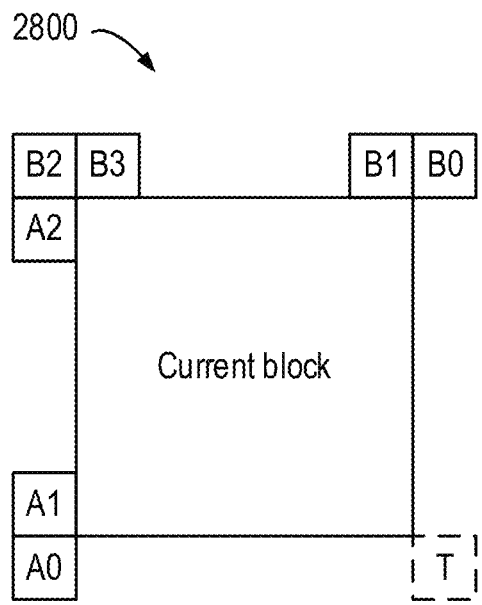
FIG. 28 illustrates a schematic diagram of locations of candidates position for constructed affine merge mode.

Constructed AMVP candidate is derived from the specified spatial neighbors shown in FIG. 28. The same checking order is used as done in affine merge candidate construction. In addition, reference picture index of the neighboring block is also checked. The first block in the checking order that is inter coded and has the same reference picture as in current CUs is used. There is only one. When the current CU is coded with 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If the number of affine AMVP list candidates is still less than 2 after valid inherited affine AMVP candidates and constructed AMVP candidate are inserted, $mv_0$, $mv_1$ and $mv_2$ will be added, in order, as the translational MVs to predict all control point MVs of the current CU, when available. Finally, zero MVs are used to fill the affine AMVP list if it is still not full.

2.12. Template Matching (TM)

Figure 29:
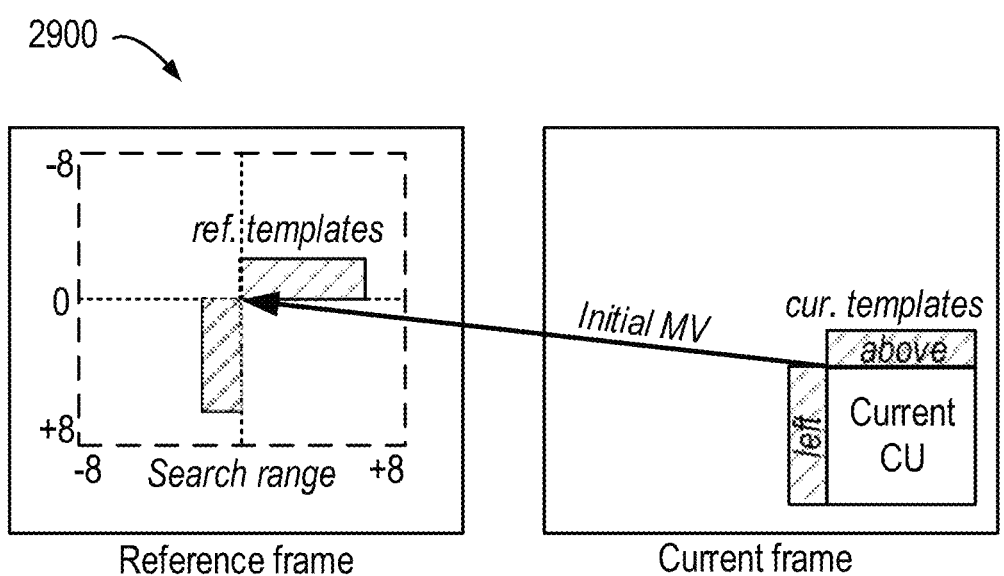
FIG. 29 illustrates a schematic diagram of template matching performed on a search area around initial MV.

Template matching (TM) is a decoder-side MV derivation method to refine the motion information of the current CU by finding the closest match between a template (i.e., top and/or left neighbouring blocks of the current CU) in the current picture and a block (i.e., same size to the template) in a reference picture. FIG. 29 illustrates a schematic diagram 2900 of template matching performed on a search area around initial MV. As illustrated in FIG. 29, a better MV is to be searched around the initial motion of the current CU within a [−8, +8]-pel search range. The template matching that was previously proposed is adopted in this contribution with two modifications: search step size is determined based on AMVR mode and TM can be cascaded with bilateral matching process in merge modes.

In AMVP mode, an MVP candidate is determined based on template matching error to pick up the one which reaches the minimum difference between current block template and reference block template, and then TM performs only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 3. This search process ensures that the MVP candidate still keeps the same MV precision as indicated by AMVR mode after TM process.

TABLE 3

Search patterns of AMVR and merge mode with AMVR.

|  | AMVR mode | | | Merge mode | |
| --- | --- | --- | --- | --- | --- |
| Search pattern | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |

TABLE 3-continued

Search patterns of AMVR and merge mode with AMVR.

| Search pattern | AMVR mode | | | | Merge mode | |
| --- | --- | --- | --- | --- | --- | --- |
| | 4-pel | Full-pel | Half-pel | Quarter-pel | AltIF = 0 | AltIF = 1 |
| Quarter-pel cross | | | | | v | v |
| 1/8-pel cross | | | | | | v |

In merge mode, similar search method is applied to the merge candidate indicated by the merge index. As shown in Table 3, TM may perform all the way down to 1/8-pel MVD precision or skipping those beyond half-pel MVD precision, depending on whether the alternative interpolation filter (that is used when AMVR is of half-pel mode) is used according to merged motion information. Besides, when TM mode is enabled, template matching may work as an independent process or an extra MV refinement process between block-based and subblock-based bilateral matching (BM) methods, depending on whether BM can be enabled or not according to its enabling condition check.

At encoder side, TM merge mode will do MV refinement for each merge candidate.

2.13. Multi-Hypothesis Prediction (MHP)

The multi-hypothesis prediction is adopted in this contribution. Up to two additional predictors are signalled on top of inter AMVP mode, regular merge mode, and MMVD mode. The resulting overall prediction signal is accumulated iteratively with each additional prediction signal.

$$p_{n+1} = (1 - \alpha_{n+1})p_n + \alpha_{n+1}h_{n+1}$$

The weighting factor $\alpha$ is specified according to the following table:

| add_hyp_weight_idx | $\alpha$ |
| --- | --- |
| 0 | 1/4 |
| 1 | −1/8 |

For inter AMVP mode, MHP is only applied if non-equal weight in BCW is selected in bi-prediction mode.

2.14. Multi-Hypothesis Inter Prediction

In the multi-hypothesis inter prediction mode, one or more additional prediction signals are signaled, in addition to the conventional uni/bi prediction signal. The resulting overall prediction signal is obtained by sample-wise weighted superposition. With the uni/bi prediction signal $p_{uni/bi}$ and the first additional inter prediction signal/hypothesis $h_3$, the resulting prediction signal $p_3$ is obtained as follows:

$$p_3 = (1 - \alpha)p_{uni/bi} + \alpha h_3$$

The weighting factor $\alpha$ is specified by the new syntax element add_hyp_weight_idx, according to the following mapping:

| add_hyp_weight_idx | $\alpha$ |
| --- | --- |
| 0 | 1/4 |
| 1 | −1/8 |

Note that for the additional prediction signals, in the tests CE10.1.2.a, CE10.1.2.b, and CE10.1.2.d, the concept of prediction list0/list1 is abolished, and instead one combined list is used. This combined list is generated by alternatingly inserting reference frames from list0 and list1 with increasing reference index, omitting reference frames which have already been inserted, such that double entries are avoided. In test CE10.1.2.c, only 2 different reference pictures can be used within each PU, and therefore it is indicated by one flag which reference frame is used.

Analogously to above, more than one additional prediction signal can be used. The resulting overall prediction signal is accumulated iteratively with each additional prediction signal.

$$p_{n+1} = (1 - \alpha_{n+1})p_n + \alpha_{n+1}h_{n+1}$$

The resulting overall prediction signal is obtained as the last $p_n$ (i.e., the $p_n$ having the largest index n). Within this CE, up to two additional prediction signals can be used (i.e., n is limited to 2). Note that due to the iterative accumulation approach, the number of required PU sample buffers for storing intermediate prediction signals is not increased relative to bi-prediction (i.e., two buffers are sufficient).

2.14.1 Multi-Hypothesis Motion Estimation

First, the inter modes with no explicitly signaled additional inter prediction parameters are tested. For the best two of these modes (i.e., having lowest Hadamard RD cost), additional inter prediction hypotheses are searched. For that purpose, for all combinations of the following parameters, a motion estimation with a restricted search range of 16 is performed:

Weighting factor $\alpha$

Reference frame for the additional prediction hypothesis

For determining the best combination of these two parameters, a simplified RD cost using Hadamard distortion measure and approximated bit rate is used. The chosen parameter combination is then used to compute a more accurate RD cost, using forward transform and quantization, which is compared against the so-far best found coding mode for the current block.

2.14.2 Interaction with Other Coding Tools 2.14.2.1. Normal Merge Mode (Non-MMVD, Non-Sub-Block)

Additional prediction signals can be explicitly signaled, but not in SKIP mode

Additional prediction signals can also be inherited from spatially neighboring blocks as part of the merging candidate, but this is limited to neighboring blocks within the current CTU, or neighboring blocks from the left CTU Additional prediction signals cannot be inherited from the top CTU or from a temporally co-located block.

All explicitly signaled additional prediction signals use the same AMVP candidate list which is generated for the first explicitly signaled additional prediction signal, so there has to be done one merging candidate list construction process
one AMVP candidate list construction process
The total of explicitly signaled and inherited (merged) additional prediction signals is limited to be less than or equal to 2.

2.14.2.2. MMVD

Additional prediction signals can be explicitly signaled, but not in MMVD SKIP mode There is no inheritance/merging of additional prediction signals from merging candidates All explicitly signaled additional prediction signals use the same AMVP candidate list which is generated for the first explicitly signaled additional prediction signal, so there has to be done
one MMVD list construction process
one AMVP candidate list construction process 2.14.2.3. Sub-Block Merge Mode Additional prediction signals can be explicitly signaled, but not in SKIP mode There is no inheritance/merging of additional prediction signals from merging candidates All explicitly signaled additional prediction signals use the same AMVP candidate list which is generated for the first explicitly signaled additional prediction signal, so there has to be done
one sub-block merging candidate list construction process
one AMVP candidate list construction process 2.14.2.4. Non-Affine AMVP Mode Additional prediction signals can be explicitly signaled in case of bi-prediction Only two AMVP candidate lists have to be constructed (for the first two, i.e. non-additional prediction signals)

For the additional prediction signals, one of the two AMVP candidate lists is used:
If the POC of the reference picture of the additional prediction signal equals the POC of the used list1 reference picture, the list1 AMVP candidate list is used.
Otherwise the list0 AMVP candidate list is used.

2.14.2.5. Affine AMVP Mode

Additional (translational) prediction signals can be explicitly signaled in case of bi-prediction Two affine AMVP candidate lists have to be constructed (for the first two, i.e. non-additional prediction signals)

For the additional prediction signals, one of the two AMVP candidate lists is used:
If the POC of the reference picture of the additional prediction signal equals the POC of the used list1 reference picture, the list1 AMVP candidate list is used.
Otherwise the list0 AMVP candidate list is used.

The affine LT mv predictor is used as the mv predictor for the additional prediction signal 2.14.2.6. BIO Multi-hypothesis inter prediction cannot be used together with BIO within one PU:
If there are additional prediction signals, BIO is disabled for the current PU 2.14.2.7. Combined Intra/Inter Multi-hypothesis inter prediction cannot be used together with combined intra/inter within one PU:
If combined intra/inter is selected with a merging candidate that has additional prediction signals, those additional prediction signals are not inherited/merged.
Additional prediction signals cannot be explicitly signaled in combined intra/inter mode.

2.14.2.8. Triangular Mode

Multi-hypothesis inter prediction cannot be used together with triangular mode within one PU:
If triangular mode is selected with a merging candidate that has additional prediction signals, those additional prediction signals are not inherited/merged.
Additional prediction signals cannot be explicitly signaled in triangular mode.

2.15. Overlapped Block Motion Compensation

Figure 30:
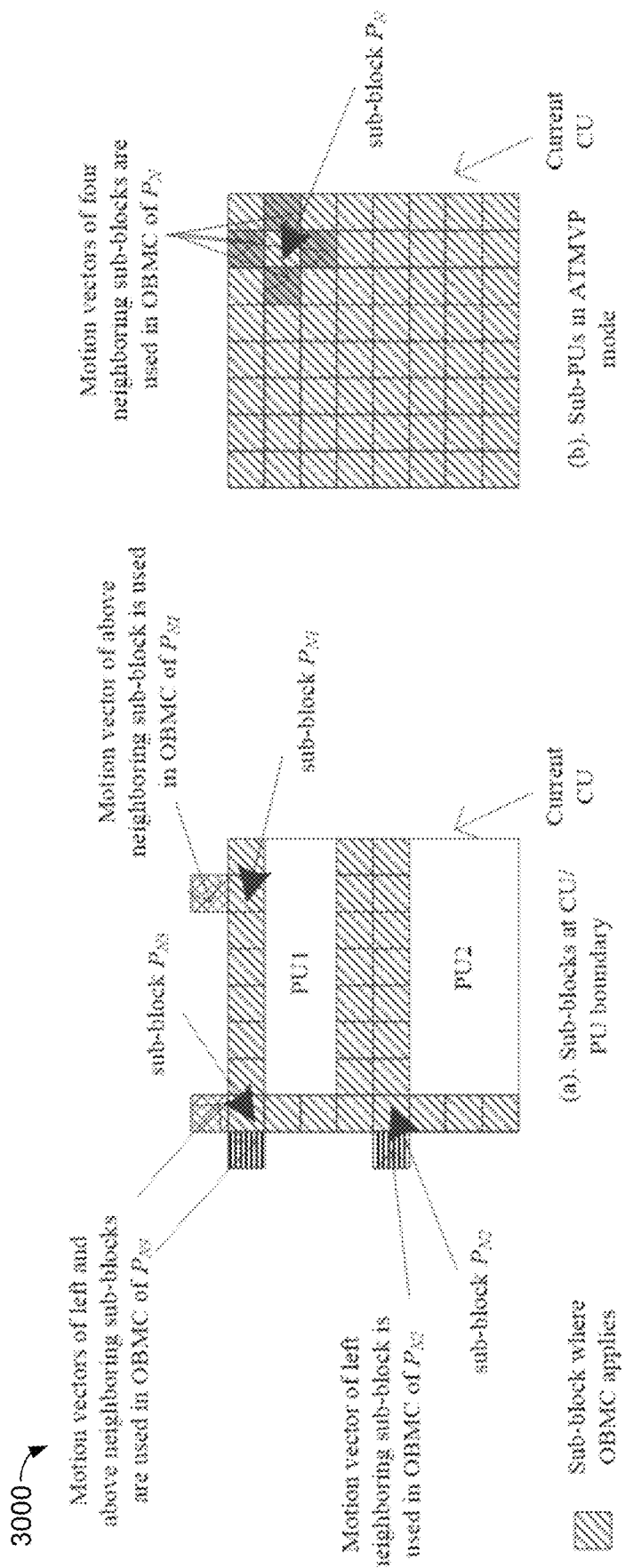
FIG. 30 illustrates a schematic diagram of sub-blocks where OBMC applies.

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC mode), each sub-block of the CU is a MC block. FIG. 30 illustrates a schematic diagram 3000 of sub-blocks where OBMC applies. To process CU boundaries in a uniform fashion, OBMC is performed at sub-block level for all MC block boundaries, where sub-block size is set equal to 4×4, as illustrated in FIG. 30.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors {¼, ⅛, 1/16, 1/32} are used for $P_N$ and the weighting factors {¾, ⅞, 15/16, 31/32} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {¼, ⅛} are used for $P_N$ and weighting factors {¾, ⅞} are used for $P_C$. For $P_N$ generated based on motion vectors of vertically (horizontally) neighbouring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.16. Adaptive Merge Candidate List

It is to assume the number of the merge candidates is 8. The first 5 merge candidates are taken as a first subgroup and take the following 3 merge candidates as a second subgroup (i.e. the last subgroup).

Figure 31:
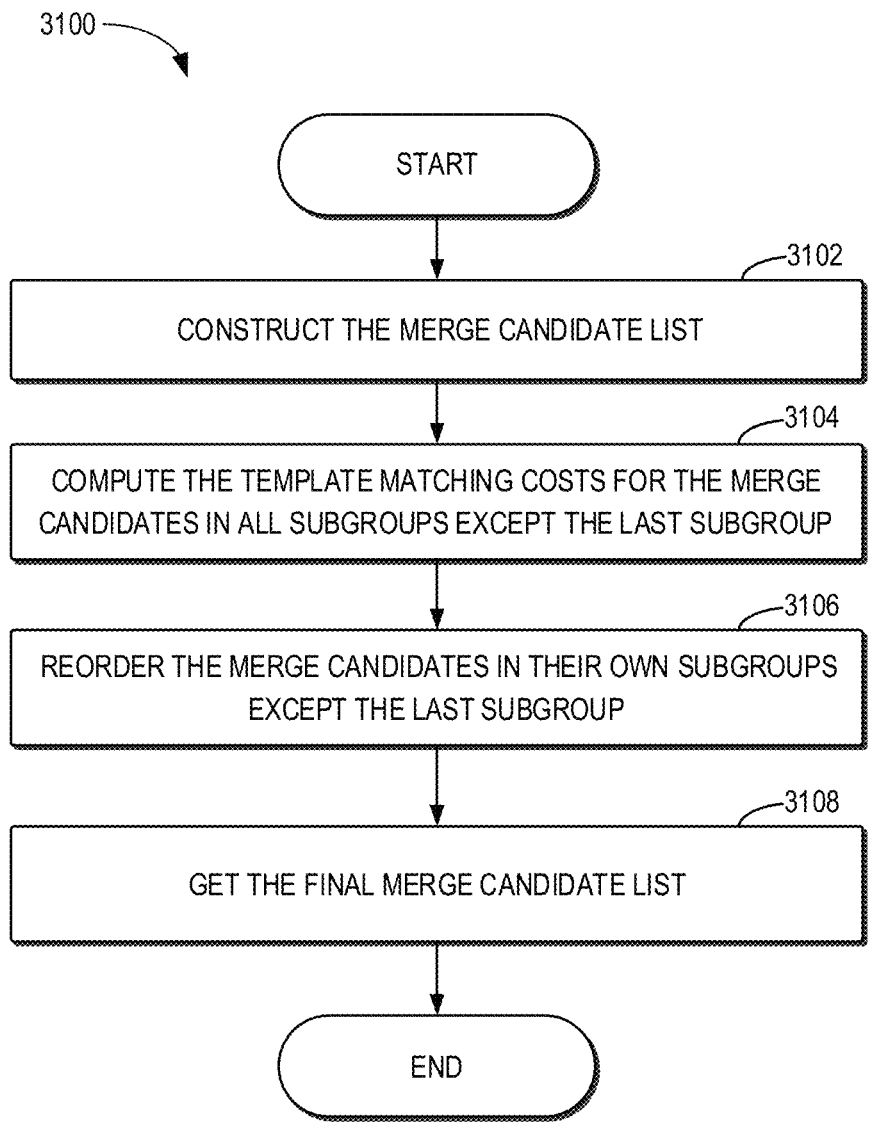
FIG. 31 illustrates a flowchart of a reorder process in an encoder.

FIG. 31 illustrates a flowchart of a reorder process 3100 in an encoder. For the encoder, after the merge candidate list is constructed at block 3102, some merge candidates are adaptively reordered in an ascending order of costs of merge candidates as shown in FIG. 31.

More specifically, at block 3104, the template matching costs for the merge candidates in all subgroups except the last subgroup are computed; then at block 3106, the merge candidates in their own subgroups are reordered except the last subgroup; finally, at block 3108, the final merge candidate list will be got.

Figure 32:
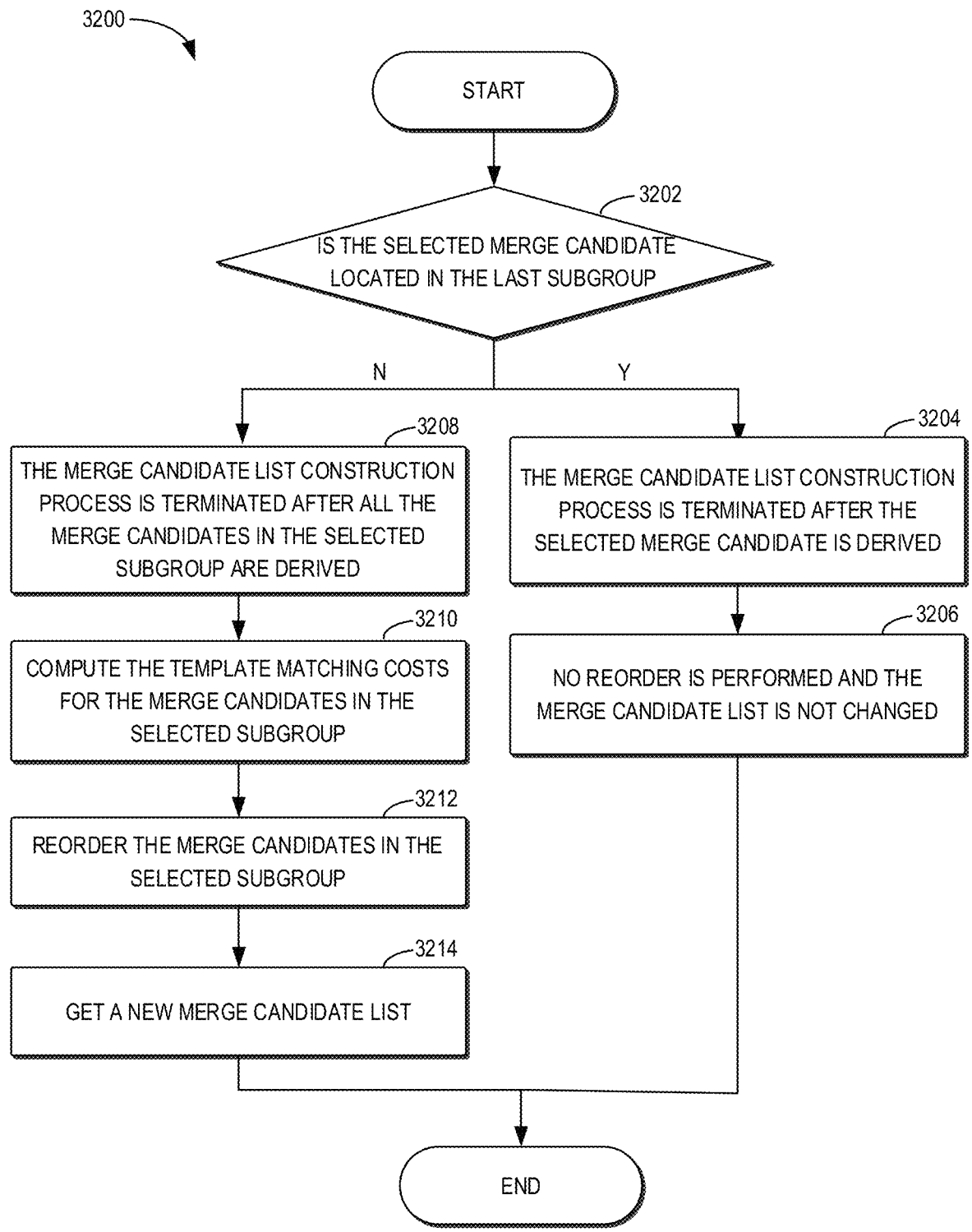
FIG. 32 illustrates a flowchart of a reorder process in a decoder.

For the decoder, after the merge candidate list is constructed, some/no merge candidates are adaptively reordered in ascending order of costs of merge candidates as shown in FIG. 32 which illustrates a flowchart of a reorder process 3200 in a decoder. In FIG. 32, the subgroup the selected (signaled) merge candidate located in is called the selected subgroup.

More specifically, at block 3202, it is determined if the selected merge candidate is located in the last subgroup. If the selected merge candidate is located in the last subgroup, at block 3204, the merge candidate list construction process is terminated after the selected merge candidate is derived, and at block 3206, no reorder is performed and the merge candidate list is not changed; otherwise, the execution process is as follows:

At block 3208, the merge candidate list construction process is terminated after all the merge candidates in the selected subgroup are derived; at block 3210, the template matching costs for the merge candidates in the selected subgroup are computed; at block 3212, the merge candidates in the selected subgroup are reordered; finally, at block 3214, a new merge candidate list will be got.

For both encoder and decoder,

A template matching cost is derived as a function of T and RT, wherein T is a set of samples in the template and RT is a set of reference samples for the template.

When deriving the reference samples of the template for a merge candidate, the motion vectors of the merge candidate are rounded to the integer pixel accuracy.

The reference samples of the template (RT) for bi-directional prediction are derived by weighted averaging of the reference samples of the template in reference list0 ($RT_0$) and the reference samples of the template in reference list1 ($RT_1$) as follows.

$$RT = ((8 - w) * RT_0 + w * RT_1 + 4) \gg 3$$

where the weight of the reference template in reference list0 (8−w) and the weight of the reference template in reference list1 (w) are decided by the BCW index of the merge candidate. BCW index equal to {0,1,2,3,4} corresponds to w equal to {−2,3,4,5,10}, respectively.

If the Local Illumination Compensation (LIC) flag of the merge candidate is true, the reference samples of the template are derived with LIC method.

The template matching cost is calculated based on the sum of absolute differences (SAD) of T and RT.

The template size is 1. That means the width of the left template and/or the height of the above template is 1.

If the coding mode is MMVD, the merge candidates to derive the base merge candidates are not reordered.

If the coding mode is GPM, the merge candidates to derive the uni-prediction candidate list are not reordered.

2.17. GMVD

In Geometric prediction mode with Motion Vector Difference (GMVD), each geometric partition in GPM can decide to use GMVD or not. If GMVD is chosen for a geometric region, the MV of the region is calculated as a sum of the MV of a merge candidate and an MVD. All other processing is kept the same as in GPM.

With GMVD, an MVD is signaled as a pair of direction and distance. There are nine candidate distances (¼-pel, ½-pel, 1-pel, 2-pel, 3-pel, 4-pel, 6-pel, 8-pel, 16-pel), and eight candidate directions (four horizontal/vertical directions and four diagonal directions) involved In addition, when pic_fpel_mmvd_enabled_flag is equal to 1, the MVD in GMVD is also left shifted by 2 as in MMVD.

2.18. Affine MMVD

In affine MMVD, an affine merge candidate (which is called, base affine merge candidate) is selected, the MVs of the control points are further refined by the signalled MVD information.

The MVD information for the MVs of all the control points are the same in one prediction direction.

When the starting MVs is bi-prediction MVs with the two MVs point to the different sides of the current picture (i.e. the POC of one reference is larger than the POC of the current picture, and the POC of the other reference is smaller than the POC of the current picture), the MV offset added to the list0 MV component of starting MV and the MV offset for the list1 MV has opposite value; otherwise, when the starting MVs is bi-prediction MVs with both lists point to the same side of the current picture (i.e. POCs of two references are both larger than the POC of the current picture, or are both smaller than the POC of the current picture), the MV offset added to the list0 MV component of starting MV and the MV offset for the list1 MV are the same.

2.19. Decoder Side Motion Vector Refinement (DMVR)

Figure 33:
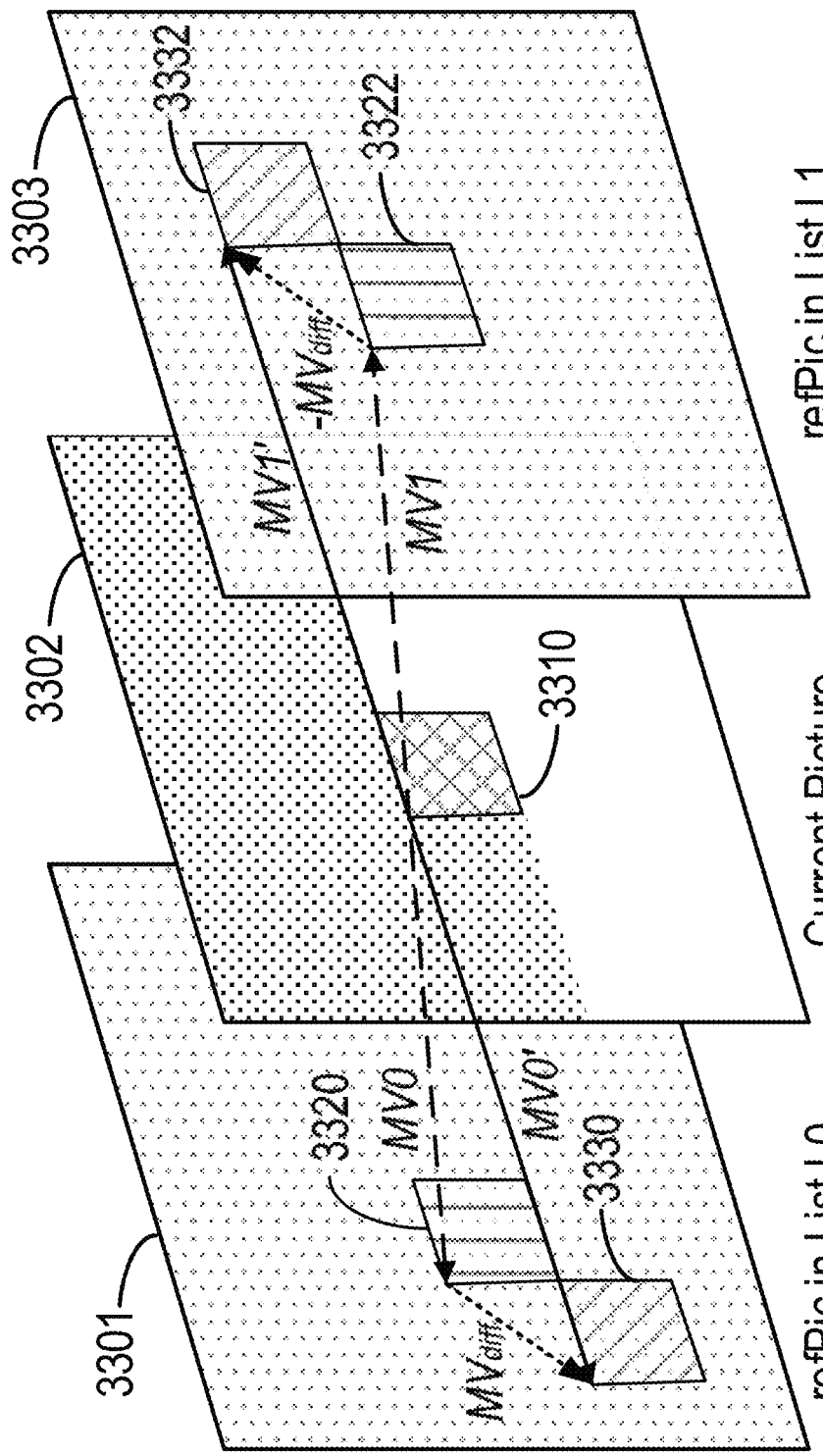
FIG. 33 illustrates a schematic diagram of decoding side motion vector refinement.

In order to increase the accuracy of the MVs of the merge mode, a bilateral-matching (BM) based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. FIG. 33 illustrates a schematic diagram of decoding side motion vector refinement. As illustrated in FIG. 33, the SAD between the blocks 3330 and 3332 based on each MV candidate around the initial MV is calculated. The MV candidate with the lowest SAD becomes the refined MV and used to generate the bi-predicted signal.

In VVC, the application of DMVR is restricted and is only applied for the CUs which are coded with following modes and features:

CU level merge mode with bi-prediction MV
  One reference picture is in the past and another reference picture is in the future with respect to the current picture
  The distances (i.e. POC difference) from two reference pictures to the current picture are same
  Both reference pictures are short-term reference pictures
  CU has more than 64 luma samples
  Both CU height and CU width are larger than or equal to 8 luma samples
  BCW weight index indicates equal weight
  WP is not enabled for the current block CIIP mode is not used for the current block The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + MV\_offset$$
$$MV1' = MV1 - MV\_offset$$

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1, 0) - E(1, 0))/(2(E(-1, 0) + E(1, 0) - 2E(0, 0)))$$
$$y_{min} = (E(0, -1) - E(0, 1))/(2((E(0, -1) + E(0, 1) - 2E(0, 0)))$$

The value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional $(x_{min}, y_{min})$ are added to the integer distance refinement MV to get the sub-pixel accurate refinement delta MV.

Bilinear-Interpolation and Sample Padding

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

2.20. Combination of GPM and Template Matching

It is proposed to apply template matching to GPM. When a CU is coded in GPM, two motion for two geometric partitions are selected from a merge candidate list which is derived in the same way as that in VVC standard. Each motion for the geometric partition can decide whether to be refined using TM. When TM is chosen, a template is constructed using left and above neighboring samples. Then, the motion is refined by finding the minimum difference between the current template and a reference area using the same search pattern of merge mode with half-pel interpolation filter disabled. The refined motion is used to perform motion compensation for the geometric partition and is stored in the motion field.

For the syntax design, when a CU coded in GPM, two additional flags are signaled to indicate whether motion is refined for the two geometric partitions, respectively. Then, the geometric partition mode and two merge indices are further signaled.

Figure 34A:
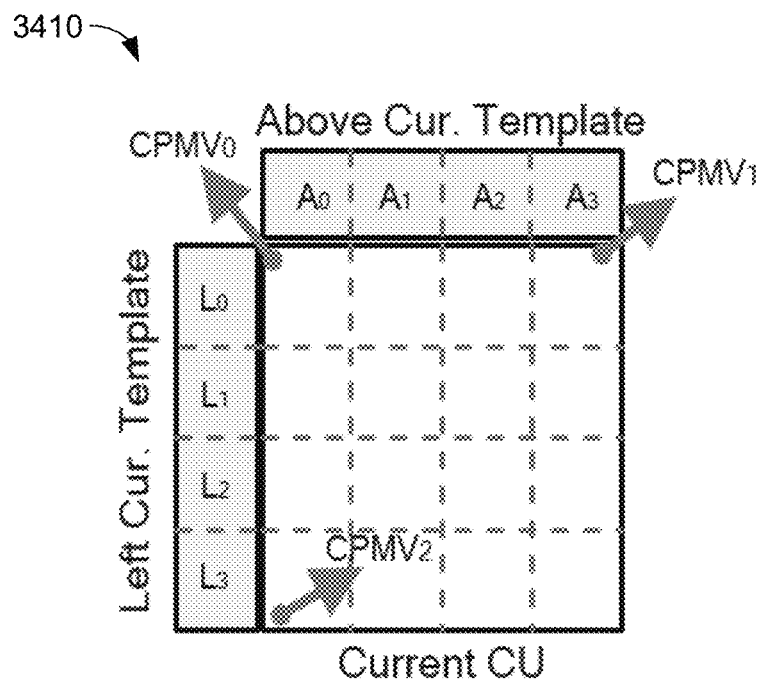
FIG. 34A illustrates a schematic diagram of current block templates.
Figure 34B:
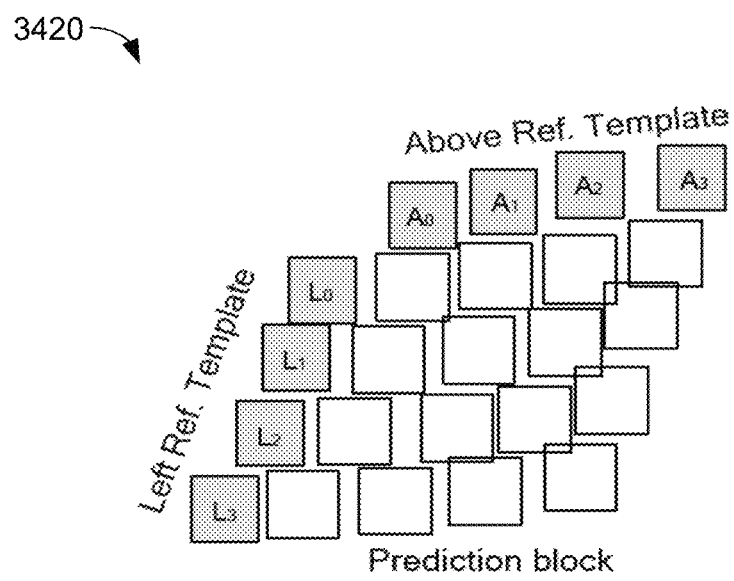
FIG. 34B illustrates the reference sub-block based templates.
Figure 35:
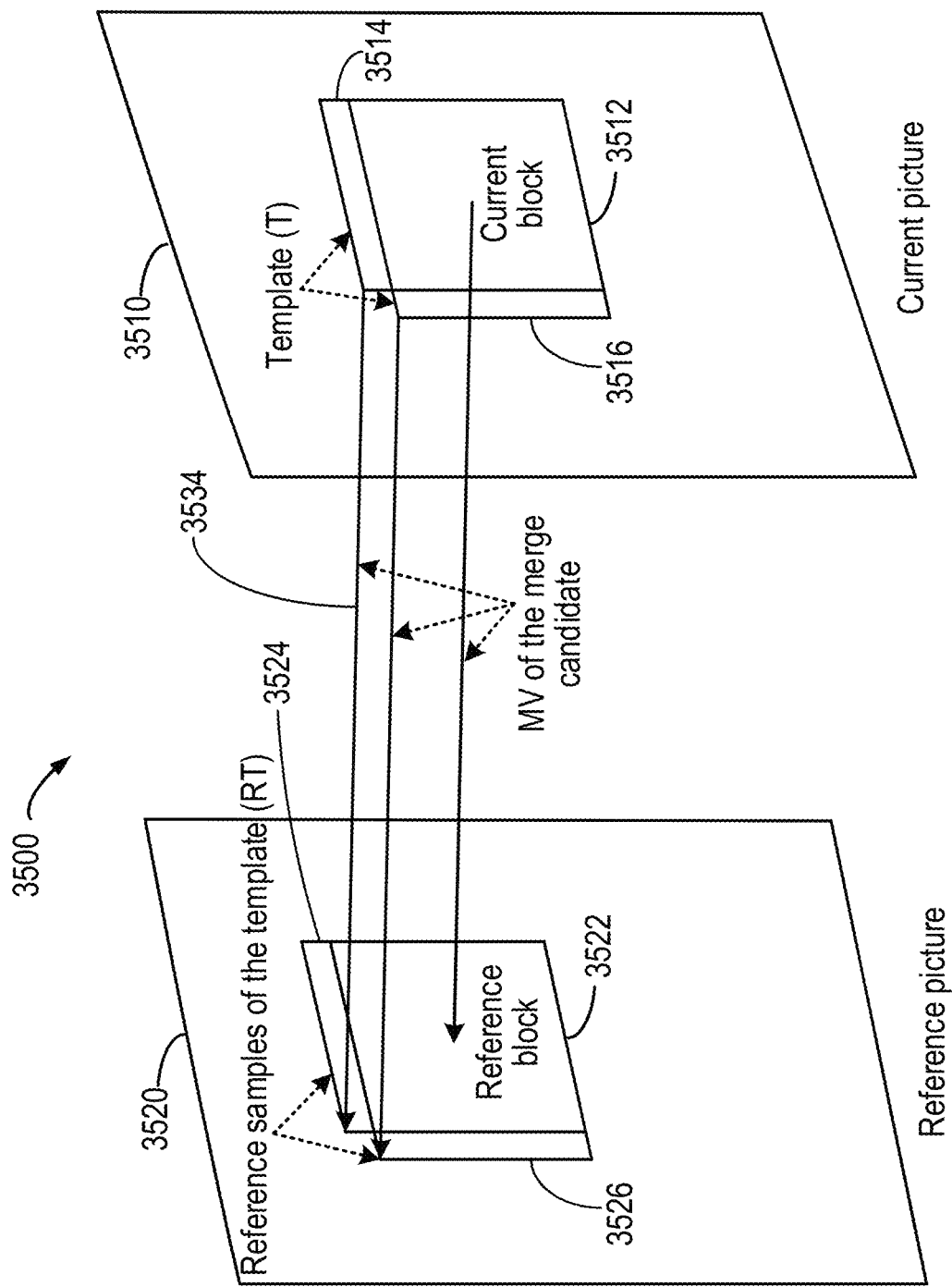
FIG. 35 illustrates a schematic diagram of template and reference samples of the template.

2.21. Extension of Template Matching to Affine, CIIP, GPM Merge Modes, and Boundary Sub-Blocks CIIP Merge Mode with Template Matching Refinement Template matching refinement is applied to the underlying inter-prediction part of CIIP merge mode. When CIIP is enabled for a coding unit (CU), it is signaled to indicate whether template matching refinement is enabled for this CU. When both CIIP and template matching refinement are enabled, the MVs of a merge candidate used in CIIP merge mode is refined by using the same template matching refinement process as in the template matching of EE2 before motion compensation and inter-intra combination.
GPM Merge Mode with Template Matching Refinement Template matching refinement is applied to geometric partitioning merge (GPM) mode. When GPM mode is enabled for a CU, a flag (tm_merge_flag) is signaled to control whether template matching refinement is applied for this CU. If the refinement is utilized, the selected uni-directional MV for each GPM partition is refined by using the same template matching refinement process as in the template matching of EE2 before motion compensation.
Boundary Sub-Blocks with Template Matching Refinement Template matching refinement is applied to boundary 4×4 sub-blocks of a CU, when it is coded using regular merge mode, tm_merge_flag is enabled, and the merge candidate motion is uni-directional. This extension is an additional refinement step applied after the CU-level template matching refinement (EE2, Test-3.3), where the block motion is further refined only for the 4×4 sub-blocks at the top or left boundary in the CU. In this process, since the CU is uni-directional (and so are its sub-blocks), the MV of each aforementioned boundary sub-block is converted to bi-prediction MVs utilizing uni-to-bi conversion similar to the one used in the template matching of EE2 followed by the template matching refinement applied to every boundary sub-block.
Affine Merge Mode with Template Matching Refinement Template matching refinement is applied to the affine merge mode (Affine TM), and the tm_merge_flag is signaled to differentiate whether template matching is applied. In this mode, the template matching search is done around the initially given CPMVs of an affine merge candidate indicated by a merge index. The current block template is the same as in the regular TM applied to translational motion model, but the reference block template comprises multiple 4×4 sub-blocks pointed respectively to by the CPMV-derived MVs of the neighboring sub-blocks (i.e., A0, A1, . . . , and L0, L1, . . . as shown in FIGS. 34A and 34B.) at the CU boundary. FIG. 34A illustrates current block template, and FIG. 34B illustrates the reference sub-block based templates. The search process of Affine TM starts from the CPMV0, while keeping the other CPMV(s) constant, and the search is performed toward horizontal and vertical directions, followed by diagonal ones only if zero vector is not the best difference vector found from the horizontal/vertical search. Then, Affine TM repeats the same search process for CPMV1, and CPMV2, if 6-parameter model is used. Based on the refined CPMVs, the whole search process restarts from CPMV0, if zero vector is not the best difference vector from the previous iteration and the search process has iterated less than 3 times.
2.22. Adaptive Merge Candidate List Hereinafter, template is a set of reconstructed samples adjacently or non-adjacently neighboring to the current block. Reference samples of the template are derived according to the same motion information of the current block. For example, reference samples of the template are mapping of the template depend on a motion information. In this case, reference samples of the template are located by a motion vector of the motion information in a reference picture indicated by the reference index of the motion information. FIG. 35 illustrates a schematic diagram of template and reference samples of the template. FIG. 35 shows an example, wherein RT represents the reference samples of the template T.

Figure 36:
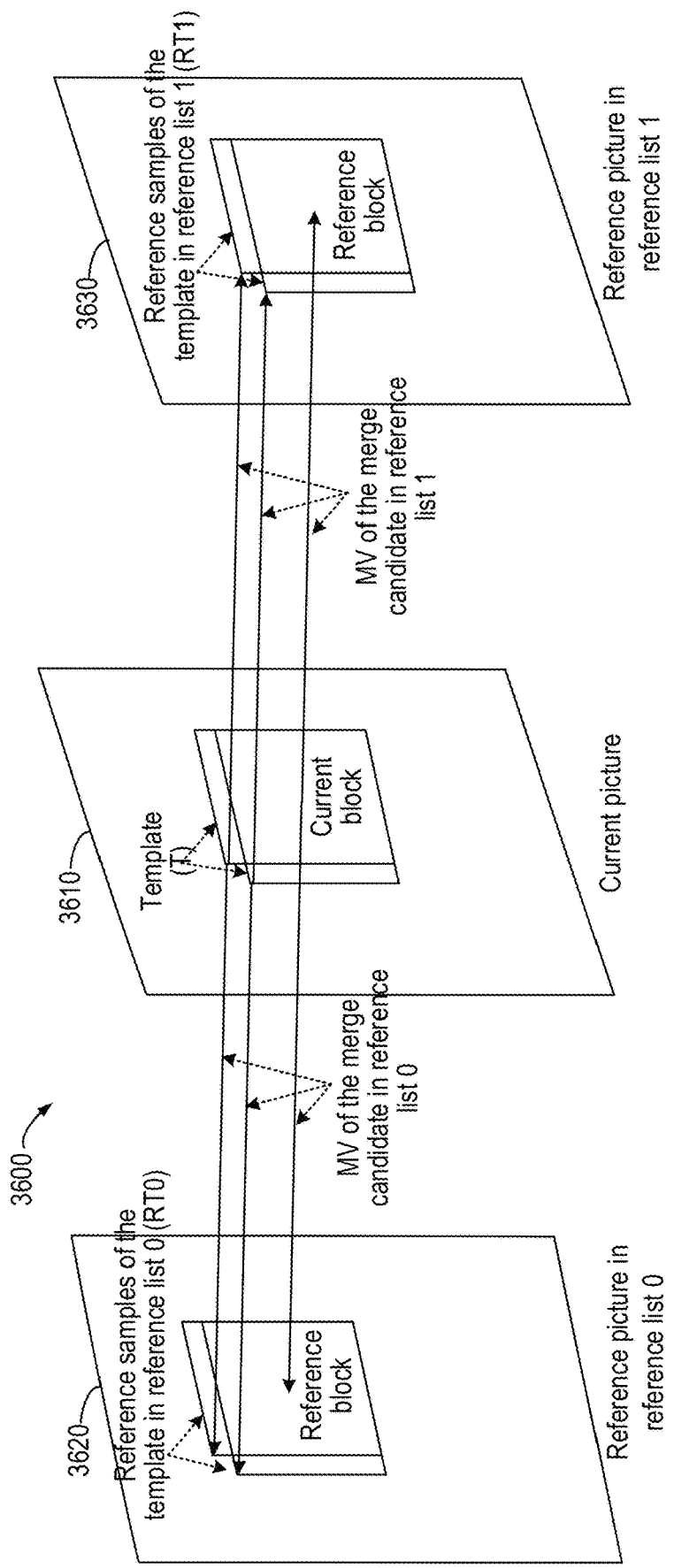
FIG. 36 illustrates a schematic diagram of template and reference samples of the template in reference list 0 and reference list 1.

When a merge candidate utilizes bi-directional prediction, the reference samples of the template of the merge candidate are denoted by RT and RT may be generated from $RT_0$ which are derived from a reference picture in reference picture list 0 and $RT_1$ derived from a reference picture in reference picture list 1. In one example, $RT_0$ includes a set of reference samples on the reference picture of the current block indicated by the reference index of the merge candidate referring to a reference picture in reference list 0 with the MV of the merge candidate referring to reference list 0), In one example, $RT_1$ includes a set of reference samples on the reference picture of the current block indicated by the reference index of the merge candidate referring to a reference picture in reference list 1 with the MV of the merge candidate referring to reference list 1). An example is shown in FIG. 36. FIG. 36 illustrates a schematic diagram of template and reference samples of the template in reference list 0 and reference list 1.

In one example, the reference samples of the template (RT) for bi-directional prediction are derived by equal weighted averaging of the reference samples of the template in reference list0 ($RT_0$) and the reference samples of the template in reference list1 ($RT_1$). One example is as follows:

$$RT = (RT_0 + RT_1 + 1) \gg 1$$

In one example, the reference samples of the template ($RT_{bi-pred}$) for bi-directional prediction are derived by weighted averaging of the reference samples of the template in reference list0 ($RT_0$) and the reference samples of the template in reference list1 ($RT_1$). One example is as follows:

$$RT = \left((2^N - w) * RT_0 + w * RT_1 + 2^{N-1}\right) \gg N, \text{ for example, } N = 3.$$

In one example, the weight of the reference template in reference list0 such as (8−w) and the weight of the reference template in reference list1 such as (w) maybe decided by the BCW index of the merge candidate.

The merge candidates can be divided to several groups according to some criterions. Each group is called a subgroup. For example, it is possible to take adjacent spatial and temporal merge candidates as a first subgroup and take the remaining merge candidates as a second subgroup; In another example, it is also possible to take the first N (N≥2) merge candidates as a first subgroup, take the following M (M≥2) merge candidates as a second subgroup, and take the remaining merge candidates as a third subgroup. Note that the proposed methods may be applied to merge candidate list construction process for inter coded blocks (e.g., translational motion), affine coded blocks; or other motion candidate list construction process (e.g., AMVP list; IBC AMVP list; IBC merge list).

W and H are the width and height of current block (e.g., luma block). Taking merge candidate list construction process as an example in the following descriptions:
  1. The merge candidates can be adaptively rearranged in the final merge candidate list according to one or some criterions.
     a) In one example, partial or full process of current merge candidate list construction process is firstly invoked, followed by the reordering of candidates in the list.

i. Alternatively, candidates in a first subgroup may be reordered and they should be added before those candidates in a second subgroup wherein the first subgroup is added before the second subgroup.
  (i) In one example, multiple merge candidates for a first category may be firstly derived and then reordered within the first category; then merge candidates from a second category may be determined according to the reordered candidates in the first category (e.g., how to apply pruning).
  ii. Alternatively, a first merge candidate in a first category may be compared to a second merge candidate in a second category, to decide the order of the first or second merge candidate in the final merge candidate list.
b) In one example, the merge candidates may be adaptively rearranged before retrieving the merge candidates.
  i. In one example, the procedure of arranging merge candidates adaptively may be processed before the obtaining the merge candidate to be used in the motion compensation process.
c) In one example, if the width of current block is larger than the height of current block, the above candidate is added before the left candidate.
d) In one example, if the width of current block is smaller than the height of current block, the above candidate is added after the left candidate.
e) Whether merge candidates are rearranged adaptively may depend on the selected merging candidate or the selected merging candidate index.
  i. In one example, if the selected merging candidate is in the last sub-group, the merge candidates are not rearranged adaptively.
f) In one example, a merge candidate is assigned with a cost, the merge candidates are adaptively reordered in an ascending order of costs of merge candidates.
  i. In one example, the cost of a merge candidate may be a template matching cost.
  ii. In one example, template is a set of reconstructed samples adjacently or non-adjacently neighboring to the current block.
  iii. A template matching cost is derived as a function of T and RT, wherein T is a set of samples in the template and RT is a set of reference samples for the template.
    (i) How to obtain the reference samples of the template for a merge candidate may depend on the motion information of the merge candidate
    a) In one example, when deriving the reference samples of the template, the motion vectors of the merge candidate are rounded to the integer pixel accuracy, where the integer motion vector may be its nearest integer motion vector.
    b) In one example, when deriving the reference samples of the template, N-tap interpolation filtering is used to get the reference samples of the template at sub-pixel positions. For example, N may be 2, 4, 6, or 8.
    c) In one example, when deriving the reference samples of the template, the motion vectors of the merge candidates may be scaled to a given reference picture (e.g., for each reference picture list if available).
    d) For example, the reference samples of the template of a merge candidate are obtained on the reference picture of the current block indicated by the reference index of the merge candidate with the MVs or modified MVs (e.g., according to bullets a)-b)) of the merge candidate as shown in FIG. 35.
    e) For example, when a merge candidate utilizes bi-directional prediction, the reference samples of the template of the merge candidate are denoted by RT and RT may be generated from $RT_0$ which are derived from a reference picture in reference picture list 0 and $RT_1$ derived from a reference picture in reference picture list 1.
    [1] In one example, $RT_0$ includes a set of reference samples on the reference picture of the current block indicated by the reference index of the merge candidate referring to a reference picture in reference list 0 with the MV of the merge candidate referring to reference list 0),
    [2] In one example, $RT_1$ includes a set of reference samples on the reference picture of the current block indicated by the reference index of the merge candidate referring to a reference picture in reference list 1 with the MV of the merge candidate referring to reference list 1).
    [3] An example is shown in FIG. 36.
    f) In one example, the reference samples of the template (RT) for bi-directional prediction are derived by equal weighted averaging of the reference samples of the template in reference list0 ($RT_0$) and the reference samples of the template in reference list1 ($RT_1$). One example is as follows:

$$RT = (RT_0 + RT_1 + 1) \gg 1$$

g) In one example, the reference samples of the template ($RT_{bi-pred}$) for bi-directional prediction are derived by weighted averaging of the reference samples of the template in reference list0 ($RT_0$) and the reference samples of the template in reference list1 ($RT_1$). One example is as follows:

$$RT = \left(\left(2^N - w\right) * RT_0 + w * RT_1 + 2^{N-1}\right) \gg N,$$

for example, N=3.
    h) h) In one example, the weight of the reference template in reference list0 such as (8−w) and the weight of the reference template in reference list1 such as (w) maybe decided by the BCW index of the merge candidate.
    [1] In one example, BCW index is equal to 0, w is set equal to −2.
    [2] In one example, BCW index is equal to 1, w is set equal to 3.
    [3] In one example, BCW index is equal to 2, w is set equal to 4.
    [4] In one example, BCW index is equal to 3, w is set equal to 5.

[5] In one example, BCW index is equal to 4, w is set equal to 10
    i) In one example, if the Local Illumination Compensation (LIC) flag of the merge candidate is true, the reference samples of the template are derived with LIC method.
   (ii) The cost may be calculated based on the sum of absolute differences (SAD) of T and RT.
    a) Alternatively, the cost may be calculated based on the sum of absolute transformed differences (SATD) of T and RT.
    b) Alternatively, the cost may be calculated based on the sum of squared differences (SSD) of T and RT.
    c) Alternatively, the cost may be calculated based on weighted SAD/weighted SATD/weighted SSD.
   (iii) The cost may consider the continuity (Boundary_SAD) between RT and reconstructed samples adjacently or non-adjacently neighboring to T in addition to the SAD calculated in (ii). For example, reconstructed samples left and/or above adjacently or non-adjacently neighboring to T are considered.
    a) In one example, the cost may be calculated based on SAD and Boundary_SAD
    [1] In one example, the cost may be calculated as (SAD+w*Boundary_SAD). w may be predefined, or signaled or derived according to decoded information.
2. Whether to and/or how to reorder the merge candidates may depend on the category of the merge candidates.
   a) In one example, only adjacent spatial and temporal merge candidates can be reordered.
   b) In one example, only adjacent spatial, STMVP, and temporal merge candidates can be reordered.
   c) In one example, only adjacent spatial, STMVP, temporal and non-adjacent spatial merge candidates can be reordered.
   d) In one example, only adjacent spatial, STMVP, temporal, non-adjacent spatial and HMVP merge candidates can be reordered.
   e) In one example, only adjacent spatial, STMVP, temporal, non-adjacent spatial, HMVP and pair-wise average merge candidates can be reordered.
   f) In one example, only adjacent spatial, temporal, HMVP and pair-wise average merge candidates can be reordered.
   g) In one example, only adjacent spatial, temporal, and HMVP merge candidates can be reordered.
   h) In one example, only adjacent spatial merge candidates can be reordered.
   i) In one example, only the first subgroup can be reordered.
   j) In one example, the last subgroup can not be reordered.
   k) In one example, only the first N merge candidates can be reordered.
    i. In one example, N is set equal to 5.
   l) In one example, for the candidates not to be reordered, they will be arranged in the merge candidate list according to the initial order.
   m) In one example, candidates not to be reordered may be put behind the candidates to be reordered.
   n) In one example, candidates not to be reordered may be put before the candidates to be reordered.
   o) In one example, a combination of some of the above items (a~k) can be reordered.
   p) Different subgroups may be reordered separately.
   q) Two candidates in different subgroups cannot be compared and/or reordered.
   r) A first candidate in a first subgroup must be put ahead of a second candidate in a second subgroup after reordering if the first subgroup is ahead of a second subgroup.
3. Whether to and/or how to reorder the merge candidates may depend on the coding mode.
   a) In one example, if the coding mode is regular merge mode, the merge candidates can be reordered.
   b) In one example, if the coding mode is MMVD, the merge candidates to derive the base merge candidates are not reordered.
    i. Alternatively, the reordering method may be different for the MMVD mode and other merge modes.
   c) In one example, if the coding mode is CIIP, the merge candidates used for combination with intra prediction are based on the reordered merge candidates.
    i. Alternatively, the reordering method may be different for the CIIP mode and other merge modes.
   d) In one example, if the coding mode is GPM, the merge candidates to derive the uni-prediction candidate list are not reordered.
    i. Alternatively, the reordering method may be different for the GPM mode and other merge modes.
   e) In one example, if the coding mode is a triangle partition mode, the merge candidates to derive the uni-prediction candidate list are not reordered.
    i. Alternatively, the reordering method may be different for the triangular mode and other merge modes.
   f) In one example, if the coding mode is a subblock based merge mode, partial or full subblock based merge candidates are reordered.
    i. Alternatively, the reordering method may be different for the subblock based merge mode and other merge modes
    ii. In one example, the uni-prediction subblock based merge candidates are not reordered.
    iii. In one example, the SbTMVP candidate is not reordered.
    iv. In one example, the constructed affine candidates are not reordered.
    v. In one example, the zero padding affine candidates are not reordered.
4. Whether to and/or how to reorder the merge candidates may depend on the available number of adjacent spatial and/or STMVP and/or temporal merge candidates
5. Whether the merge candidates need to be reordered or not may depend on decoded information (e.g., the width and/or height of the CU).
   a) In one example, if the height is larger than or equal to M, the width is larger than or equal to N, and width*height is larger than or equal to R, the merge candidates can be reordered.
    i. In one example, M, N, and R are set equal to 8, 8, and 128.
    ii. In one example, M, N, and R are set equal to 16, 16, and 512.
   b) In one example, if the height is larger than or equal to M and the width is larger than or equal to N, the merge candidates can be reordered.

i. In one example, M and N are set equal to 8 and 8.
   ii. In one example, M and N are set equal to 16 and 16.
6. The subgroup size can be adaptive.
   a) In one example, the subgroup size is decided according to the available number of adjacent spatial and/or STMVP and/or temporal merge candidates denoted as N.
      i. In one example, if N is smaller than M and larger than Q, the subgroup size is set to N;
      ii. In one example, if N is smaller than or equal to Q, no reordering is performed;
      iii. In one example, if N is larger than or equal to M, the subgroup size is set to M.
      iv. In one example, M and Q are set equal to 5 and 1, respectively.
         (i) Alternatively, M and/or Q may be pre-defined, or signaled or derived according to decoded information.
   b) In one example, the subgroup size is decided according to the available number of adjacent spatial and temporal merge candidates denoted as N.
      i. In one example, if N is smaller than M and larger than Q, the subgroup size is set to N;
      ii. In one example, if N is smaller than or equal to Q, no reorder is performed;
      iii. In one example, if N is larger than or equal to M, the subgroup size is set to M.
      iv. In one example, M and Q are set equal to 5 and 1, respectively.
7. The template shape can be adaptive.
   a) In one example, the template may only comprise neighboring samples left to the current block.
   b) In one example, the template may only comprise neighboring samples above to the current block.
   c) In one example, the template shape is selected according to the CU shape.
   d) In one example, the width of the left template is selected according to the CU height.
      i. For example, if H<=M, then the left template size is w1×H; otherwise, the left template size is w2×H.
   e) In one example, M, w1, and w2 are set equal to 8, 1, and 2, respectively.
   f) In one example, the height of the above template is selected according to the CU width.
      i. For example, if W<=N, then the above template size is W×h1; otherwise, the above template size is W×h2.
         (i) In one example, N, h1, and h2 are set equal to 8, 1, and 2, respectively.
   g) In one example, the width of the left template is selected according to the CU width.
      i. For example, if W<=N, then the left template size is w1×H; otherwise, the left template size is w2×H.
         (i) In one example, N, w1, and w2 are set equal to 8, 1, and 2, respectively.
   h) In one example, the height of the above template is selected according to the CU height.
      i. For example, if H<=M, then the above template size is W×h1; otherwise, the above template size is W×h2.
         (i) In one example, M, h1, and h2 are set equal to 8, 1, and 2, respectively.
   i) In one example, samples of the template and the reference samples of the template samples may be subsampled or downsampled before being used to calculate the cost.
      i. Whether to and/or how to do subsampling may depend on the CU dimensions.
      ii. In one example, no subsampling is performed for the short side of the CU.
8. In above examples, the merge candidate is one candidate which is included in the final merge candidate list (e.g., after pruning)
   a) Alternatively, the merge candidate is one candidate derived from a given spatial or temporal block or HMVP table or with other ways even it may not be included in the final merge candidate list.
9. The template may comprise samples of specific color component(s).
   a) In one example, the template only comprises samples of the luma component.
10. Whether to apply the adaptive merge candidate list reordering may depend on a message signaled in VPS/SPS/PPS/sequence header/picture header/slice header/CTU/CU/TU/PU. It may also be a region based on signaling. For example, the picture is partitioned into groups of CTU/CUs evenly or unevenly, and one flag is coded for each group to indicate whether merge candidate list reordering is applied or not.

2.23. Adaptive Motion Candidate List

1. The motion candidates in a motion candidate list of a block can be adaptively rearranged to derive the reordered motion candidate list according to one or some criterions, and the block is encoded/decoded according to the reordered motion candidate list.
   a. The motion candidates in a motion candidate list of a block which is not a regular merge candidate list can be adaptively rearranged to derive the reordered motion candidate list according to one or some criterions.
   b. In one example, whether to and/or how to reorder the motion candidates may depend on the coding mode (e.g. affine merge, affine AMVP, regular merge, regular AMVP, GPM,TPM, MMVD,TM merge, CIIP, GMVD, affine MMVD).
   c. In one example, whether to and/or how to reorder the motion candidates may depend on the category (e.g., spatial, temporal, STMVP, HMVP, pair-wise, SbTMVP, constructed affine, inherited affine) of the motion candidates.
   d. In one example, the motion candidate list may be the AMVP candidate list.
   e. In one example, the motion candidate list may be the merge candidate list.
   f. In one example, the motion candidate list may be the affine merge candidate list.
   g. In one example, the motion candidate list may be the sub-block-based merge candidate list.
   h. In one example, the motion candidate list may be the GPM merge candidate list.
   i. In one example, the motion candidate list may be the TPM merge candidate list.
   j. In one example, the motion candidate list may be the TM merge candidate list.
   k. In one example, the motion candidate list may be the candidate list for MMVD coded blocks.
   l. In one example, the motion candidate list may be the candidate list for DMVR coded blocks.

2. How to adaptively rearrange motion candidates in a motion candidate list may depend on the decoded information, e.g., the category of a motion candidate, a category of a motion candidate list, a coding tool.
   a. In one example, for different motion candidate lists, different criteria may be used to rearrange the motion candidate list.
      i. In one example, the criteria may include how to select the template.
      ii. In one example, the criteria may include how to calculate the template cost.
      iii. In one example, the criteria may include how many candidates and/or how many sub-groups in a candidate list need to be reordered.
   b. In one example, the motion candidates in a motion candidate list are firstly adaptively rearranged to construct a fully rearranged candidate list or partially rearranged candidate list, and at least one motion candidate indicated by at least one index is then retrieved from the rearranged candidate list to derive the final motion information to be used by the current block.
   c. In one example, the motion candidates before refinement (e.g., using TM for TM coded blocks; adding MVD for MMVD coded blocks) are firstly adaptively rearranged to construct a fully rearranged candidate list or partially rearranged candidate list. Then at least one motion candidate indicated by at least one index is retrieved from the rearranged candidate list, and refinement (e.g., using TM for TM coded blocks; adding MVD for MMVD coded blocks) is applied to the retrieved one to derive the final motion information for the current block.
   d. In one example, refinement (e.g., using TM for TM coded blocks; adding MVD for MMVD coded blocks) is applied to at least one of the motion candidates in a motion candidate list, then they are adaptively rearranged to construct a fully rearranged candidate list or partially rearranged candidate list, and at least one motion candidate indicated by at least one index is then retrieved from the rearranged candidate list to derive final the motion information without any further refinement for the current block.
3. In one example, new MERGE/AMVP motion candidates may be generated based on the candidates reordering.
   i. For example, L0 motion and L1 motion of the candidates may be reordered separately.
   ii. For example, new bi-prediction merge candidates may be constructed by combining one from the reordered L0 motion and the other from the reordered L1 motion.
   iii. For example, new uni-prediction merge candidates may be generated by the reordered L0 or L1 motion.

2.24. Adaptive Motion Candidate List

Figure 37:
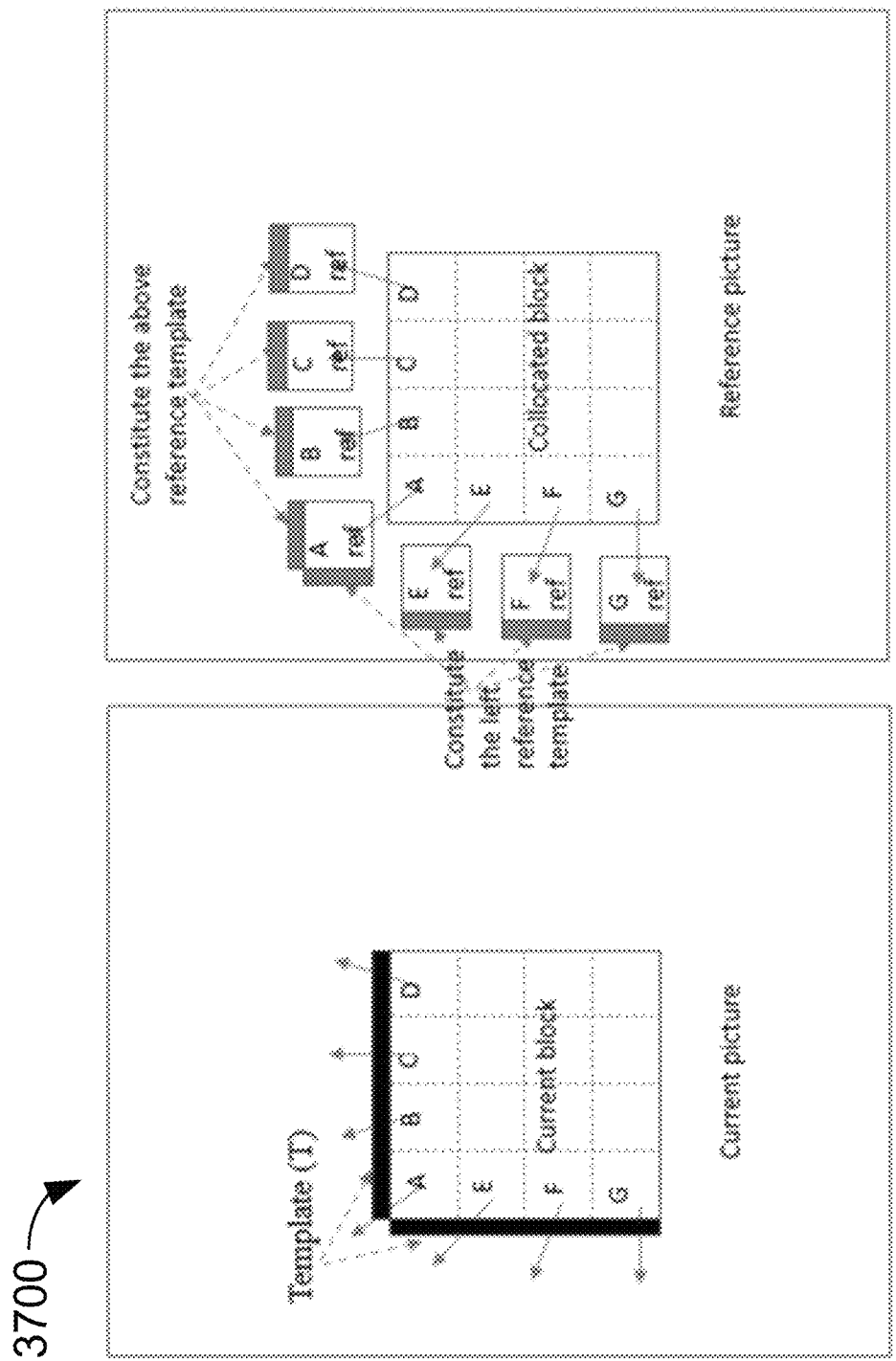
FIG. 37 illustrates a schematic diagram of template and reference samples of the template for block with sub-block motion using the motion information of the sub-blocks of current block.
Figure 38:
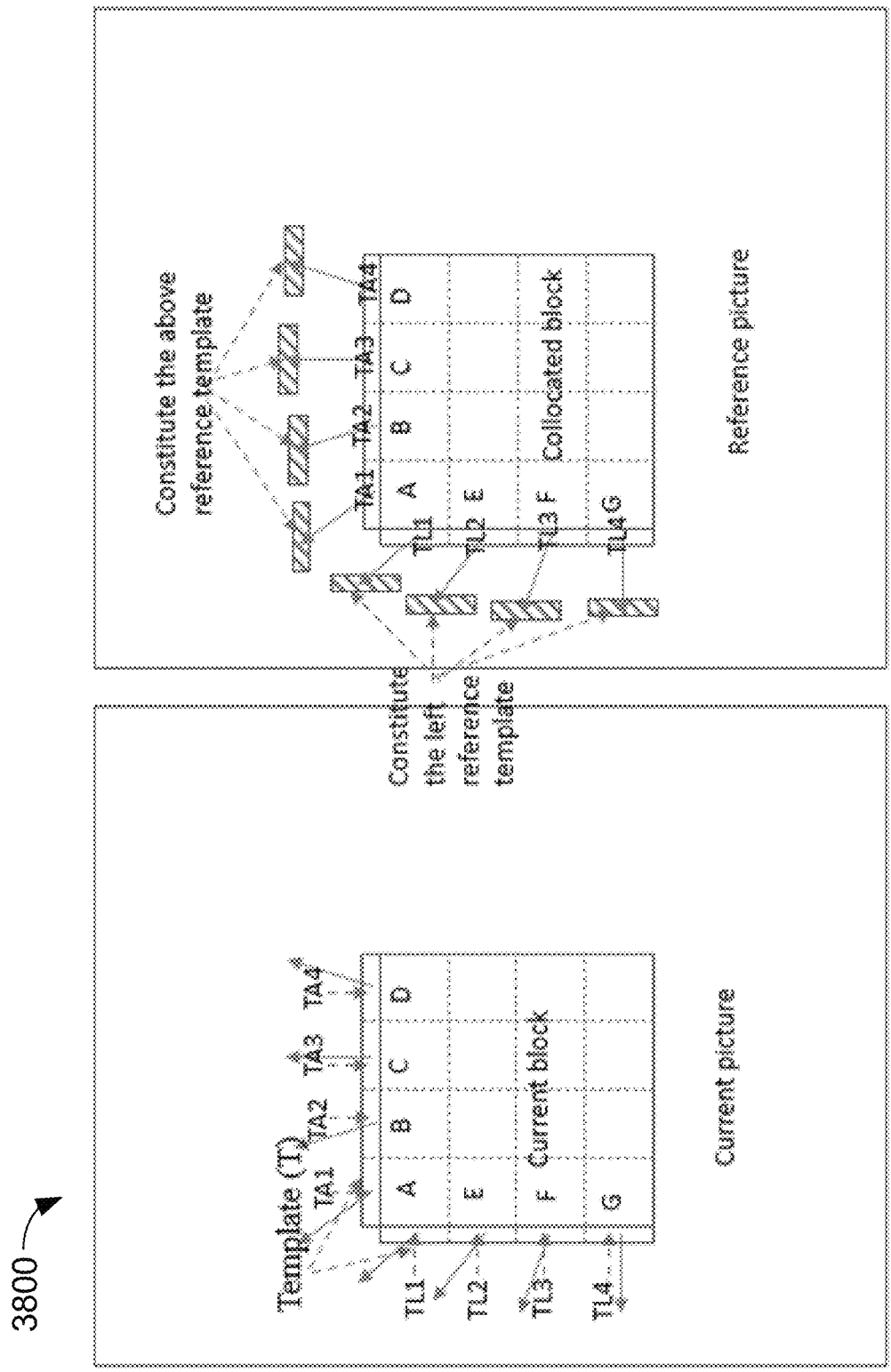
FIG. 38 illustrates a schematic diagram of template and reference samples of the template for block with sub-block motion using the motion information of each sub-template.

For subblock motion prediction, if the subblock size is Wsub*Hsub, the height of the above template is Ht, the width of the left template is Wt, the above template can be treated as a constitution of several sub-templates with the size of Wsub*Ht, the left template can be treated as a constitution of several sub-templates with the size of Wt*Hsub. After deriving the reference samples of each sub-template in the above similar way, the reference samples of the template are derived. Two examples are shown in FIG. 37 and FIG. 38. FIG. 37 illustrates a schematic diagram of template and reference samples of the template for block with sub-block motion using the motion information of the subblocks of current block. FIG. 38 illustrates a schematic diagram of template and reference samples of the template for block with sub-block motion using the motion information of each sub-template.

It is noted that the terminologies mentioned below are not limited to the specific ones defined in existing standards. Any variance of the coding tool is also applicable. For example, the term "GPM" is used to represent any coding tool that derive two sets of motion information and use the derived information and the splitting pattern to get the final prediction, e.g., TPM is also treated as GPM.

Note that the proposed methods may be applied to merge candidate list construction process for inter coded blocks (e.g., translational motion), affine coded blocks, or IBC coded blocks; or other motion candidate list construction process (e.g., normal AMVP list; affine AMVP list; IBC AMVP list).

W and H are the width and height of current block (e.g., luma block).

1. In one example, if the coding mode is TM merge, partial or full TM merge candidates may be reordered.
   a. In one example, if the coding mode is TM merge, the partial or full original TM merge candidates may be reordered, before the TM refinement process.
   b. Alternatively, if the coding mode is TM merge, the partial or full refined TM merge candidates may be reordered, after the TM refinement process.
   c. Alternatively, if the coding mode is TM merge, the TM merge candidates may not be reordered.
   d. Alternatively, the reordering method may be different for the TM merge mode and other merge modes.
2. In one example, if the coding mode is a subblock based merge mode, partial or full subblock based merge candidates may be reordered.
   a. Alternatively, the reordering method may be different for the subblock based merge mode and other merge modes
   b. In one example, a template may be divided into sub-templates. Each sub-template may possess an individual piece of motion information.
      i. In one example, the cost used to reorder the candidates may be derived based on the cost of each sub-template. For example, the cost used to reorder the candidates may be calculated as the sum of the costs of all sub-templates. For example, the cost for a sub-template may be calculated as SAD, SATD, SSD or any other distortion measurement between the sub-template and its corresponding reference sub-template.
   c. In one example, to derive the reference samples of a sub-template, the motion information of the sub-blocks in the first row and the first column of current block may be used.
      i. In one example, the motion information of a sub-template may be derived (e.g. copied) from its adjacent sub-block in the current block. An example is shown in FIG. 37.
   d. In one example, to derive the reference samples of a sub-template, the motion information of the sub-template may be derived without referring to motion information of a sub-block in the current block. An example is shown in FIG. 38.
      i. In one example, the motion information of each sub-template is calculated according to the affine model of current block.
         (i) In one example, the motion vector of the center sample of each subblock containing a sub-template calculated according to the affine model of current block is treated as the motion vector of the sub-template.

(ii) In one example, the motion vector of the center sample of each sub-template calculated according to the affine model of current block is treated as the motion vector of the sub-template.

(iii) For 4-parameter affine motion model, motion vector at sample location (x, y) in a block is derived as:

$$\begin{cases} mv_x = \dfrac{mv_{1x} - mv_{0x}}{W}x + \dfrac{mv_{0y} - mv_{1y}}{W}y + mv_{0x} \\ mv_y = \dfrac{mv_{1y} - mv_{0y}}{W}x + \dfrac{mv_x - mv_{0x}}{W}y + mv_{0y} \end{cases}$$

(iv) For 6-parameter affine motion model, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases}$$

(v) For (iii) and (iv), the coordinates of above-left, above-right, and bottom-left corner of current block are (0,0), (W,0) and (0,H), the motion vectors of above-left, above-right, and bottom-left corner of current block are $(mv_{0x}, mv_{0y})$, $(mv_{1x}, mv_{1y})$ and $(mv_{2x}, mv_{2y})$.

(vi) In one example, the coordinate (x, y) in the above equations may be set equal to a position in the template, or a position of a sub-template. E.g., the coordinate (x, y) may be set equal to a center position of a sub-template.

e. In one example, this scheme may be applied to affine merge candidates.

f. In one example, this scheme may be applied to affine AMVP candidates.

g. In one example, this scheme may be applied to SbTMVP merge candidate.

h. In one example, this scheme may be applied to GPM merge candidates.

i. In one example, this scheme may be applied to TPM merge candidates.

j. In one example, this scheme may be applied to TM-refinement merge candidates.

k. In one example, this scheme may be applied to DMVR-refinement merge candidates.

l. In one example, this scheme may be applied to MULTI_PASS_DMVR-refinement merge candidates.

3. In one example, if the coding mode is MMVD, the merge candidates to derive the base merge candidates may be reordered.

a. In one example, the reordering process may be applied on the merge candidates before the merge candidates is refined by the signaled or derived MVD(s).

b. For example, the reordering method may be different for the MMVD mode and other merge modes.

4. In one example, if the coding mode is MMVD, the merge candidates after the MMVD refinement may be reordered.

a. In one example, the reordering process may be applied on the merge candidates after the merge candidates is refined by the signaled or derived MVD(s).

b. For example, the reordering method may be different for the MMVD mode and other merge modes.

5. In one example, if the coding mode is affine MMVD, the merge candidates to derive the base merge candidates may be reordered.

a. In one example, the reordering process may be applied on the merge candidates before the affine merge candidates is refined by the signaled or derived MVD(s).

b. For example, the reordering method may be different for the affine MMVD mode and other merge modes.

6. In one example, if the coding mode is affine MMVD, the merge candidates after the affine MMVD refinement may be reordered.

a. In one example, the reordering process may be applied on the affine merge candidates after the merge candidates is refined by the signaled or derived MVD(s).

b. For example, the reordering method may be different for the affine MMVD mode and other merge modes.

7. In one example, if the coding mode is GMVD, the merge candidates to derive the base merge candidates may be reordered.

a. In one example, the reordering process may be applied on the merge candidates before the merge candidates is refined by the signaled or derived MVD(s).

b. For example, the reordering method may be different for the GMVD mode and other merge modes.

8. In one example, if the coding mode is GMVD, the merge candidates after the GMVD refinement may be reordered.

a. In one example, the reordering process may be applied on the merge candidates after the merge candidates is refined by the signaled or derived MVD(s).

b. For example, the reordering method may be different for the GMVD mode and other merge modes.

9. In one example, if the coding mode is GPM, the merge candidates may be reordered.

a. In one example, the reordering process may be applied on the original merge candidates before the merge candidates are used to derive the GPM candidate list for each partition (a.k.a. the uni-prediction candidate list for GPM).

b. In one example, if the coding mode is GPM, the merge candidates in the uni-prediction candidate list may be reordered.

c. In one example, the GPM uni-prediction candidate list may be constructed based on the reordering.

i. In one example, a candidate with bi-prediction (a.k.a. bi-prediction candidate) may be separated into two uni-prediction candidates.

(i) If the number of original merge candidates is M, at most 2M uni-prediction candidates may be separated from them.

ii. In one example, uni-prediction candidates separated from a bi-prediction candidate may be put into an initial uni-prediction candidate list.

iii. In one example, candidates in the initial uni-prediction candidate list may be reordered with the template matching costs.

iv. In one example, the first N uni-prediction candidates with smaller template matching costs may be used as the final GPM uni-prediction candidates. As an example, N is equal to M.
d. In one example, after deriving a GPM uni-prediction candidate list, a combined bi-prediction list for partition 0 and partition 1 is constructed, then the bi-prediction list is reordered.
i. In one example, if the number of GPM uni-prediction candidates is M, the number of combined bi-prediction candidates is M*(M−1).
e. Alternatively, the reordering method may be different for the GPM mode and other merge modes.

2.25. Adaptive Motion Candidate List

It is noted that the terminologies mentioned below are not limited to the specific ones defined in existing standards. Any variance of the coding tool is also applicable. For example, the term "GPM" is used to represent any coding tool that derive two sets of motion information and use the derived information and the splitting pattern to get the final prediction, e.g., TPM is also treated as GPM.

Note that the proposed methods may be applied to merge candidate list construction process for inter coded blocks (e.g., translational motion), affine coded blocks, or IBC coded blocks; or other motion candidate list construction process (e.g., normal AMVP list; affine AMVP list; IBC AMVP list).

W and H are the width and height of current block (e.g., luma block).

1. The reference samples of a template or sub-template (RT) for bi-directional prediction are derived by equal weighted averaging of the reference samples of the template or sub-template in reference list0 ($RT_0$) and the reference samples of the template or sub-template in reference list1 ($RT_1$). One example is as follows:

$$RT(x, y) = (RT_0(x, y) + RT_1(x, y) + 1) \gg 1$$

2. The reference samples of a template or sub-template (RT) for bi-directional prediction are derived by weighted averaging of the reference samples of the template or sub-template in reference list0 ($RT_0$) and the reference samples of the template or sub-template in reference list1 ($RT_1$).
a. One example is as follows:

$$RT(x, y) = \left((2^N - w) * RT_0(x, y) + w * RT_1(x, y) + 2^{N-1}\right) \gg N,$$

for example, N=3.
b. The weights may be determined by the BCW index or derived on-the-fly or pre-defined or by the weights used in weighted prediction.
c. In one example, the weight of the reference template in reference list0 such as (8−w) and the weight of the reference template in reference list1 such as (w) maybe decided by the BCW index of the merge candidate.
i. In one example, BCW index is equal to 0, w is set equal to −2.
ii. In one example, BCW index is equal to 1, w is set equal to 3.
iii. In one example, BCW index is equal to 2, w is set equal to 4.
iv. In one example, BCW index is equal to 3, w is set equal to 5.
v. In one example, BCW index is equal to 4, w is set equal to 10.

Figure 39:
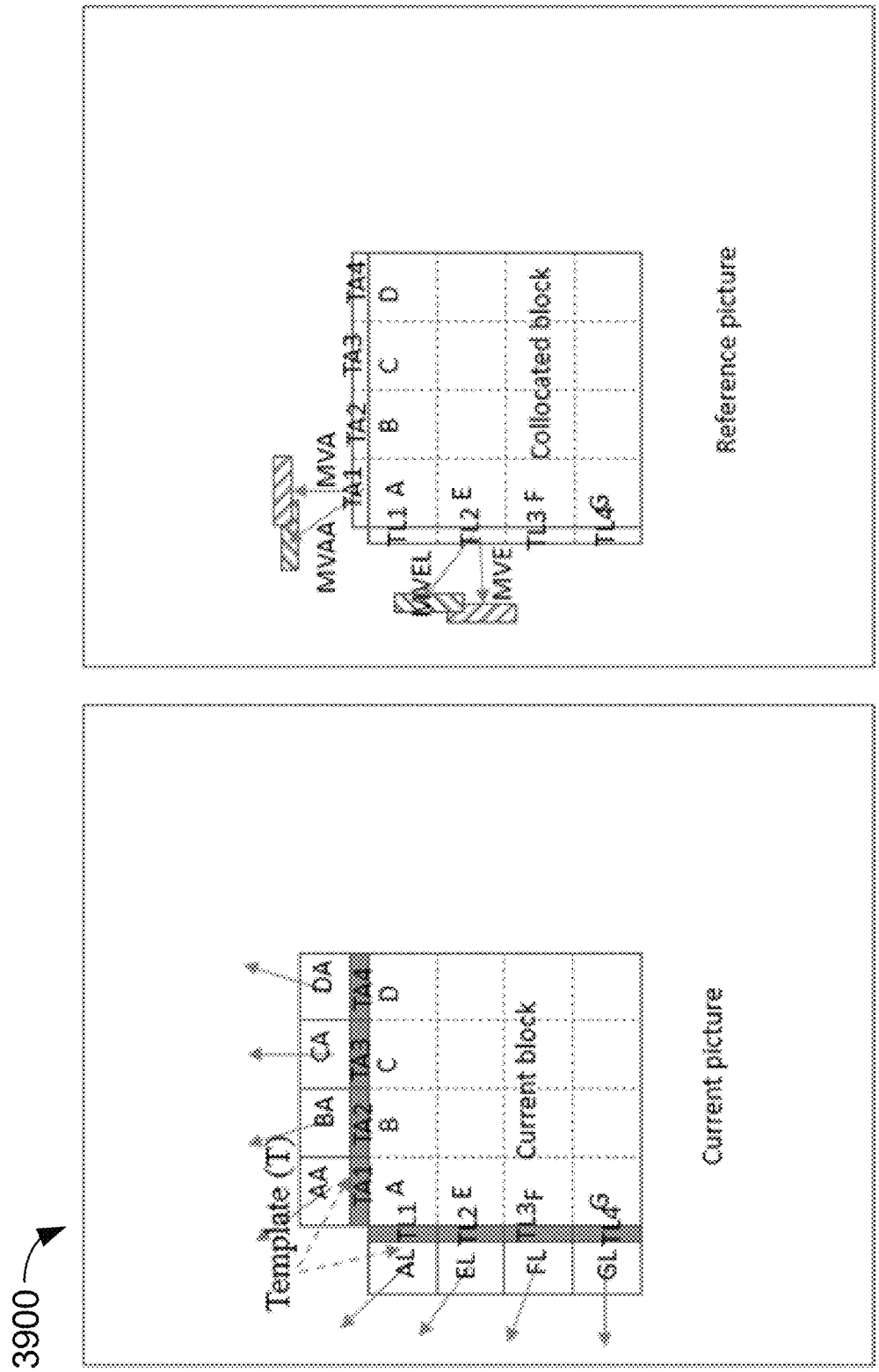
FIG. 39 illustrates a schematic diagram of template and reference samples of the template for block with OBMC.

3. It is proposed that the reference samples of the template may be derived with LIC method.
a. In one example, the LIC parameters for both left and above templates are the same as the LIC parameters of current block.
b. In one example, the LIC parameters for left template are derived as the LIC parameters of current block which uses its original motion vector plus a motion vector offset of (−Wt, 0) as the motion vector of current block.
c. In one example, the LIC parameters for above template are derived as the LIC parameters of current block which uses its original motion vector plus a motion vector offset of (0, −Ht) as the motion vector of current block.
d. Alternatively, furthermore, the above bullets may be applied if the Local Illumination Compensation (LIC) flag of a merge candidate is true 4. It is proposed that the reference samples of the template or sub-template may be derived with OBMC method. In the following discussion, a "template" may refer to a template or a sub-template.
a. In one example, to derive the reference samples of the above template, the motion information of the subblocks in the first row of current block and their above adjacent neighboring subblocks are used. And the reference samples of all the sub-templates constitute the reference samples of the above template. An example is shown in FIG. 39.
b. In one example, to derive the reference samples of the left template, the motion information of the subblocks in the first column of current block and their left adjacent neighboring subblocks are used. And the reference samples of all the sub-templates constitute the reference samples of the left template. An example is shown in FIG. 39.
c. In one example, the subblock size is 4×4.
d. The reference samples of a sub-template based on motion vectors of a neighbouring subblock is denoted as $P_N$, with N indicating an index for the neighbouring above and left subblocks and the reference samples of a sub-template based on motion vectors of a subblock of current block is denoted as $P_C$. For $P_N$ generated based on motion vectors of vertically (horizontally) neighbouring sub-block, samples in the same row (column) of $P_N$ are added to $P_C$ with a same weighting factor.
i. The reference samples of a sub-template (P) may be derived as $P=W_N*P_N+W_C*P_C$
ii. In one example, the weighting factors {1/4, 1/8, 1/16, 1/32} are used for the {first, second, third, fourth} row (column) of $P_N$ and the weighting factors {3/4, 7/8, 15/16, 31/32} are used for the {first, second, third, fourth} row (column) of $P_C$ if the height of the above template or the width of the left template is larger than or equal to 4.
iii. In one example, the weighting factors {1/4, 1/8} are used for the {first, second} row (column) of $P_N$ and the weighting factors {3/4, 7/8} are used for the {first, second} row (column) of $P_C$ if the height of the above template or the width of the left template is larger than or equal to 2.

iv. In one example, the weighting factor {¼} is used for the first row (column) of $P_N$ and the weighting factor {¾} is used for the first row (column) of $P_C$ if the height of the above template or the width of the left template is larger than or equal to 1.
e. The above bullets may be applied if a merge candidate is assigned with OBMC enabled.
5. In one example, if a merge candidate uses multi-hypothesis prediction, the reference samples of the template may be derived with multi-hypothesis prediction method.
6. The template may comprise samples of specific color component(s).
a. In one example, the template only comprises samples of the luma component.
b. Alternatively, the template only comprises samples of any component such as Cb/Cr/R/G/B.
7. Whether to and/or how to reorder the motion candidates may depend on the category of the motion candidates.
a. In one example, only adjacent spatial and temporal motion candidates can be reordered.
b. In one example, only adjacent spatial, STMVP, and temporal motion candidates can be reordered.
c. In one example, only adjacent spatial, STMVP, temporal and non-adjacent spatial motion candidates can be reordered.
d. In one example, only adjacent spatial, STMVP, temporal, non-adjacent spatial and HMVP motion candidates can be reordered.
e. In one example, only adjacent spatial, STMVP, temporal, non-adjacent spatial, HMVP and pair-wise average motion candidates can be reordered.
f. In one example, only adjacent spatial, temporal, HMVP and pair-wise average motion candidates can be reordered.
g. In one example, only adjacent spatial, temporal, and HMVP motion candidates can be reordered.
h. In one example, only adjacent spatial motion candidates can be reordered.
i. In one example, the uni-prediction subblock based motion candidates are not reordered.
j. In one example, the SbTMVP candidate is not reordered.
k. In one example, the inherited affine motion candidates are not reordered.
l. In one example, the constructed affine motion candidates are not reordered.
m. In one example, the zero padding affine motion candidates are not reordered.
n. In one example, only the first N motion candidates can be reordered.
i. In one example, N is set equal to 5.
8. In one example, the motion candidates may be divided into subgroups. Whether to and/or how to reorder the motion candidates may depend on the subgroup of the motion candidates.
a. In one example, only the first subgroup can be reordered.
b. In one example, the last subgroup can not be reordered.
c. In one example, the last subgroup can not be reordered. But if the last subgroup also is the first subgroup, it can be reordered.
d. Different subgroups may be reordered separately.
e. Two candidates in different subgroups cannot be compared and/or reordered.
f. A first candidate in a first subgroup must be put ahead of a second candidate in a second subgroup after reordering if the first subgroup is ahead of a second subgroup.
9. In one example, the motion candidates which are not included in the reordering process may be treated in specified way.
a. In one example, for the candidates not to be reordered, they will be arranged in the merge candidate list according to the initial order.
b. In one example, candidates not to be reordered may be put behind the candidates to be reordered.
c. In one example, candidates not to be reordered may be put before the candidates to be reordered.
10. Whether to apply the adaptive merge candidate list reordering may depend on a message signaled in VPS/SPS/PPS/sequence header/picture header/slice header/CTU/CU/TU/PU. It may also be a region based on signaling. For example, the picture is partitioned into groups of CTU/CUs evenly or unevenly, and one flag is coded for each group to indicate whether merge candidate list reordering is applied or not.

2.26. Sign Prediction

This contribution proposes a method of prediction for the signs of luma residual coefficients. A number of signs per TU can be predicted, limited by a configuration parameter and the number of coefficients present. When predicting n signs in a TU, the encoder and decoder perform n+1 partial inverse transformations and $2^n$ border reconstructions corresponding to the $2^n$ sign combination hypotheses, with a border-cost measure for each. These costs are examined to determine sign prediction values, and the encoder transmits a sign residual for each predicted sign indicating whether the prediction for that sign is correct or not using two additional CABAC contexts. The decoder reads these sign residuals and later uses them during reconstruction to determine the correct signs to apply after making its own predictions Encoder Prior to encoding coefficients in a TU, the encoder now determines which signs to predict, and predicts them. Hypothesis processing as described below is performed during RDO decision making. The prediction results (correct or incorrect, per sign being predicted) are stored in the CU for use in later encoding.

During the final encoding stage, this stored data is used to reproduce the final bitstream containing sign residues.

Hypothesis Generation

The encoder initially dequantizes the TU and then chooses n coefficients for which signs will be predicted. The coefficients are scanned in raster-scan order, and dequantized values over a defined threshold are preferred over values lower than that threshold when collecting the n coefficients to treat.

With these n values, $2^n$ simplified border reconstructions are performed as described below, one reconstruction per unique combination of signs for the n coefficients.

For a particular reconstruction, only the leftmost and topmost pixels of the block are recreated from the inverse transformation added to the block prediction. Although the first (vertical) inverse transform is complete, the second (horizontal) inverse transform only has to create the leftmost and topmost pixel outputs and is thus faster. An additional flag, "topLeft", has been added to inverse transform functions to allow this.

In addition, the number of inverse transform operations performed is reduced by using a system of 'templates'. In this way, when predicting n signs in a block, only n+1 inverse transform operations are performed:
1. A single inverse transform operating on the dequantized coefficients, where the values of all signs being predicted are set positive. Once added to the prediction of the current block, this corresponds to the border reconstruction for the first hypothesis.
2. For each of the n coefficients having their signs predicted, an inverse transform operation is performed on an otherwise empty block containing the corresponding dequantized (and positive) coefficient as its only non-null element. The leftmost and topmost border values are saved in what is termed a 'template' for use during later reconstructions.

Border reconstruction for a later hypothesis starts by taking an appropriate saved reconstruction of a previous hypothesis which only needs a single predicted sign to be changed from positive to negative in order to construct the desired current hypothesis. This change of sign is then approximated by the doubling and subtraction from the hypothesis border of the template corresponding to the sign being predicted. The border reconstruction, after costing, is then saved if it is known to be reused for constructing later hypotheses.

| Template Name | How to Create |
| --- | --- |
| T001 | inv xform single +ve $1^{st}$ sign-hidden coeff |
| T010 | inv xform single +ve $2^{nd}$ sign-hidden coeff |
| T100 | inv xform single +ve $3^{rd}$ sign-hidden coeff |

| Hypothesis | How to Create | Store for later reuse as |
| --- | --- | --- |
| H000 | inv xform all coeffs add to pred | H000 |
| H001 | H000 − 2*T001 | |
| H010 | H000 − 2*T010 | H010 |
| H011 | H010 − 2*T001 | |
| H100 | H000 − 2*T100 | H100 |
| H101 | H100 − 2*T001 | |
| H110 | H100 − 2*T010 | H110 |
| H111 | H110 − 2*T001 | |

Table showing save/restore and template application for 3 sign 8 entry case

Note that these approximations are used only during the process of sign prediction, not during final reconstruction.

Hypothesis Costing

There is a cost associated with each hypothesis that corresponds to the concept of image continuity at the block border. It is by minimizing this cost that sign prediction values are found.

Figure 40:
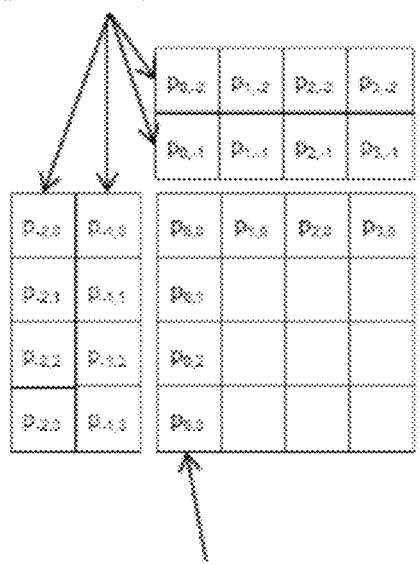
FIG. 40 illustrates a schematic diagram of costing a hypothesis reconstructed border.

FIG. 40 illustrates a schematic diagram of costing a hypothesis reconstructed border. As shown in FIG. 40, for each reconstructed pixel $p_{0,y}$ at the LHS of the reconstructed block, a simple linear prediction using the two pixels to the left is performed to get its prediction $pred_{0,y}=(2p_{-1,y}-p_{-2,y})$. The absolute difference between this prediction and the reconstructed pixel $p_{0,y}$ is added to the cost of the hypothesis.

Similar processing occurs for pixels in the top row of the reconstructed block, summing the absolute differences of each prediction $pred_{x,0}=(2p_{x,-1}-p_{x,-2})$ and reconstructed pixel $p_{x,0}$.

Prediction of Multiple Signs

For each sign to be predicted, the encoder searches for the hypothesis having the lowest cost that agrees with the true values of the signs already transmitted. (Initially, with no sign residues transmitted, this simply corresponds to the lowest cost hypothesis.) The predicted value of the current sign is taken from this hypothesis.

If the prediction corresponds to the true value of the sign, a "0" is sent as the sign residue, otherwise a "1" is sent.

Final Signaling

One of two CABAC contexts are used when signaling a particular sign prediction residue. The CABAC context to use is determined by whether or not the associated dequantized coefficient is lower or higher than a threshold. Prediction residues for higher-valued coefficients are sent through a CABAC context initialized to expect a higher probability of a correct prediction (ie, a higher probability of expecting a zero residue). The current context initializations are around 58% (lower than threshold) and 74% (equal to or higher than threshold).

Other Bitstream Changes

It should be noted that as part of the software modifications applied to JEM3, the signaling of signs of all coefficients (luma, chroma, predicted and non-predicted) has been moved to the end of the TU block. i.e., signs are no longer signaled per CG. This is necessary for luma as will be seen below: the decoder needs access to all coefficient values in the TU in order to determine the signs that are predicted and that, accordingly, have only their prediction residues in the bitstream.

Although not strictly necessary for chroma as signs are never predicted for chroma, moving chroma signs to the end of the TU avoids the necessity of two different logic paths.

Decoder 2.26.2.1. Parsing

The decoder, as part of its parsing process, parses coefficients, signs and sign residues. The signs and sign residues are parsed at the end of the TU, and at that time the decoder knows the absolute values of all coefficients. Thus it can determine what signs are predicted and, for each predicted sign, it can determine the context to use to parse the sign prediction residue based on the dequantized coefficient value.

The knowledge of a "correct" or "incorrect" prediction is simply stored as part of the CU data of the block being parsed. The real sign of the coefficient is not known at this point.

2.26.2.2. Reconstruction

Later, during reconstruction, the decoder performs operations similar to the encoder (as described above for the encoder during its RDO). For n signs being predicted in the TU, the decoder performs n+1 inverse transform operations, and $2^n$ border reconstructions to determine hypothesis costs.

The real sign to apply to a coefficient that has had its sign predicted is determined by an exclusive-or operation on:
1. The predicted value of the sign.
2. The "correct" or "incorrect" data stored in the CU during bitstream parsing.

Interaction with Sign Data Hiding

In each TU where the sign of a coefficient is "hidden" using the existing Sign Data Hiding mechanism, sign prediction simply treats such coefficient as "not available" for its own prediction technique and it will predict only using others.

2.27. Decoder-Side Intra Mode Derivation (DIMD)

Three angular modes are selected from a Histogram of Gradient (HoG) computed from the neighboring pixels of current block. Once the three modes are selected, their predictors are computed normally and then their weighted average is used as the final predictor of the block. To determine the weights, corresponding amplitudes in the HoG are used for each of the three modes. The DIMD mode is used as an alternative prediction mode and is always checked in the FullRD mode.

Current version of DIMD has modified some aspects in the signaling, HoG computation and the prediction fusion. The purpose of this modification is to improve the coding performance as well as addressing the complexity concerns raised during the last meeting (i.e. throughput of 4×4 blocks). The following sections describe the modifications for each aspect.

Signalling

Figure 41:
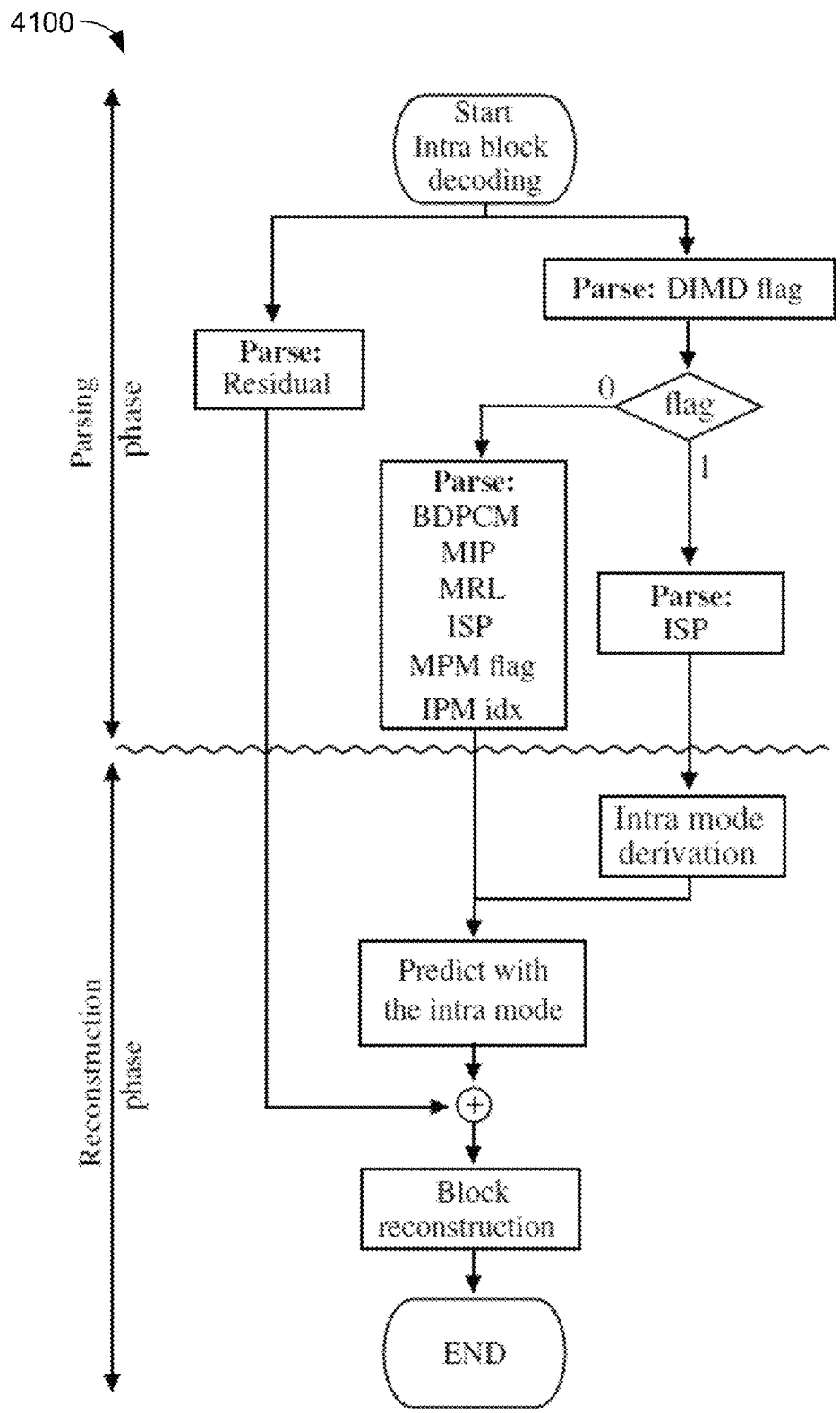
FIG. 41 illustrates a schematic diagram of a proposed intra block decoding process.

FIG. 41 illustrates a schematic diagram of a proposed intra block decoding process. FIG. 41 shows the order of parsing flags/indices in VTM5, integrated with the proposed DIMD.

As can be seen, the DIMD flag of the block is parsed first using a single CABAC context, which is initialized to the default value of 154.

If flag==0, then the parsing continues normally.

Else (if flag==1), only the ISP index is parsed and the following flags/indices are inferred to be zero: BDPCM flag, MIP flag, MRL index. In this case, the entire IPM parsing is also skipped.

During the parsing phase, when a regular non-DIMD block inquires the IPM of its DIMD neighbor, the mode PLANAR_IDX is used as the virtual IPM of the DIMD block.

Texture Analysis

Figure 42:
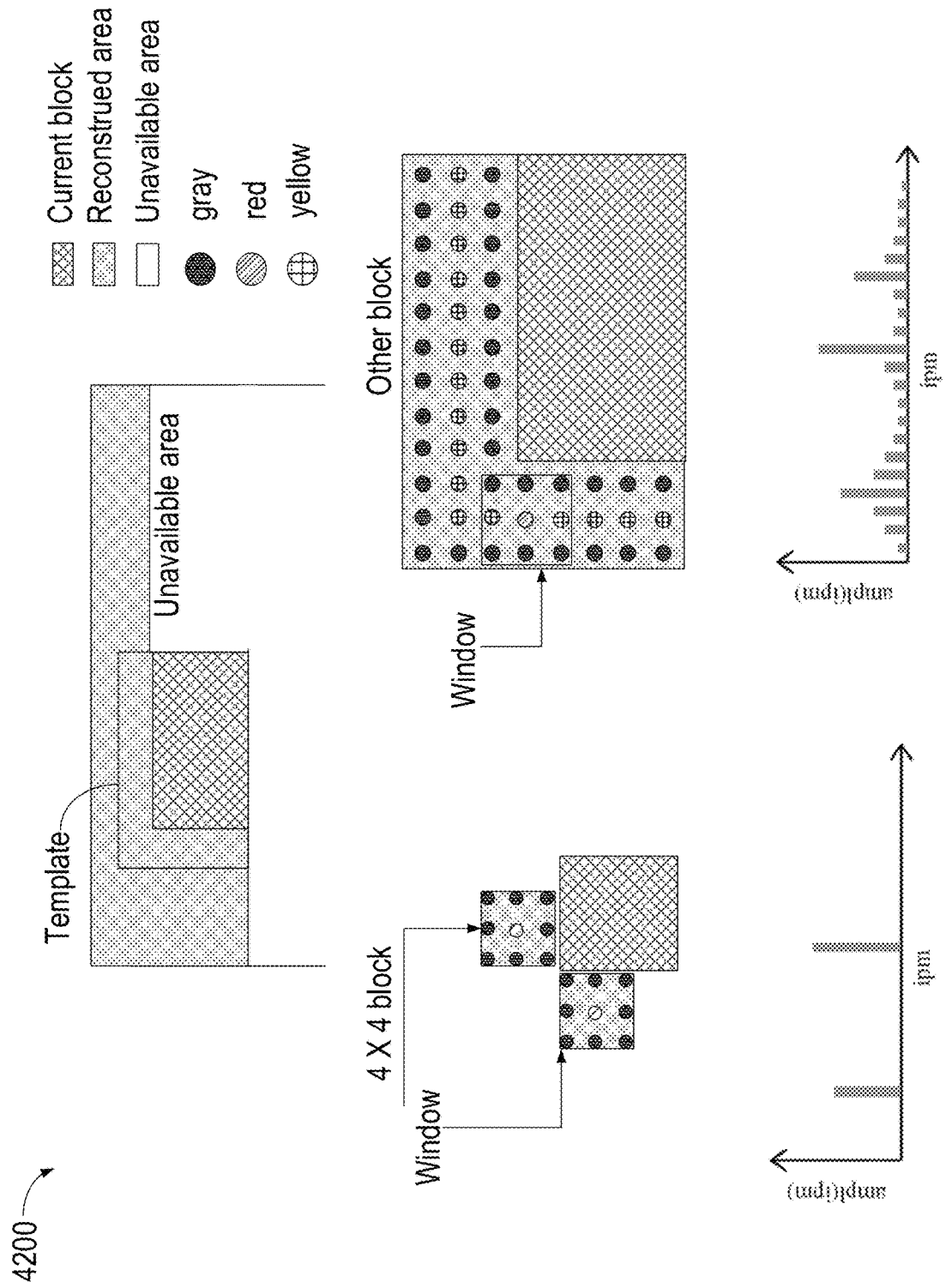
FIG. 42 illustrates a schematic diagram of HoG computation from a template of width 3 pixels.

The texture analysis of DIMD includes a Histogram of Gradient (HoG) computation (as shown in FIG. 42). FIG. 42 illustrates a schematic diagram of HoG computation from a template of width 3 pixels. The HoG computation is carried out by applying horizontal and vertical Sobel filters on pixels in a template of width 3 around the block. Except, if above template pixels fall into a different CTU, then they will not be used in the texture analysis.

Once computed, the IPMs corresponding to two tallest histogram bars are selected for the block.

In previous versions, all pixels in the middle line of the template were involved in the HoG computation. However, the current version improves the throughput of this process by applying the Sobel filter more sparsely on 4×4 blocks. To this aim, only one pixel from left and one pixel from above are used. This is shown in FIG. 42.

In addition to reduction in the number of operations for gradient computation, this property also simplifies the selection of best 2 modes from the HoG, as the resulting HoG cannot have more than two non-zero amplitudes.

Prediction Fusion

Like the previous version, the current version of the method also uses a fusion of three predictors for each block. However, the choice of prediction modes is different and makes use of the combined hypothesis intra-prediction method, where the Planar mode is considered to be used in combination with other modes when computing an intra-predicted candidate. In the current version, the two IPMs corresponding to two tallest HoG bars are combined with the Planar mode.

Figure 43:
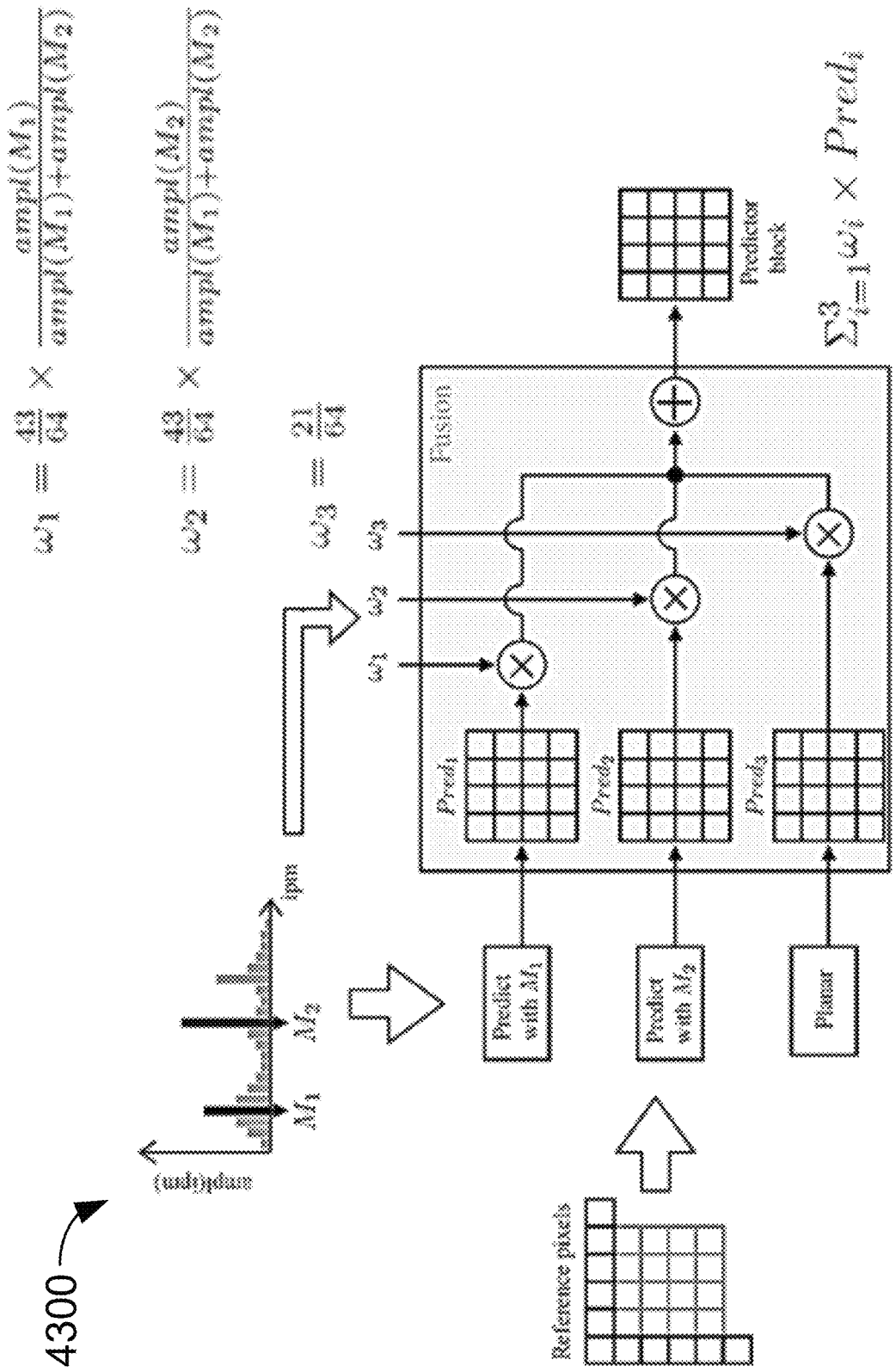
FIG. 43 illustrates a schematic diagram of prediction fusion by weighted averaging of two HoG modes and planar.

The prediction fusion is applied as a weighted average of the above three predictors. To this aim, the weight of planar is fixed to $21/64$ (~1/3). The remaining weight of $43/64$ (~2/3) is then shared between the two HoG IPMs, proportionally to the amplitude of their HoG bars. FIG. 43 visualises this process. FIG. 43 illustrates a schematic diagram of prediction fusion by weighted averaging of two HoG modes and planar.

2.28. DIMD

When DIMD is applied, two intra modes are derived from the reconstructed neighbor samples, and those two predictors are combined with the planar mode predictor with the weights derived from the gradients.

Derived intra modes are included into the primary list of intra most probable modes (MPM), so the DIMD process is performed before the MPM list is constructed. The primary derived intra mode of a DIMD block is stored with a block and is used for MPM list construction of the neighboring blocks.

2.29. Template-Based Intra Mode Derivation Using MPMs

This contribution proposes a template-based intra mode derivation (TIMD) method using MPMs, in which a TIMD mode is derived from MPMs using the neighbouring template. The TIMD mode is used as an additional intra prediction method for a CU.

TIMD Mode Derivation

For each intra prediction mode in MPMs, The SATD between the prediction and reconstruction samples of the template is calculated. The intra prediction mode with the minimum SATD is selected as the TIMD mode and used for intra prediction of current CU. Position dependent intra prediction combination (PDPC) is included in the derivation of the TIMD mode.

TIMD Signalling

A flag is signalled in sequence parameter set (SPS) to enable/disable the proposed method. When the flag is true, a CU level flag is signalled to indicate whether the proposed TIMD method is used. The TIMD flag is signalled right after the MIP flag. If the TIMD flag is equal to true, the remaining syntax elements related to luma intra prediction mode, including MRL, ISP, and normal parsing stage for luma intra prediction modes, are all skipped.

Interaction with New Coding Tools

A DIMD method with prediction fusion using Planar was integrated in EE2. When EE2 DIMD flag is equal to true, the proposed TIMD flag is not signalled and set equal to false.

Similar to PDPC, Gradient PDPC is also included in the derivation of the TIMD mode.

When secondary MPM is enabled, both the primary MPMs and the secondary MPMs are used to derive the TIMD mode.

6-tap interpolation filter is not used in the derivation of the TIMD mode.

Modification of MPM List Construction in the Derivation of TIMD Mode

During the construction of MPM list, intra prediction mode of a neighbouring block is derived as Planar when it is inter-coded. To improve the accuracy of MPM list, when a neighbouring block is inter-coded, a propagated intra prediction mode is derived using the motion vector and reference picture and used in the construction of MPM list. This modification is only applied to the derivation of the TIMD mode.

2.30. Intra Template Matching

Figure 44:
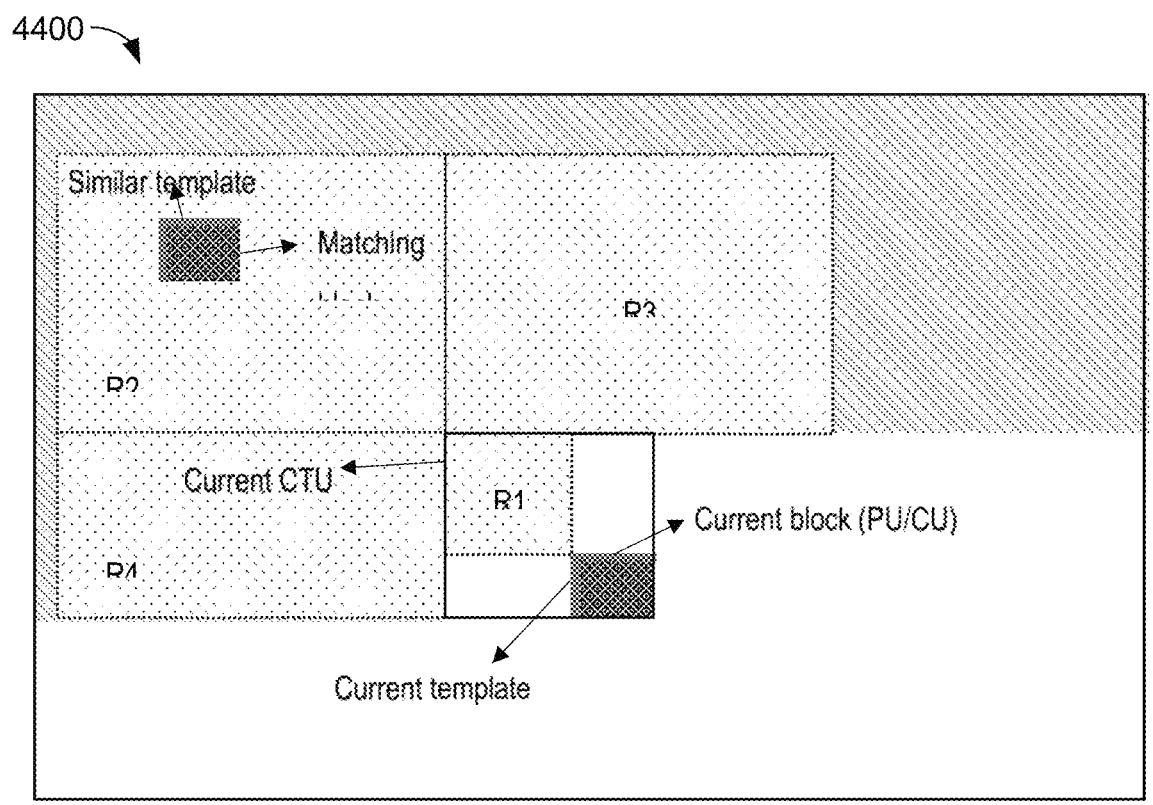
FIG. 44 illustrates a schematic diagram of an intra template matching search area used.

Template matching prediction is a coding tool that is mostly adapted for screen content coding. The prediction signal is generated at the decoder side by matching the L-shaped causal neighbor of the current block with another block in a predefined search area. This is illustrated in FIG. 44. FIG. 44 illustrates a schematic diagram of an intra template matching search area used. Specifically, the search range is divided into 3 regions:

R1: within the current CTU
R2: top-left outside the current CTU
R3: above the current CTU
R4: left to the current CTU Within each region, the decoder searches for the template the has least SAD with respect to the current one and uses its corresponding block as a prediction block.

The dimensions of all regions (SearchRange_w, SearchRange_h) are set proportional to the block dimension (BlkW, BlkH) in order to have a fixed number of SAD comparisons per pixel. That is:

$$SearchRange\_w = a * BlkW$$
$$SearchRange\_h = a * BlkH$$

Where '$\alpha$' is a constant that controls the gain/complexity trade-off.

2.31. Coding Data Refinement in Image/Video Coding

The term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular.

In the disclosure, the phrase "motion candidate" may represent a merge motion candidate in a regular/extended merge list indicated by a merge candidate index, or an AMVP motion candidate in regular/extended AMVP list indicated by an AMVP candidate index, or one AMVP motion candidate, or one merge motion candidate.

In the disclosure, a motion candidate is called to be "refined" if the motion information of the candidate is modified according to information signaled from the encoder or derived at the decoder. For example, a motion vector may be refined by DMVR, FRUC, TM merge, TM AMVP, TM GPM, TM CIIP, TM affine, MMVD, GMVD, affine MMVD, BDOF and so on.

In the disclosure, the phrase "coding data refinement" may represent a refinement process in order to derive or refine the signalled/decoded/derived prediction modes, prediction directions, or signalled/decoded/derived motion information, prediction and/or reconstruction samples for a block. In one example, the refinement process may include motion candidate reordering.

In the following discussion, a "template-based-coded" block may refer to a block using a template matching based method in the coding/decoding process to derive or refine coded information, such as template-matching based motion derivation, template-matching based motion list reconstruction, LIC, sign prediction, template-matching based block vector (e.g., used in IBC mode) derivation, DIMD, template-matching based non-inter (e.g., intra) prediction, etc. The template-based-coded method may be combined with any other coding tools, such as MMVD, CIIP, GPM, FRUC, Affine, BDOF, DMVR, OBMC, etc. In yet another example, the "template-based-coded" block may also refer to a block which derives or refines its decoded information based on certain rules using neighboring reconstructed samples (adjacent or non-adjacent), e.g., the DIMD method in 2.27 and the TIMD method 2.29).

In the following discussion, a "bilateral-based-coded" block may refer to a block using a bilateral matching based method in the coding/decoding process to derive or refine coded information, such as bilateral-matching based motion derivation, bilateral-matching based motion list reconstruction, and etc. The bilateral-based-coded method may be combined with any other coding tools, such as MMVD, CIIP, GPM, FRUC, Affine, DMVR, and etc.

W and H are the width and height of current block (e.g., luma block). W*H is the size of current block (e.g., luma block)

In the following discussion, Shift(x, s) is defined as
Shift(x, s)=(x+offset)>>s, wherein offset is an integer such as offset=0 or offset=1<<(s−1) or offset=(1<<(s−1))−1.

In another example, offset depends on x. For example, offset=(x<0?(1<<(s−1)): ((1<<(s−1)−1).

1. In addition to the error measurement, it is proposed to add a regulation item in the cost calculation process.
   a) In one example, the cost is defined as: E+W*RI wherein the E represents the output of an error function, W is the weight applied to the regulation item denoted by RI.
      i. In one example, for processing the template-based-coded block/bilateral-based-coded block, the cost function is set to: E+W*RI wherein E may be SAD/MRSAD/SATD or others, RI is the estimated bits for motion vectors/motion vector differences, W is a weight, e.g., which may rely on QP/temporal layer etc. al.
      ii. Alternatively, the cost is defined as: w0*E+W1*RI wherein the E represents the output of an error function, W1 is the weight applied to the regulation item denoted by RI, w0 is the weight applied to the output of the error function.
         (i) Alternatively, furthermore, W1 may be set to 0.
   b) In one example, the regulation item is multiplied by a weighted rate.
      i. In one example, the weight is derived on-the-fly.
      ii. In one example, the weight is set to lambda used in the full RDO process
      iii. In one example, the weight is set to a square root of the lambda used in the full RDO process.
   c) In one example, the cost is calculated as E+Shift (W*RI, s), wherein s and W are integers.
      i. Alternatively, the cost is calculated as Shift ((E<<s)+W*RI, s), wherein s and W are integers.
2. It is proposed to use an error function different from SAD/MR-SAD (mean removal sum of absolute difference) for processing a template-based-coded block/bilateral-based-coded block.
   a) In one example, the error function may be
      i. SATD
      ii. MR-SATD
      iii. Gradient information
      iv. SSE/SSD
      v. MR-SSE/MR-SSD
      vi. Weighted SAD/weighted MR-SAD
      vii. Weighted SATD/weighted MR-SATD
      viii. Weighted SSD/weighted MR-SSD
      ix. Weighted SSE/weighted MR-SSE
   b) Alternatively, furthermore, it is proposed to adaptively select the error function among different cost functions such as the above mentioned error functions and SAD/MR-SAD.
      i. The selection may be determined on-the-fly.
3. When using the MR-X (e.g., X being SATD, SAD, SSE) based error function (e.g., MR-SAD/MR-SATD etc. al), the following may further apply:
   a) In one example, the mean may be calculated with all samples in a block to be compared taken into consideration.

b) In one example, the mean may be calculated with partial samples in a block to be compared taken into consideration.
c) In one example, the mean and the X function may depend on same samples in a block.
  i. In one example, the mean and X function may be calculated with all samples in the block.
  ii. In one example, the mean and X function may be calculated with partial samples in the block.
d) In one example, the mean and the X function may depend on at least one different samples in a block.
  i. In one example, the mean may be calculated with all samples while the X function may depend on partial samples in the block.
  ii. In one example, the mean may be calculated with partial samples while the X function may depend on all samples in the block.
4. The template/bilateral matching cost may be calculated by applying a cost factor to the error cost function.
  a) In one example, it is proposed to favor the motion candidates ahead during the template/bilateral matching based reordering process.
    i. In one example, the motion candidate in the ith position is assigned with a smaller cost factor than the cost factor of the motion candidate in the (i+1)th position.
    ii. In one example, the motion candidates in the ith group (e.g. involve M motion candidates) are assigned with a smaller cost factor than the cost factor of the motion candidates in the (i+1)th group (e.g. involve N motion candidates).
      (i) In one example, M may be equal to N. For example, M=N=2.
      (ii) In one example, M may be not equal to N. For example, M=2, N=3.
  b) In one example, it is proposed to favor the searching MVs closer to original MV during the template/bilateral matching based refinement process
    i. In one example, each search region is assigned with a cost factor, which may be determined by the distance (e.g. delta MV in integer pixel precision) between each searching MV in the search region and the starting MV.
    ii. In one example, each search region is assigned with a cost factor, which may be determined by the distance (e.g. delta MV in integer pixel precision) between the center searching MV in the search region and the starting MV.
    iii. In one example, each searching MV is assigned with a cost factor, which may be determined by the distance (e.g. delta MV in integer pixel precision) between each searching MV and the starting MV.
5. The above methods may be applied to any coding data refinement process, e.g., for a template-based-coded block, for a bilateral-based-coded block (e.g., DMVR in VVC).
6. The template matching cost measurement may be different for different template matching refinement methods.
  a) In one example, the template matching refinement method may be template matching based motion candidate reordering.
  b) In one example, the template matching refinement method may be template matching based motion derivation.
    i. In one example, the refinement method may be TM AMVP, TM merge, and/or FRUC.
  c) In one example, the template matching refinement method may be template matching based motion refinement.
    ii. In one example, the refinement method may be TM GPM, TM CIIP, and/or TM affine.
  d) In one example, the template matching refinement method may be template matching based block vector derivation.
  e) In one example, the template matching refinement method may be template matching based intra mode derivation.
    iii. In one example, the refinement method may be DIMD and/or TIMD.
  f) In one example, the template matching cost measure may be calculated based on the sum of absolute differences (SAD) between the current and reference templates.
  g) In one example, the template matching cost measure may be calculated based on the mean-removal SAD between the current and reference templates.
  h) In one example, SAD and mean-removal SAD (MR-SAD) might be selectively utilized according to the size of the current block.
    i. In one example, mean-removal SAD is used for the block with size larger than M and SAD is used for the block with size smaller than or equal to M.
      (i) In one example, M is 64.
  i) In one example, SAD and mean-removal SAD (MR-SAD) might be selectively utilized according to the LIC flag of the current block.
    i. In one example, the template matching cost measure may be SAD if the LIC flag of the current block is false.
    ii. In one example, the template matching cost measure may be MR-SAD if the LIC flag of the current block is true.
  j) In one example, the template matching cost measure may be calculated based on the sum of absolute transformed differences (SATD) between the current and reference templates.
  k) In one example, the template matching cost measure may be calculated based on the mean-removal SATD between the current and reference templates.
  l) In one example, SATD and mean-removal SATD (MR-SATD) might be selectively utilized according to the size of the current block.
    i. In one example, mean-removal SATD is used for the block with size larger than M and SATD is used for the block with size smaller than or equal to M.
      (i) In one example, M is 64.
  m) In one example, SATD and mean-removal SATD (MR-SATD) might be selectively utilized according to the LIC flag of the current block.
    i. In one example, the template matching cost measure may be SATD if the LIC flag of the current block is false.
    ii. In one example, the template matching cost measure may be MR-SATD if the LIC flag of the current block is true.
  n) In one example, the template matching cost measure may be calculated based on the sum of squared differences (SSD) between the current and reference templates.
  o) In one example, the template matching cost measure may be calculated based on the mean-removal SSD between the current and reference templates.

p) In one example, SSD and mean-removal SSD (MR-SSD) might be selectively utilized according to the size of the current block.
  i. In one example, mean-removal SSD is used for the block with size larger than M and SSD is used for the block with size smaller than or equal to M.
     (i) In one example, M is 64.
q) In one example, the template matching cost measure may be the weighted SAD/weighted MR-SAD/selectively weighted MR-SAD and SAD/weighted SATD/weighted MR-SATD/selectively weighted MR-SATD and SATD/weighted SSD/weighted MR-SSD/selectively weighted MR-SSD and SSD between the current and reference templates.
  i. In one example, the weighted means applying different weights to each sample based on its row and column indices in template block when calculating the distortion between the current and reference templates.
  ii. In one example, the weighted means applying different weights to each sample based on its positions in template block when calculating the distortion between the current and reference templates.
  iii. In one example, the weighted means applying different weights to each sample based on its distances to current block when calculating the distortion between the current and reference templates.
r) In one example, the template matching cost may be calculated as a form of tplCost=w1*mvDistanceCost+w2*distortionCost.
  i. In one example, distortionCost may be weighted SAD/weighted MR-SAD/weighted SATD/weighted MR-SATD/weighted SSD/weighted MR-SSD/SAD/MR-SAD/SATD/MR-SATD/SSD/MR-SSD between the current and reference templates.
  ii. In one example, mvDistanceCost may be the sum of absolute mv differences of searching point and starting point in horizontal and vertical directions.
  iii. In one example, w1 and w2 may be pre-defined, or signaled or derived according to decoded information.
     (i) In one example, w1 is a weighting factor set to 4, w2 is a weighting factor set to 1
s) The cost may consider the continuity (Boundary_SAD) between reference template and reconstructed samples adjacently or non-adjacently neighboring to current template in addition to the SAD calculated in (f). For example, reconstructed samples left and/or above adjacently or non-adjacently neighboring to current template are considered.
  i. In one example, the cost may be calculated based on SAD and Boundary_SAD
     (i) In one example, the cost may be calculated as (SAD+w*Boundary_SAD). w may be pre-defined, or signaled or derived according to decoded information.
7. The bilateral matching cost measurement may be different for different bilateral matching refinement methods.
  a) In one example, the bilateral matching refinement method may be bilateral matching based motion candidate reordering.
  b) In one example, the bilateral matching refinement method may be bilateral matching based motion derivation.
     i. In one example, the refinement method may be BM merge and/or FRUC.
  c) In one example, the bilateral matching refinement method may be bilateral matching based motion refinement.
     i. In one example, the refinement method may be BM GPM, BM CIIP, and/or BM affine.
  d) In one example, the bilateral matching refinement method may be bilateral matching based block vector derivation.
  e) In one example, the bilateral matching refinement method may be bilateral matching based intra mode derivation.
  f) In one example, the bilateral matching cost measure may be calculated based on the sum of absolute differences (SAD) between the two reference blocks/subblocks.
  g) In one example, the bilateral matching cost measure may be calculated based on the mean-removal SAD between the two reference blocks/subblocks.
  h) In one example, SAD and mean-removal SAD (MR-SAD) might be selectively utilized according to the size of the current block/subblock.
     i. In one example, mean-removal SAD is used for the block/subblock with size larger than M and SAD is used for the block/subblock with size smaller than or equal to M.
        (i) In one example, M is 64.
  i) In one example, SAD and mean-removal SAD (MR-SAD) might be selectively utilized according to the LIC flag of the current block.
     i. In one example, the bilateral matching cost measure may be SAD if the LIC flag of the current block is false.
     ii. In one example, the bilateral matching cost measure may be MR-SAD if the LIC flag of the current block is true.
  j) In one example, the bilateral matching cost measure may be calculated based on the sum of absolute transformed differences (SATD) between the two reference blocks/subblocks.
  k) In one example, the bilateral matching cost measure may be calculated based on the mean-removal SATD between the two reference blocks/subblocks.
  l) In one example, SATD and mean-removal SATD (MR-SATD) might be selectively utilized according to the size of the current block/subblock.
     i. In one example, mean-removal SATD is used for the block/subblock with size larger than M and SATD is used for the block/subblock with size smaller than or equal to M.
        (i) In one example, M is 64.
  m) In one example, SATD and mean-removal SATD (MR-SATD) might be selectively utilized according to the LIC flag of the current block.
     i. In one example, the bilateral matching cost measure may be SATD if the LIC flag of the current block is false.
     ii. In one example, the bilateral matching cost measure may be MR-SATD if the LIC flag of the current block is true.

n) In one example, the bilateral matching cost measure may be calculated based on the sum of squared differences (SSD) between the two reference blocks/subblocks.
o) In one example, the bilateral matching cost measure may be calculated based on the mean-removal SSD between the two reference blocks/subblocks.
p) In one example, SSD and mean-removal SSD (MR-SSD) might be selectively utilized according to the size of the current block/subblock.
  i. In one example, mean-removal SSD is used for the block/subblock with size larger than M and SSD is used for the block/subblock with size smaller than or equal to M.
    (i) In one example, M is 64.
q) In one example, SSD and mean-removal SSD (MR-SSD) might be selectively utilized according to the LIC flag of the current block.
  i. In one example, the bilateral matching cost measure may be SSD if the LIC flag of the current block is false.
  ii. In one example, the bilateral matching cost measure may be MR-SSD if the LIC flag of the current block is true.
r) In one example, the bilateral matching cost measure may be the weighted SAD/weighted MR-SAD/selectively weighted MR-SAD and SAD/weighted SATD/weighted MR-SATD/selectively weighted MR-SATD and SATD/weighted SSD/weighted MR-SSD/selectively weighted MR-SSD and SSD between the two reference blocks/subblocks.
  i. In one example, the weighted means applying different weights to each sample based on its row and column indices in reference block/subblock when calculating the distortion between the two reference blocks/subblocks.
  ii. In one example, the weighted means applying different weights to each sample based on its positions in reference block/subblock when calculating the distortion between the two reference blocks/subblocks.
  iii. In one example, the weighted means applying different weights to each sample based on its distances to center position of reference block/subblock when calculating the distortion between the two reference blocks/subblocks.
s) In one example, if MR-SAD/MR-SATD/MR-SSD is used for the bilateral matching cost measure, LIC may be not used when deriving the reference blocks/subblocks.
t) In one example, the bilateral matching cost may be calculated as a form of bilCost=w1*mvDistanceCost+w2*distortionCost.
  i. In one example, distortionCost may be weighted SAD/weighted MR-SAD/weighted SATD/weighted MR-SATD/weighted SSD/weighted MR-SSD/SAD/MR-SAD/SATD/MR-SATD/SSD/MR-SSD between the two reference blocks/subblocks.
  ii. In one example, mvDistanceCost may be the sum of absolute mv differences of searching point and starting point in horizontal and vertical directions.
  iii. In one example, w1 and w2 may be pre-defined, or signaled or derived according to decoded information.
    (i) In one example, w1 is a weighting factor set to 4, w2 is a weighting factor set to 1.

8. The bilateral or template matching cost may be calculated based on prediction/reference samples which are modified by a function.
  a) In one example, the prediction/reference samples may be filtered before being used to calculate the bilateral or template matching cost.
  b) In one example, a prediction/reference sample S may be modified to be a*S+b before being used to calculate the bilateral or template matching cost.
  c) In one example, the modification may depend on the coding mode of the block, such as whether the block is LIC-coded or BCW-coded.

2 Problems

The current design of coding data refinement can be further improved.
1. For current design, either bilateral matching (with reference blocks corresponding to current block) or template matching (with reference blocks corresponding to a template containing neighbouring samples of the current block) is utilized. The continuity between current block and its neighbouring blocks is not taken into consideration.
2. It would be more efficient if the matching error measure is adaptively selected according to coding data refinement method (e.g., bilateral matching or template matching and etc.) and/or the prediction type of coded blocks (such as template matching/bilateral matching GPM, template matching/bilateral matching CIIP, template matching/bilateral matching SbTMVP, template matching/bilateral matching Affine, template matching (TM)/bilateral matching (BM)-based MMVD, DMVR, FRUC, TM merge, TM AMVP and etc.).

3 Embodiments

The detailed embodiments below should be considered as examples to explain general concepts. These embodiments should not be interpreted in a narrow way. Furthermore, these embodiments can be combined in any manner.

The term 'block' may represent a coding tree block (CTB), a coding tree unit (CTU), a coding block (CB), a CU, a PU, a TU, a PB, a TB or a video processing unit comprising multiple samples/pixels. A block may be rectangular or non-rectangular.

In the disclosure, the phrase "motion candidate" may represent a merge motion candidate in a regular/extended merge list indicated by a merge candidate index, or an AMVP motion candidate in regular/extended AMVP list indicated by an AMVP candidate index, or one AMVP motion candidate, or one merge motion candidate.

In the disclosure, a motion candidate is called to be "refined" if the motion information of the candidate is modified according to information signaled from the encoder or derived at the decoder. For example, a motion vector may be refined by DMVR, FRUC, TM merge, TM AMVP, TM GPM, TM CIIP, TM affine, MMVD, GMVD, affine MMVD, BDOF and so on.

In the disclosure, the phrase "coding data refinement" may represent a refinement process in order to derive or refine the signalled/decoded/derived prediction modes, prediction directions, or signalled/decoded/derived motion information, prediction and/or reconstruction samples for a block. In one example, the refinement process may include motion candidate reordering.

In the following discussion, a "template-based-coded" block may refer to a block using a template matching based method in the coding/decoding process to derive or refine coded information, such as template-matching based motion derivation, template-matching based motion list reconstruction, LIC, sign prediction, template-matching based block vector (e.g., used in IBC mode) derivation, DIMD, template-matching based non-inter (e.g., intra) prediction, etc. The template-based-coded method may be combined with any other coding tools, such as MMVD, CIIP, GPM, FRUC, Affine, BDOF, DMVR, OBMC, etc. In yet another example, the "template-based-coded" block may also refer to a block which derives or refines its decoded information based on certain rules using neighboring reconstructed samples (adjacent or non-adjacent), e.g., the DIMD method in 2.27 and the TIMD method 2.29).

In the following discussion, a "bilateral-based-coded" block may refer to a block using a bilateral matching based method in the coding/decoding process to derive or refine coded information, such as bilateral-matching based motion derivation, bilateral-matching based motion list reconstruction, and etc. The bilateral-based-coded method may be combined with any other coding tools, such as MMVD, CIIP, GPM, FRUC, Affine, DMVR, and etc.

W and H are the width and height of current block (e.g., luma block). W*H is the size of current block (e.g., luma block)

1. The cost definition may rely on outputs of multiple errors functions (e.g., distortion measurement methods) regarding the error/difference of two samples/blocks to be evaluated in one coding data refinement process of a current block.
    a) In one example, the error function may be:
        i. SAD
        ii. SATD
        iii. MR-SAD
        iv. MR-SATD
        v. Gradient information
        vi. SSE/SSD
        vii. MR-SSE/MR-SSD
        viii. Weighted SAD/weighted MR-SAD
        ix. Weighted SATD/weighted MR-SATD
        x. Weighted SSD/weighted MR-SSD
        xi. Weighted SSE/weighted MR-SSE
    b) In one example, the error function may be performed in block level or sub-block level.
        i. Alternatively, furthermore, for two sub-blocks, the error function may be different.
        ii. Alternatively, furthermore, the final output of the evaluated error of a block may be based on the outputs of sub-blocks, e.g., sum of outputs of error functions applied to each sub-block.
2. When the cost definition relies on outputs of multiple functions, the following may further apply:
    a) In one example, the cost function may rely on a linear weighted sum of multiple error functions.
    b) In one example, the cost function may rely on a non-linear weighted sum of multiple error functions.
    c) In one example, the cost function may further rely on estimated bits for side information.
    d) In one example, the cost function may be defined as:

$$C = R + \sum_{i=0}^{N-1} W_i * E_i$$

wherein R denotes the estimated bits for side information, $W_i$ and $E_i$ represent the weight applied to the i-th error function and output of the i-th error function, respectively.

3. Multiple refinement processes may be applied to one block with at least two different cost functions applied to at least two refinement processes.
    a) In one example, a first refinement process may be invoked with a first cost function. Based on the output of the first refinement process, a second cost function is further applied to the second refinement process.
    b) The above methods may be applied to the template-based-coded blocks.
4. Whether to use multiple refinement process, and/or how to select one or multiple error function and/or how to define the cost function and/or which samples to be involved in the error function may depend on the decoded information of a current block and/or its neighboring (adjacent or non-adjacent) blocks.
    a) In one example, how to select one or multiple error function and/or how to define the cost function may depend on the coding tool applied to current block and/or its neighboring blocks.
        i. In one example, the coding tool is the LIC.
            (i) In one example, SSD and mean-removal SSD (MR-SSD) might be selectively utilized according to the LIC flag of the current block.
                a) In one example, the template matching cost measure may be SSD if the LIC flag of the current block is false.
                b) In one example, the template matching cost measure may be MR-SSD if the LIC flag of the current block is true.
            (ii) In one example, if MR-SAD/MR-SATD/MR-SSD is used for the template matching cost measure, the linear function used in LIC process may be not used when deriving the reference template.
            (iii) In one example, if MR-SAD/MR-SATD/MR-SSD is used for the bilateral matching cost measure, the linear function used in LIC process may be not used when deriving the reference block.
    b) In one example, it may depend on block dimension (e.g., W, H), temporal layer, low delay check flag, etc. al.
    c) In one example, it may depend on whether the motion information of current and neighboring block is similar/identical.
    d) In one example, it may depend on reference picture list and/or reference picture information.
        i. In one example, for list X, a first error function (e.g., SAD/SSE) may be used, and for list Y (Y=1−X), a second error function (e.g., MR-SAD/MR-SSE) may be used.
        ii. Alternatively, furthermore, the final cost may be based on the costs of each reference picture list.
5. The above methods may be applied to any coding data refinement process, e.g., for a template-based-coded block, for a bilateral-based-coded block (e.g., DMVR in VVC).

The embodiments of the present disclosure are related to a cost function utilized in coding data refinement in image or video coding. As used herein, the term "coding data refinement" may represent a refinement process in order to derive or refine the signaled, decoded or derived prediction modes, prediction directions, or signaled, decoded, or derived motion information, prediction and/or reconstruction samples for a block. In one example, the refinement process may include motion candidate reordering. The term "block" may represent a coding tree block (CTB), a coding tree unit (CTU), a coding block (CB), a coding unit (CU), a prediction unit (PU), a transform unit (TU), a prediction block (PB), a transform block (TB), a video processing unit comprising multiple samples/pixels, and/or the like. A block may be rectangular or non-rectangular. A cost function, which may also be referred to as a "cost metric", defines how to determine a cost.

Figure 45:
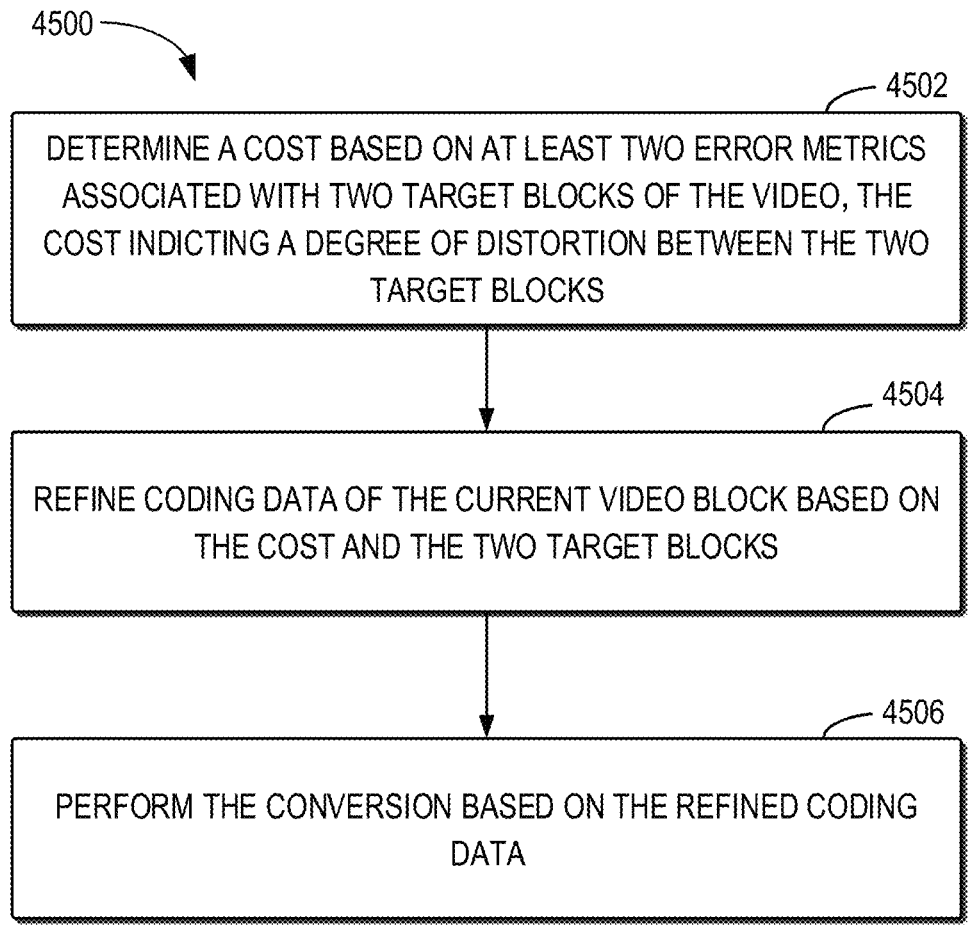
FIG. 45 illustrates a flowchart of a method for video processing in accordance with some embodiments of the present disclosure.

FIG. 45 illustrates a flowchart of a method 4500 for video processing in accordance with some embodiments of the present disclosure. The method 4500 may be implemented during a conversion between a current video block of a video and a bitstream of the video. As shown in FIG. 45, the method 4500 starts at 4502 where a cost is determine based on at least two error metrics associated with two target blocks of the video. The cost indicates a degree of distortion between the two target blocks. By way of example, it is assumed that a bilateral-matching (BM) based decoder side motion vector refinement as shown in FIG. 33 is employed to refine the coding data, more specifically, the motion information of the current video block. Referring to FIG. 33, the current video block 3310 of the current picture 3302 is to be coded. The original motion vectors MV0 and MV1 of the current video block 3302 refer to reference blocks 3320 and 3322. The two blocks 3330 and 3332 neighboring to the reference blocks 3320 and 3322 are considered for refinement of the motion information of the current video block 3310. To this end, the two blocks 3330 and 3332 may be regarded as target blocks and a cost is determined for the two target blocks 3330 and 3332 based on at two error metrics, e.g., based on SAD and MR-SAD associated with the two target blocks 3330 and 3332. Thereby, the cost indicates a degree of distortion between two target blocks 3330 and 3332.

At 4504, the coding data of the current video block is refined based on the cost and the two target blocks. With reference to FIG. 33, the motion information of the current video block 3310 will be refined based on the determined cost and the two target blocks 3330 and 3332. By way of example, if the determined cost is smaller than a predefined threshold, the original motion vectors MV0 and MV1 of the current video block 3310 may be replaced by the motion vectors MV0' and MV1' associated with the two blocks 3330 and 3332.

At 4506, the conversion is performed based on the refined coding data. In one example, the conversion may include encoding the current video block into the bitstream. Additionally or alternatively, the conversion may include decoding the current video block from the bitstream.

It should be understood that although the method 4500 is explained with reference to the bilateral-matching based decoder side motion vector refinement, the method 4500 may also be applied to any other suitable coding data refinement process including, but not limited to, a template matching refinement process and a bilateral matching refinement process, etc.

The method 4500 utilizes at least two different error metrics to measure the distortion between two blocks. Thereby, it is possible to determine the error in several different manners and thus the cost can measure the distortion more accurately. Compare with a conventional solution where only one error metric is used to determine the cost, the method 4500 can advantageously improve the coding quality and the coding efficiency.

In some embodiments, the at least two error metrics may comprise, but not limited to, sum of absolute difference (SAD), mean removal sum of absolute difference (MR-SAD), sum of absolute transformed difference (SATD), mean removal sum of absolute transformed difference (MR-SATD), gradient information, sum of squared error (SSE), mean removal sum of squared error (MR-SSE), sum of squared difference (SSD), mean removal sum of squared difference (MR-SSD), weighted SAD, weighted MR-SAD, weighted SATD, weighted MR-SATD, weighted SSD, weighted MR-SSD, weighted SSE, or weighted MR-SSE. It should be understood that the possible error metrics listed here are merely illustrative and therefore should not be construed as limiting the present disclosure in any way.

In some embodiments, the method 4500 may further comprise: determining a first error metric of the at least two error metrics between the two target blocks in block level. For example, with reference to FIG. 33, SAD between the two target blocks 3330 and 3332 may be determined directly in block level. Alternatively, the method 4500 may further comprise: determining a first error metric of the at least two error metrics between the two target blocks in sub-block level. By way of example, SAD between the two target blocks 3330 and 3332 may be determined in sub-block level. This will be discussed at details below Additionally, in some embodiments, the method 4500 may further comprise: determining the first error metric of the at least two error metrics between a first sub-block in one of the two target blocks and a second sub-block in the other one of the two target blocks; and determining a second error metric of the at least two error metrics between a third sub-block in one of the two target blocks and a fourth sub-block in the other one of the two target blocks. The first error metric may be different from the second error metric. For example, the at least two error metrics may comprise SAD and MR-SAD. With reference to FIG. 33, SAD between a sub-block in the block 3330 and a sub-block in the block 3332 may be determined, and MR-SAD between a sub-block in the block 3330 and a sub-block in the block 3332 may be determined. The cost may be determined based on the determined SAD and MR-SAD. Thereby, it is possible to measure the distortion between two blocks at sub-block level with different error metrics. This enables the cost to measure the distortion more accurately.

In some embodiments, a second error metric of the at least two error metrics between a first sub-block in one of the two target blocks and a second sub-block in the other one of the two target blocks may be determined. A third error metric of the at least two error metrics between a third sub-block in one of the two target blocks and a fourth sub-block in the other one of the two target blocks may be determined. The first error metric may be determined based on the second error metric and the third error metric. For example, with reference to FIG. 33, SSD between a sub-block in the block 3330 and a sub-block in the block 3332 may be determined, and MR-SAD between a sub-block in the block 3330 and a sub-block in the block 3332 may be determined. The first error metric may be determined based on all error metrics applied to each sub-block in block 3330. By way of example, the first metric may be determined to be a sum of the previously determined SSD and MR-SAD. Thereby, it is possible to measure the distortion between two blocks at sub-block level with different error metrics. This enables the cost to measure the distortion more accurately.

In some embodiments, at 4502, the cost may be determined based on a linear weighted sum of the at least two error metrics. Alternatively, the cost may be determined based on a non-linear weighted sum of the at least two error metrics. It should be understood that the cost may be determined based on the at least two error metrics in any other suitable manner. The scope of the present disclosure is not limited in this respect.

In some embodiments, the cost may further indicate an amount of side information. For example, in addition to the distortion between two blocks, the cost may also indicate the number of bits required for coding the side information. As used herein, the term "side information" may comprise, but not be limited to, motion vector difference (MVD), index and/or residual. Thereby, the method according to such embodiments takes both a degree of distortion between two blocks and an amount of side information, so as to determine a cost between two blocks for refinement of coding data. Thus, a balance between the degree of distortion and the number of bits for coding the side information can be achieved. The method according to such embodiments can advantageously reduce the coding bits while maintaining the coding quality.

In some embodiments, at 4502, the cost may be determined based on an error item and a regulation item. The error item may indicate the degree of distortion between the two target blocks. The regulation item may indicate the amount of the side information. In one example, the error item may be determined to be a weighted sum of the at least two error metrics. With reference to FIG. 33, an error item may be determined to be a weighted sum of SAD and SATD between the two blocks 3330 and 3320, and a regulation item may be determined to be the number of bits for the motion vector difference MV diff between the motion vectors MV0 and MV0'. The cost associated with the two blocks 3330 and 3320 is determined based on the error item and the regulation item. For example, the cost may be determined to be a weighted sum of the error item and the regulation item. Thereby, a balance between the degree of distortion and the number of bits for coding the information can be achieved. It should be understood that the above illustrations and/or examples are described merely for purpose of description. The scope of the present disclosure is not limited in this respect.

In some embodiments, the regulation item may be determined to be a number of bits for coding the side information. With reference to FIG. 33, the number of bits for motion vectors MV0' and MV1' associated with the two blocks 3330 and 3332 may be determined as the regulation item. Alternatively, the number of bits for the motion vector difference MV diff may be determined as the regulation item. Thereby, the proposed method can advantageously reduce the coding bits while maintaining the coding quality. It should be understood that the possible implementation of the regulation item described here are merely illustrative and therefore should not be construed as limiting the present disclosure in any way.

In some embodiments, the coding data may be refined based on multiple refinement processes. In one example, the multiple refinement processes may be based on template matching. Alternatively, the multiple refinement processes may be based on bilateral matching. It should be understood that the multiple refinement processes may also be based on any other suitable algorithm. The scope of the present disclosure is not limited in this respect.

In some embodiments, a first cost for a first refinement process of the multiple refinement processes may be determined differently from a second cost for a second refinement process of the multiple refinement processes. By way of example, it is assumed that a multi-pass decoder-side motion vector refinement is applied. In such a case, the cost may be determined based on a first cost metric for the first pass, e.g., a block based bilateral matching MV refinement. Moreover, the cost may be determined based on a second cost metric for the second pass, e.g., a sub-block based bilateral matching MV refinement. The second cost metric may be different from the first cost metric. Thereby, different cost metrics may be used for the individual processes contained in a multiple refinement processes. Hence, it is possible for the cost to measure the distortion more accurately. It should be understood that the above illustrations and/or examples are described merely for purpose of description. The scope of the present disclosure is not limited in this respect.

In some embodiments, the coding data may be refined based on the first cost and the first refinement process. Moreover, the refined coding data may be further refined based on the second cost and the second refinement process, so as to update the refined coding data. By way of example, in the case of the multi-pass decoder-side motion vector refinement, the cost for the sub-block based bilateral matching MV refinement may be determined based on SAD and SATD. On the other hand, the cost for the sub-block based bilateral matching MV refinement may be determined based on MR-SAD and MR-SATD. It should be understood that the above illustrations and/or examples are described merely for purpose of description. The scope of the present disclosure is not limited in this respect.

In some embodiments, whether the coding data is refined based on multiple refinement processes may be determined based on coded information of the current video block. Additionally or alternatively, whether the coding data is refined based on multiple refinement processes may be determined based on coded information of one or more neighboring blocks of the current video block. In another embodiment, the selection of the at least two error metrics may be determined based on coded information of the current video block. Additionally or alternatively, the selection of the at least two error metrics may be determined based on coded information of one or more neighboring blocks of the current video block. In a further embodiment, the definition of a cost metric for determination of the cost may be determined based on coded information of the current video block. Additionally or alternatively, the definition of a cost metric for determination of the cost may be determined based on coded information of one or more neighboring blocks of the current video block. In yet another embodiment, samples used for the at least two error metrics may be determined based on coded information of the current video block. Additionally or alternatively, samples used for the at least two error metrics may be determined based on coded information of one or more neighboring blocks of the current video block. In an example, the neighboring block may be adjacent to the current video block. Alternatively, the neighboring block may also be non-adjacent to the current video block. Thereby, the setting of the coding data refinement process may be determined adaptively and thus the coding efficiency can be advantageously improved.

In some embodiment, the coded information may comprise a dimension, a temporal layer, a low delay check flag and/or motion information. For example, with reference to FIG. 33, the coded information may comprise the width of the current video block 3310. Additionally or alternatively, the coded information may comprise the height of a neighboring block of the current video block 3310. It should be understood that the coded information may also comprise any other suitable information. The scope of the present disclosure is not limited in this respect.

In some embodiments, whether the coding data is refined based on multiple refinement processes may be determined based on a similarity between motion information of the current video block and a neighboring block of the current video block. Additionally or alternatively, the selection of the at least two error metrics may be determined based on a similarity between motion information of the current video block and a neighboring block of the current video block. In a further embodiment, the definition of a cost metric for determination of the cost may be determined based on a similarity between motion information of the current video block and a neighboring block of the current video block. In yet another embodiment, samples used for the at least two error metrics may be determined based on a similarity between motion information of the current video block and a neighboring block of the current video block. Thereby, the setting of the coding data refinement process may be determined adaptively and thus the coding efficiency can be advantageously improved.

In some embodiments, the selection of the at least two error metrics is determined based on a coding tool applied to at least one of the current video block or the one or more neighboring blocks. Additionally or alternatively, the definition of the cost metric may also be determined based on a coding tool applied to at least one of the current video block or the one or more neighboring blocks. Thereby, the setting of the coding data refinement process may be adapted to the coding tool and thus the coding efficiency can be advantageously improved.

In some embodiments, the coding tool may comprise local illumination compensation (LIC). SSD or MR-SSD may be determined to be one of the at least two error metrics based on a LIC flag of the current video block. By way of example, if the LIC flag of the current video block is false, the at least two error metrics may comprise SSD. On the other hand, if the LIC flag of the current video block is true, the at least two error metrics may comprise MR-SSD. It should be understood that the above illustrations and/or examples are described merely for purpose of description. The scope of the present disclosure is not limited in this respect.

In some embodiments, if the coding data is refined based on template matching and the at least two error metrics comprise MR-SAD, MR-SATD or MR-SSD, an adjustment based on a linear model in LIC process may be absent for determining a reference template comprised in the two target blocks. That is, the reference template may be derived without using a linear model used in LIC process.

In some embodiments, if the coding data is refined based on bilateral matching and the at least two error metrics comprise MR-SAD, MR-SATD or MR-SSD, an adjustment based on a linear model in LIC process may be absent for determining a reference block comprised in the two target blocks. That is, the reference block may be derived without using a linear model used in LIC process.

In some embodiments, whether the coding data is refined based on multiple refinement processes may be determined based on a reference picture list and/or reference picture information of the current video block. Additionally or alternatively, whether the coding data is refined based on multiple refinement processes may be determined based on a reference picture list and/or reference picture information of a neighboring block of the current video block. In another embodiment, the selection of the at least two error metrics may be determined based on a reference picture list and/or reference picture information of the current video block. Additionally or alternatively, the selection of the at least two error metrics may be determined based on a reference picture list and/or reference picture information of a neighboring block of the current video block. In a further embodiment, the definition of a cost metric for determination of the cost may be determined based on a reference picture list and/or reference picture information of the current video block. Additionally or alternatively, the definition of a cost metric for determination of the cost may be determined based on a reference picture list and/or reference picture information of a neighboring block of the current video block. In yet another embodiment, samples used for the at least two error metrics may be determined based on a reference picture list and/or reference picture information of the current video block. Additionally or alternatively, samples used for the at least two error metrics may be determined based on a reference picture list and/or reference picture information of a neighboring block of the current video block. In an example, the neighboring block may be adjacent to the current video block. Alternatively, the neighboring block may also be non-adjacent to the current video block. Thereby, the setting of the coding data refinement process may be determined adaptively and thus the coding efficiency can be advantageously improved.

In some embodiments, the at least two error metrics may comprise a fourth error metric and a fifth error metric different from the fourth error metric. The fourth error metric may be used for a first reference picture list for the current video block and the fifth error metric may be used for a second reference picture list for the current video block and/or the neighboring block. By way of example, with reference to FIG. 33, SAD may be used for the reference picture list ListL0 of the current video block 3310, and SATD may be used for the reference picture list ListL1 of the current video block 3310. Additionally, the fifth error metric may be a mean removal version of the fourth error metric. For example, SAD may be used for the reference picture list ListL0 of the current video block 3310, and MR-SAD may be used for the reference picture list ListL1 of the current video block 3310. It should be understood that the possible implementation of the error metric described here are merely illustrative and therefore should not be construed as limiting the present disclosure in any way.

In some embodiments, the at least two error metrics may comprise a fourth error metric and a fifth error metric different from the fourth error metric. The fourth error metric may be used for a first reference picture for the current video block and the fifth error metric may be used for a second reference picture for the current video block and/or the neighboring block.

In some embodiments, the cost may be determined based on cost of one or more reference picture lists for the current video block. Additionally or alternatively, the cost may be determined based on cost of one or more reference picture lists for the neighboring block. For example, the final cost may be determined based on the costs of each reference picture list of the current video block. With reference to FIG. 33, the final cost may be determined to be a weighted sum of a cost of the reference picture list ListL0 and a cost of the reference picture list ListL1 of the current video block 3310.

Implementations of the present disclosure can be described in view of the following clauses, the features of which can be combined in any reasonable manner.

Clause 1. A method for video processing, comprising: determining, during a conversion between a current video block of a video and a bitstream of the video, a cost based on at least two error metrics associated with two target blocks of the video, the cost indicting a degree of distortion between the two target blocks; refining coding data of the current video block based on the cost and the two target blocks; and performing the conversion based on the refined coding data.

Clause 2. The method of clause 1, wherein the at least two error metrics comprise at least one of: sum of absolute difference (SAD), mean removal sum of absolute difference (MR-SAD), sum of absolute transformed difference (SATD), mean removal sum of absolute transformed difference (MR-SATD), gradient information, sum of squared error (SSE), mean removal sum of squared error (MR-SSE), sum of squared difference (SSD), mean removal sum of squared difference (MR-SSD), weighted SAD, weighted MR-SAD, weighted SATD, weighted MR-SATD, weighted SSD, weighted MR-SSD, weighted SSE, or weighted MR-SSE.

Clause 3. The method of any of clauses 1-2, further comprising: determining a first error metric of the at least two error metrics between the two target blocks in block level or sub-block level.

Clause 4. The method of clause 3, further comprising: determining the first error metric of the at least two error metrics between a first sub-block in one of the two target blocks and a second sub-block in the other one of the two target blocks; and determining a second error metric of the at least two error metrics between a third sub-block in one of the two target blocks and a fourth sub-block in the other one of the two target blocks, the first error metric being different from the second error metric.

Clause 5. The method of clause 3, wherein determining the first error metric in sub-block level comprises: determining a second error metric of the at least two error metrics between a first sub-block in one of the two target blocks and a second sub-block in the other one of the two target blocks; and determining a third error metric of the at least two error metrics between a third sub-block in one of the two target blocks and a fourth sub-block in the other one of the two target blocks; and determining the first error metric based on the second error metric and the third error metric.

Clause 6. The method of any of clauses 1-4, wherein determining the cost comprises: determining the cost based on one of: a linear weighted sum of the at least two error metrics, or a non-linear weighted sum of the at least two error metrics.

Clause 7. The method of any of clauses 1-6, wherein the cost further indicates an amount of side information.

Clause 8. The method of clause 7, wherein determining the cost comprises: determining an error item indicating the degree of distortion between the two target blocks; determining a regulation item indicating the amount of the side information; and determining the cost based on the error item and the regulation item.

Clause 9. The method of clause 8, wherein determining the error item comprises: determining, as the error item, a weighted sum of the at least two error metrics.

Clause 10. The method of any of clauses 8-9, wherein determining the regulation item comprises: determining, as the regulation item, a number of bits for coding the side information.

Clause 11. The method of any of clauses 1-10, wherein the coding data is refined based on multiple refinement processes, and a first cost for a first refinement process of the multiple refinement processes is determined differently from a second cost for a second refinement process of the multiple refinement processes.

Clause 12. The method of clause 11, wherein the first cost is the cost associated with the two target blocks, and refining the coding data comprises: refining the coding data based on the first cost and the first refinement process; and updating the refined coding data by refining the refined coding data based on the second cost and the second refinement process.

Clause 13. The method of any of clauses 10-11, wherein at least one of the multiple refinement processes is based on template matching.

Clause 14. The method of any of clauses 1-13, wherein at least one of the following is determined at least based on coded information of the current video block and/or one or more neighboring blocks of the current video block: whether the coding data is refined based on multiple refinement processes, selection of the at least two error metrics, definition of a cost metric for determination of the cost, or samples used for the at least two error metrics.

Clause 15. The method of clause 14, wherein the selection of the at least two error metrics and/or the definition of the cost metric are determined based on a coding tool applied to at least one of the current video block or the one or more neighboring blocks.

Clause 16. The method of clause 15, wherein the coding tool comprises local illumination compensation (LIC).

Clause 17. The method of clause 16, wherein determining the cost comprises: determining SSD or MR-SSD to be one of the at least two error metrics based on a LIC flag of the current video block.

Clause 18. The method of clause 17, wherein if the LIC flag of the current video block is false, one of the at least two error metrics is SSD, or if the LIC flag of the current video block is true, one of the at least two error metrics is MR-SSD.

Clause 19. The method of any of clauses 16-18, wherein if the coding data is refined based on template matching and the at least two error metrics comprise one of MR-SAD, MR-SATD or MR-SSD, an adjustment based on a linear model in LIC process is absent for determining a reference template comprised in the two target blocks.

Clause 20. The method of any of clauses 16-18, wherein if the coding data is refined based on bilateral matching and the at least two error metrics comprise one of MR-SAD, MR-SATD or MR-SSD, an adjustment based on a linear model in LIC process is absent for determining a reference block comprised in the two target blocks.

Clause 21. The method of any of clauses 1-13, wherein at least one of the following is determined at least based on a dimension, a temporal layer or a low delay check flag of the current video block and/or one or more neighboring blocks of the current video block: whether the coding data is refined based on multiple refinement processes, selection of the at least two error metrics, definition of a cost metric for determination of the cost, or samples used for the at least two error metrics.

Clause 22. The method of any of clauses 1-13, wherein at least one of the following is determined at least based on a similarity between motion information of the current video block and a neighboring block of the current video block: whether the coding data is refined based on multiple refinement processes, selection of the at least two error metrics, definition of a cost metric for determination of the cost, or samples used for the at least two error metrics.

Clause 23. The method of any of clauses 1-13, wherein at least one of the following is determined at least based on a reference picture list and/or reference picture information of the current video block and/or a neighboring block of the current video block: whether the coding data is refined based on multiple refinement processes, selection of the at least two error metrics, definition of a cost metric for determination of the cost, or samples used for the at least two error metrics.

Clause 24. The method of clause 23, wherein a fourth error metric of the at least two error metrics is used for a first reference picture list for the current video block and/or the neighboring block, and a fifth error metric of the at least two error metrics is used for a second reference picture list for the current video block and/or the neighboring block, the fourth error metric being different from the fifth error metric.

Clause 25. The method of clause 23, wherein a fourth error metric of the at least two error metrics is used for a first reference picture for the current video block and/or the neighboring block, and a fifth error metric of the at least two error metrics is used for a second reference picture for the current video block and/or the neighboring block, the fourth error metric being different from the fifth error metric.

Clause 26. The method of any of clauses 24-25, wherein the fifth error metric is a mean removal version of the fourth error metric.

Clause 27. The method of clause 23, wherein the cost is determined based on cost of one or more reference picture lists for the current video block and/or the neighboring block.

Clause 28. The method of any of clauses 1-27, wherein the coding data is refined based on template matching or bilateral matching.

Clause 29. The method of any of clauses 1-28, wherein the conversion includes encoding the current video block into the bitstream.

Clause 30. The method of any of clauses 1-28, wherein the conversion includes decoding the current video block from the bitstream.

Clause 31. An apparatus for processing video data comprising a processor and a non-transitory memory with instructions thereon, wherein the instructions upon execution by the processor, cause the processor to perform a method in accordance with any of Clauses 1-30.

Clause 32. A non-transitory computer-readable storage medium storing instructions that cause a processor to perform a method in accordance with any of Clauses 1-30.

Clause 33. A non-transitory computer-readable recording medium storing a bitstream of a video which is generated by a method performed by a video processing apparatus, wherein the method comprises: determining a cost based on at least two error metrics associated with two target blocks of the video, the cost indicting a degree of distortion between the two target blocks; refining coding data of a current video block of the video based on the cost and the two target blocks; and generating the bitstream based on the refined coding data.

Clause 34. A method for storing a bitstream of a video, comprising: determining a cost based on at least two error metrics associated with two target blocks of the video, the cost indicting a degree of distortion between the two target blocks; refining coding data of a current video block of the video based on the cost and the two target blocks; generating the bitstream based on the refined coding data; and storing the bitstream in a non-transitory computer-readable recording medium.

Example Device

Figure 46:
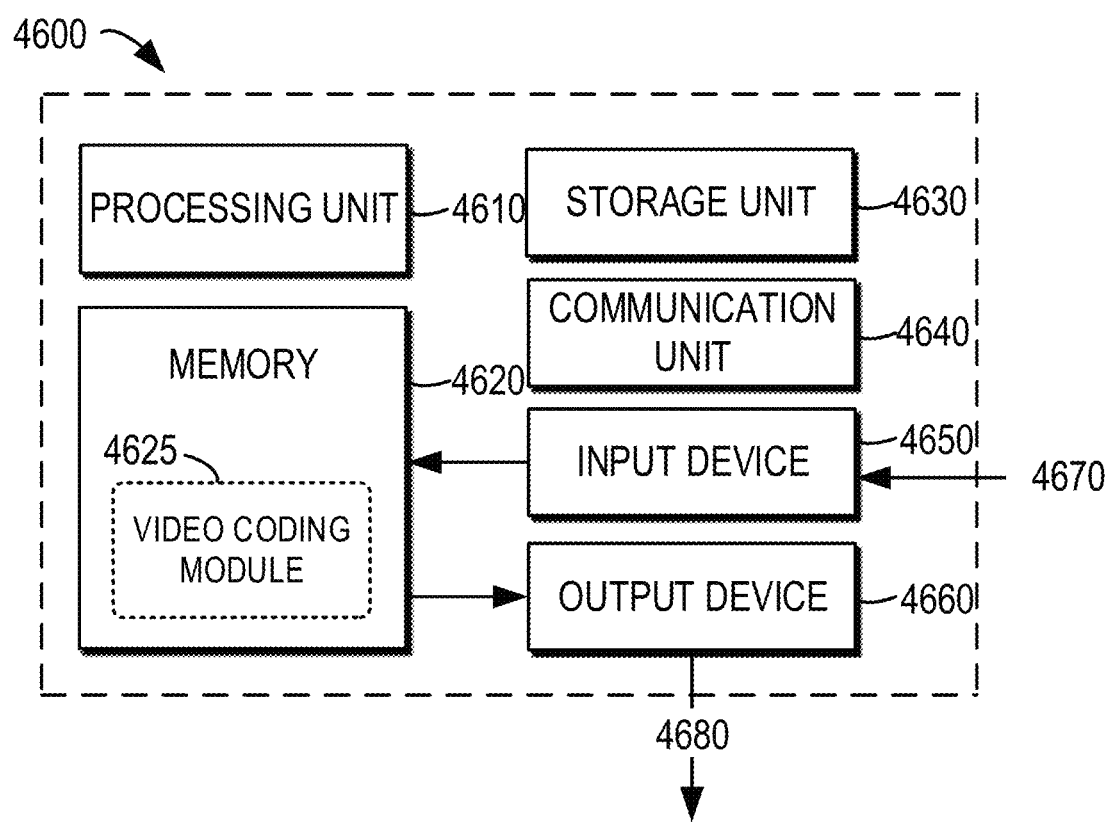
FIG. 46 illustrates a block diagram of a computing device in which various embodiments of the present disclosure can be implemented.

FIG. 46 illustrates a block diagram of a computing device 4600 in which various embodiments of the present disclosure can be implemented. The computing device 4600 may be implemented as or included in the source device 110 (or the video encoder 114 or 200) or the destination device 120 (or the video decoder 124 or 300).

It would be appreciated that the computing device 4600 shown in FIG. 46 is merely for purpose of illustration, without suggesting any limitation to the functions and scopes of the embodiments of the present disclosure in any manner.

As shown in FIG. 46, the computing device 4600 includes a general-purpose computing device 4600. The computing device 4600 may at least comprise one or more processors or processing units 4610, a memory 4620, a storage unit 4630, one or more communication units 4640, one or more input devices 4650, and one or more output devices 4660.

In some embodiments, the computing device 4600 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet et computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 4600 can support any type of interface to a user (such as "wearable" circuitry and the like).

The processing unit 4610 may be a physical or virtual processor and can implement various processes based on programs stored in the memory 4620. In a multi-processor system, multiple processing units execute computer executable instructions in parallel so as to improve the parallel processing capability of the computing device 4600. The processing unit 4610 may also be referred to as a central processing unit (CPU), a microprocessor, a controller or a microcontroller.

The computing device 4600 typically includes various computer storage medium. Such medium can be any medium accessible by the computing device 4600, including, but not limited to, volatile and non-volatile medium, or detachable and non-detachable medium. The memory 4620 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 4630 may be any detachable or non-detachable medium and may include a machine-readable medium such as a memory, flash memory drive, magnetic disk or another other media, which can be used for storing information and/or data and can be accessed in the computing device 4600.

The computing device 4600 may further include additional detachable/non-detachable, volatile/non-volatile memory medium. Although not shown in FIG. 46, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 4640 communicates with a further computing device via the communication medium. In addition, the functions of the components in the computing device 4600 can be implemented by a single computing cluster or multiple computing machines that can communicate via communication connections. Therefore, the computing device 4600 can operate in a networked environment using a logical connection with one or more other servers, networked personal computers (PCs) or further general network nodes.

The input device 4650 may be one or more of a variety of input devices, such as a mouse, keyboard, tracking ball, voice-input device, and the like. The output device 4660 may be one or more of a variety of output devices, such as a display, loudspeaker, printer, and the like. By means of the communication unit 4640, the computing device 4600 can further communicate with one or more external devices (not shown) such as the storage devices and display device, with one or more devices enabling the user to interact with the computing device 4600, or any devices (such as a network card, a modem and the like) enabling the computing device 4600 to communicate with one or more other computing devices, if required. Such communication can be performed via input/output (I/O) interfaces (not shown).

In some embodiments, instead of being integrated in a single device, some or all components of the computing device 4600 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 4600 may be used to implement video encoding/decoding in embodiments of the present disclosure. The memory 4620 may include one or more video coding modules 4625 having one or more program instructions. These modules are accessible and executable by the processing unit 4610 to perform the functionalities of the various embodiments described herein.

In the example embodiments of performing video encoding, the input device 4650 may receive video data as an input 4670 to be encoded. The video data may be processed, for example, by the video coding module 4625, to generate an encoded bitstream. The encoded bitstream may be provided via the output device 4660 as an output 4680.

In the example embodiments of performing video decoding, the input device 4650 may receive an encoded bitstream as the input 4670. The encoded bitstream may be processed, for example, by the video coding module 4625, to generate decoded video data. The decoded video data may be provided via the output device 4660 as the output 4680.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:
determining, during a conversion between a current video block of a video and a bitstream of the video, a cost based on at least two error metrics associated with two target blocks of the video, the cost indicting a degree of distortion between the two target blocks;
refining coding data of the current video block based on the cost and the two target blocks; and
performing the conversion based on the refined coding data.

2. The method of claim 1, wherein the at least two error metrics comprise at least one of:
sum of absolute difference (SAD),
mean removal sum of absolute difference (MR-SAD),
sum of absolute transformed difference (SATD),
mean removal sum of absolute transformed difference (MR-SATD),
gradient information,
sum of squared error (SSE),
mean removal sum of squared error (MR-SSE),
sum of squared difference (SSD),
mean removal sum of squared difference (MR-SSD),
weighted SAD,
weighted MR-SAD,
weighted SATD,
weighted MR-SATD,
weighted SSD,
weighted MR-SSD,
weighted SSE, or
weighted MR-SSE.

3. The method of claim 1, further comprising:
determining a first error metric of the at least two error metrics between the two target blocks in block level or sub-block level.

4. The method of claim 3, wherein the method further comprises:

determining the first error metric of the at least two error metrics between a first sub-block in one of the two target blocks and a second sub-block in the other one of the two target blocks; and determining a second error metric of the at least two error metrics between a third sub-block in one of the two target blocks and a fourth sub-block in the other one of the two target blocks, the first error metric being different from the second error metric, or wherein determining the first error metric in sub-block level comprises:

determining a second error metric of the at least two error metrics between a first sub-block in one of the two target blocks and a second sub-block in the other one of the two target blocks; and determining a third error metric of the at least two error metrics between a third sub-block in one of the two target blocks and a fourth sub-block in the other one of the two target blocks; and determining the first error metric based on the second error metric and the third error metric.

5. The method of claim 1, wherein determining the cost comprises:

determining the cost based on one of:

a linear weighted sum of the at least two error metrics, or a non-linear weighted sum of the at least two error metrics, or wherein the cost further indicates an amount of side information, or wherein the coding data is refined based on multiple refinement processes, and a first cost for a first refinement process of the multiple refinement processes is determined differently from a second cost for a second refinement process of the multiple refinement processes.

6. The method of claim 5, wherein determining the cost comprises:

determining an error item indicating the degree of distortion between the two target blocks;

determining a regulation item indicating the amount of the side information; and determining the cost based on the error item and the regulation item.

7. The method of claim 6, wherein determining the error item comprises:

determining, as the error item, a weighted sum of the at least two error metrics, or wherein determining the regulation item comprises: determining, as the regulation item, a number of bits for coding the side information.

8. The method of claim 5, wherein the first cost is the cost associated with the two target blocks, and refining the coding data comprises:

refining the coding data based on the first cost and the first refinement process; and updating the refined coding data by refining the refined coding data based on the second cost and the second refinement process, or wherein at least one of the multiple refinement processes is based on template matching.

9. The method of claim 1, wherein at least one of the following is determined at least based on coded information of the current video block and/or one or more neighboring blocks of the current video block:

whether the coding data is refined based on multiple refinement processes, selection of the at least two error metrics, definition of a cost metric for determination of the cost, or samples used for the at least two error metrics.

10. The method of claim 9, wherein the selection of the at least two error metrics and/or the definition of the cost metric are determined based on a coding tool applied to at least one of the current video block or the one or more neighboring blocks.

11. The method of claim 10, wherein the coding tool comprises local illumination compensation (LIC).

12. The method of claim 11, wherein determining the cost comprises:

determining SSD or MR-SSD to be one of the at least two error metrics based on a LIC flag of the current video block.

13. The method of claim 10, wherein if the LIC flag of the current video block is false, one of the at least two error metrics is SSD, or if the LIC flag of the current video block is true, one of the at least two error metrics is MR-SSD.

14. The method of claim 11, wherein if the coding data is refined based on template matching and the at least two error metrics comprise one of MR-SAD, MR-SATD or MR-SSD, an adjustment based on a linear model in LIC process is absent for determining a reference template comprised in the two target blocks, or wherein if the coding data is refined based on bilateral matching and the at least two error metrics comprise one of MR-SAD, MR-SATD or MR-SSD, an adjustment based on a linear model in LIC process is absent for determining a reference block comprised in the two target blocks.

15. The method of claim 1, wherein at least one of the following is determined at least based on a dimension, a temporal layer or a low delay check flag of the current video block and/or one or more neighboring blocks of the current video block:

whether the coding data is refined based on multiple refinement processes, selection of the at least two error metrics, definition of a cost metric for determination of the cost, or samples used for the at least two error metrics, or wherein at least one of the following is determined at least based on a similarity between motion information of the current video block and a neighboring block of the current video block:

whether the coding data is refined based on multiple refinement processes, selection of the at least two error metrics, definition of a cost metric for determination of the cost, or samples used for the at least two error metrics, or wherein at least one of the following is determined at least based on a reference picture list and/or reference picture information of the current video block and/or a neighboring block of the current video block:

whether the coding data is refined based on multiple refinement processes, selection of the at least two error metrics, definition of a cost metric for determination of the cost, or samples used for the at least two error metrics.

16. The method of claim 15, wherein a fourth error metric of the at least two error metrics is used for a first reference picture list for the current video block and/or the neighboring block, and a fifth error metric of the at least two error metrics is used for a second reference picture list for the current video block and/or the neighboring block, the fourth error metric being different from the fifth error metric, or wherein a fourth error metric of the at least two error metrics is used for a first reference picture for the current video block and/or the neighboring block, and a fifth error metric of the at least two error metrics is used for a second reference picture for the current video block and/or the neighboring block, the fourth error metric being different from the fifth error metric, or wherein the cost is determined based on cost of one or more reference picture lists for the current video block and/or the neighboring block.

17. The method of claim 16, wherein the fifth error metric is a mean removal version of the fourth error metric.

18. The method of claim 1, wherein the coding data is refined based on template matching or bilateral matching, or wherein the conversion includes encoding the current video block into the bitstream, or wherein the conversion includes decoding the current video block from the bitstream.

19. An apparatus for processing video data comprising a processor and a non-transitory memory with instructions thereon, wherein the instructions upon execution by the processor, cause the processor to perform a method comprising:

determining, during a conversion between a current video block of a video and a bitstream of the video, a cost based on at least two error metrics associated with two target blocks of the video, the cost indicting a degree of distortion between the two target blocks;

refining coding data of the current video block based on the cost and the two target blocks; and performing the conversion based on the refined coding data.

20. A non-transitory computer-readable storage medium storing instructions that cause a processor to perform a method comprising:

determining, during a conversion between a current video block of a video and a bitstream of the video, a cost based on at least two error metrics associated with two target blocks of the video, the cost indicting a degree of distortion between the two target blocks;

refining coding data of the current video block based on the cost and the two target blocks; and performing the conversion based on the refined coding data.

21. The method of claim 1, further comprising:

storing the bitstream in a non-transitory computer-readable recording medium.

\* \* \* \* \*